Figure 1:
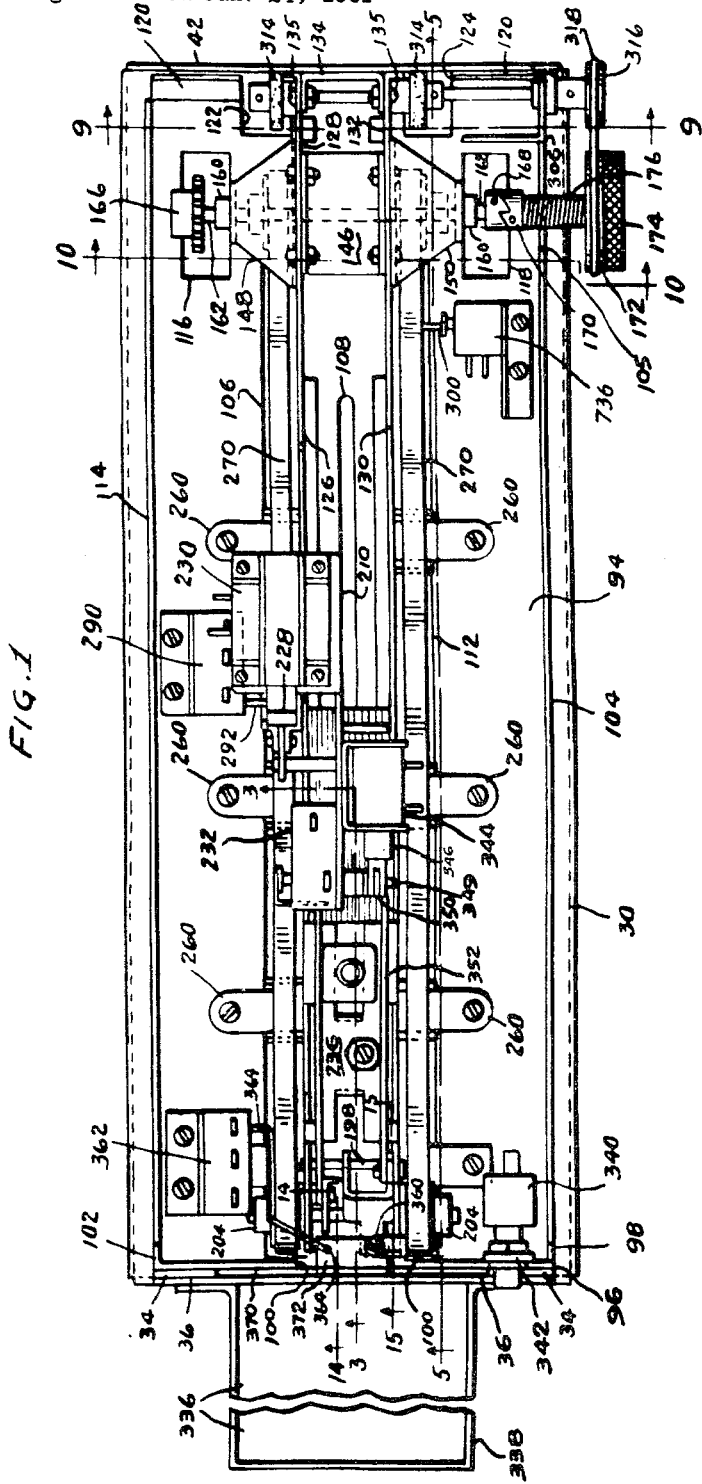

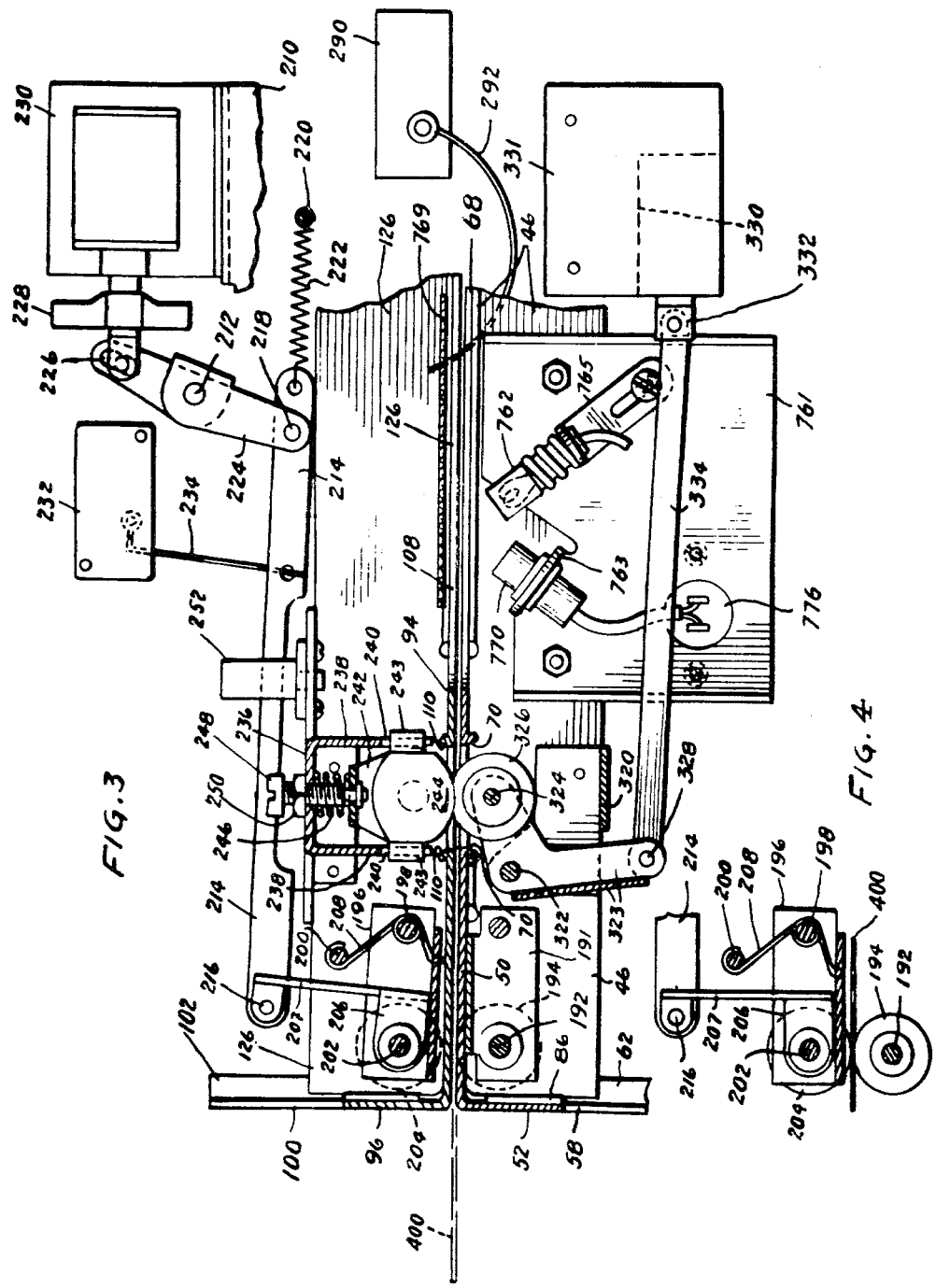

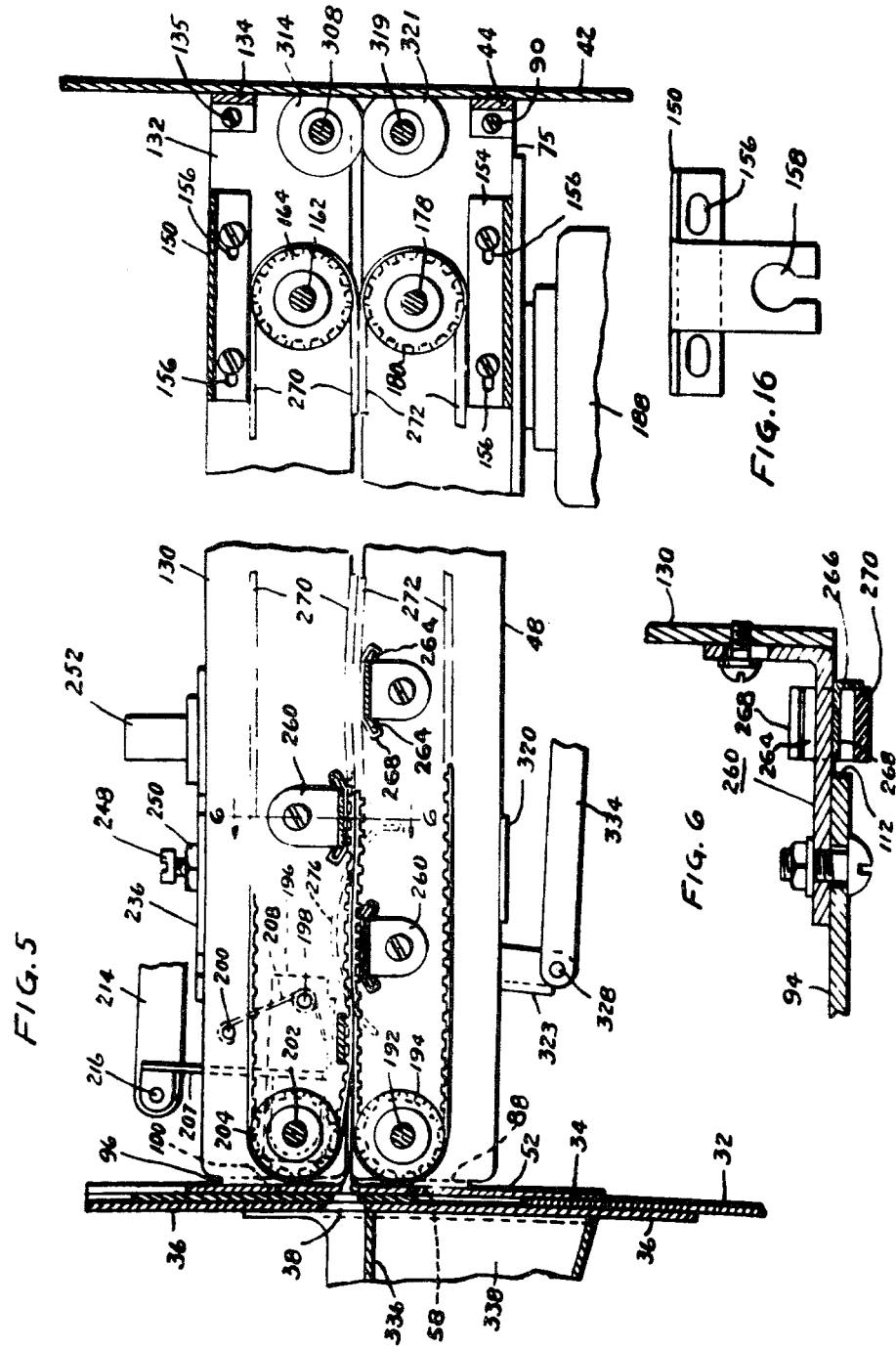

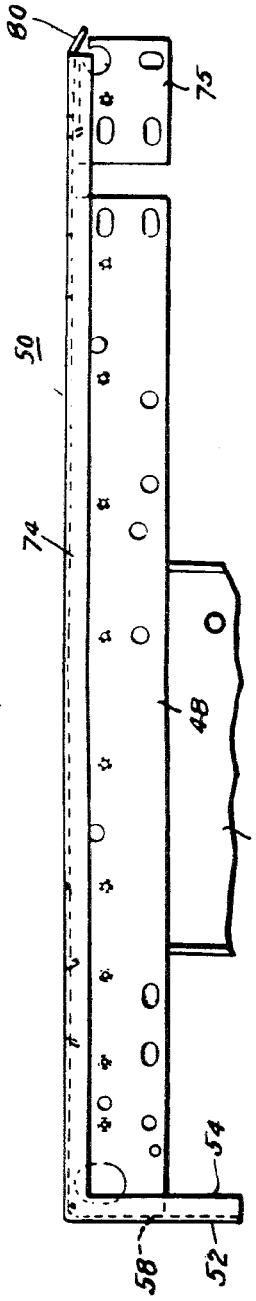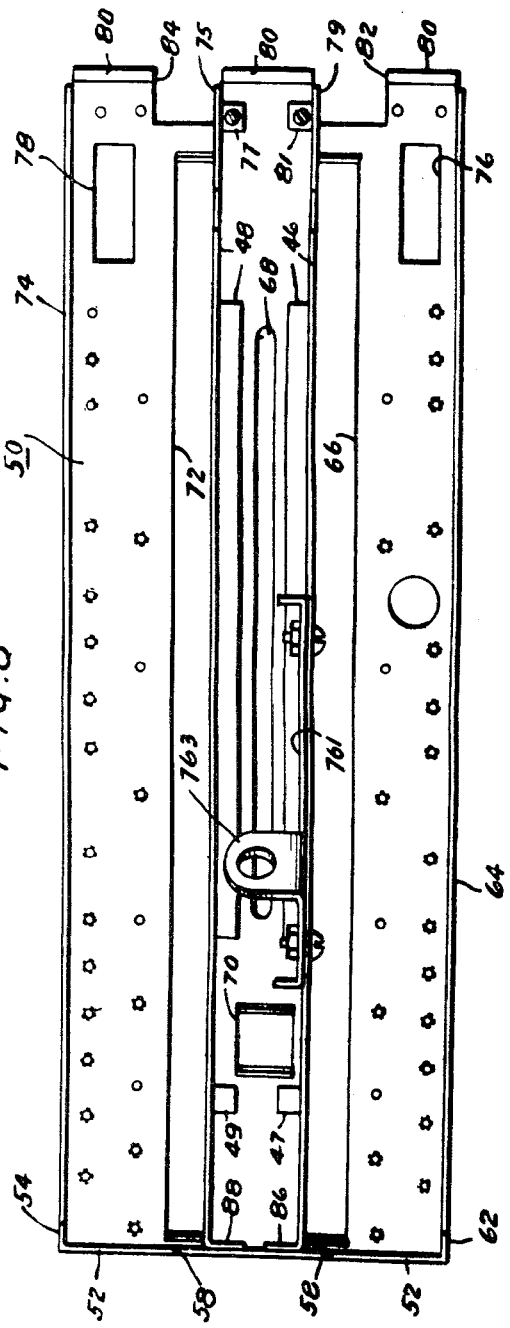

Feb. 22, 1966 W. S. HERMANN 3,236,377
CURRENCY DETECTORS
Original Filed Jan. 24, 1961 18 Sheets-Sheet 7
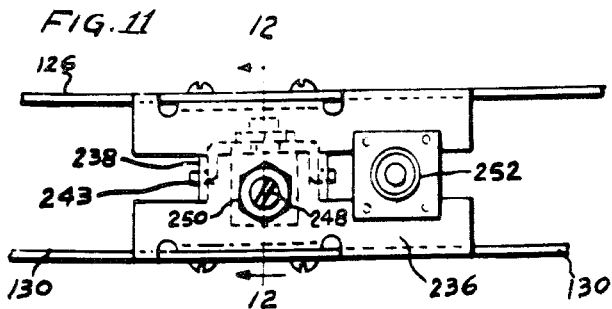
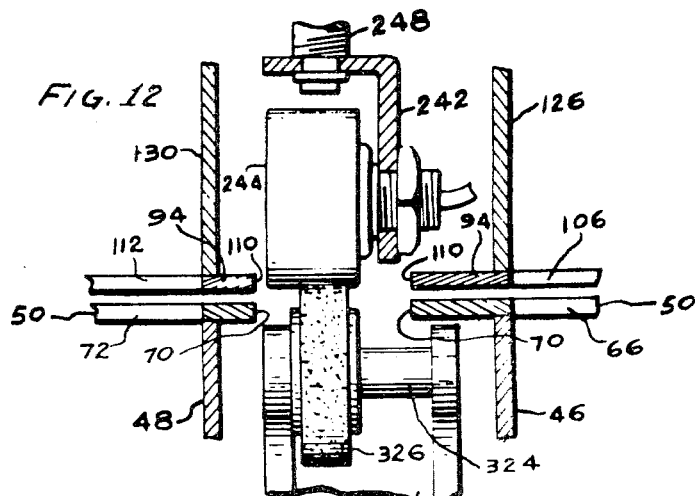
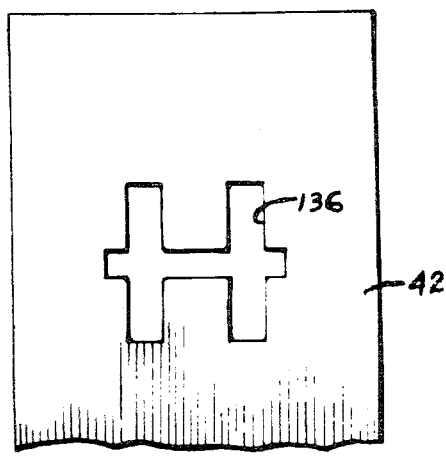

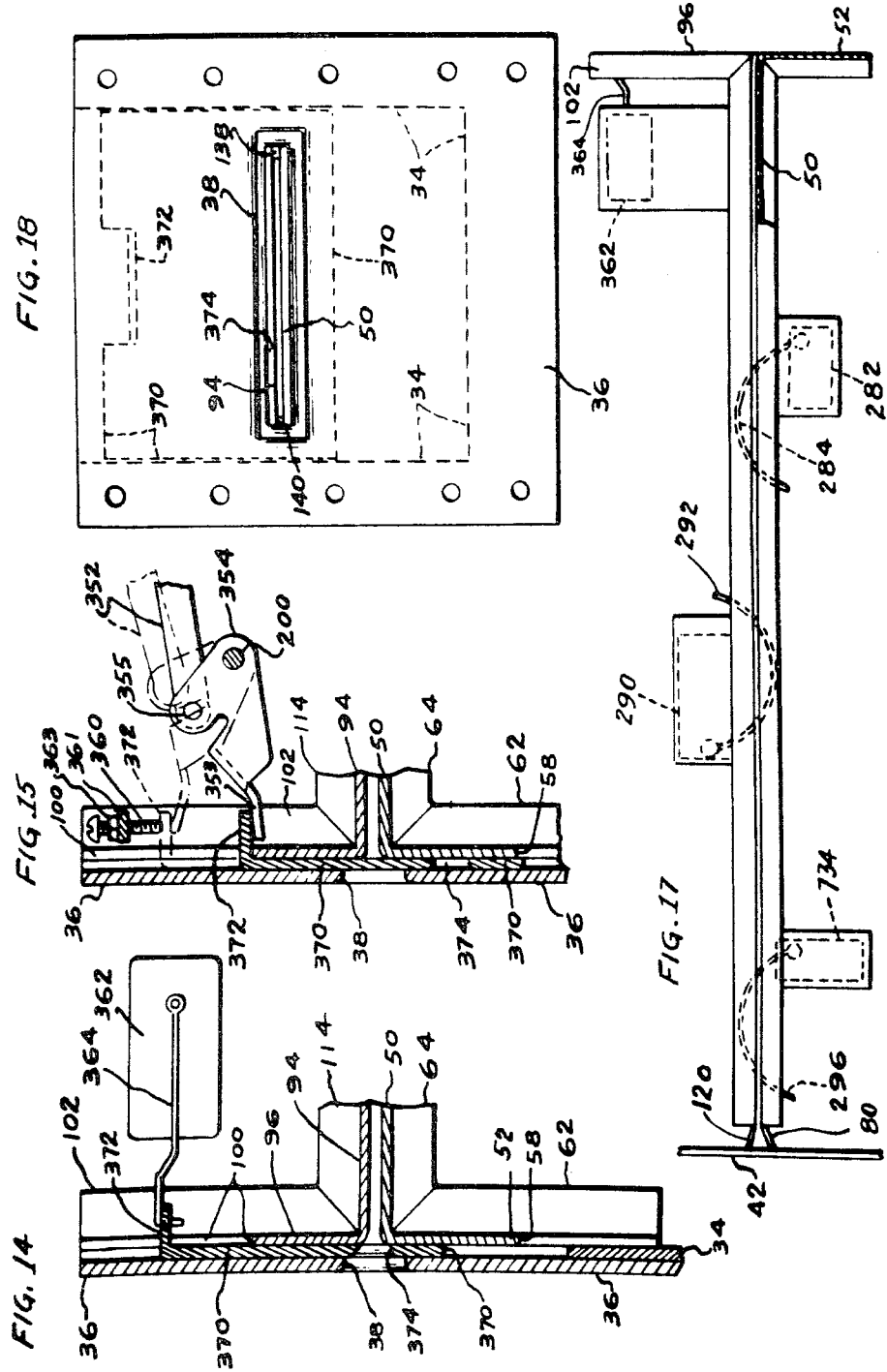

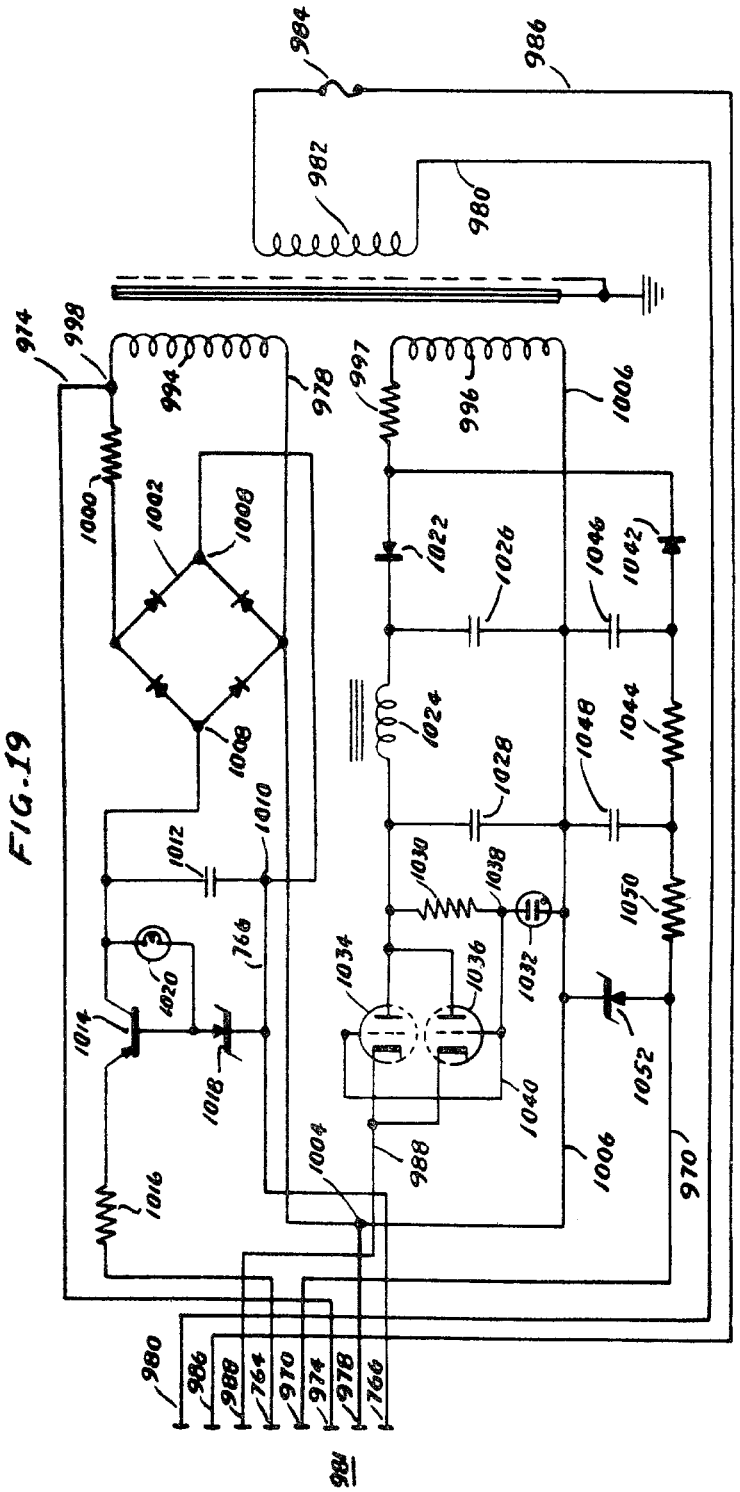

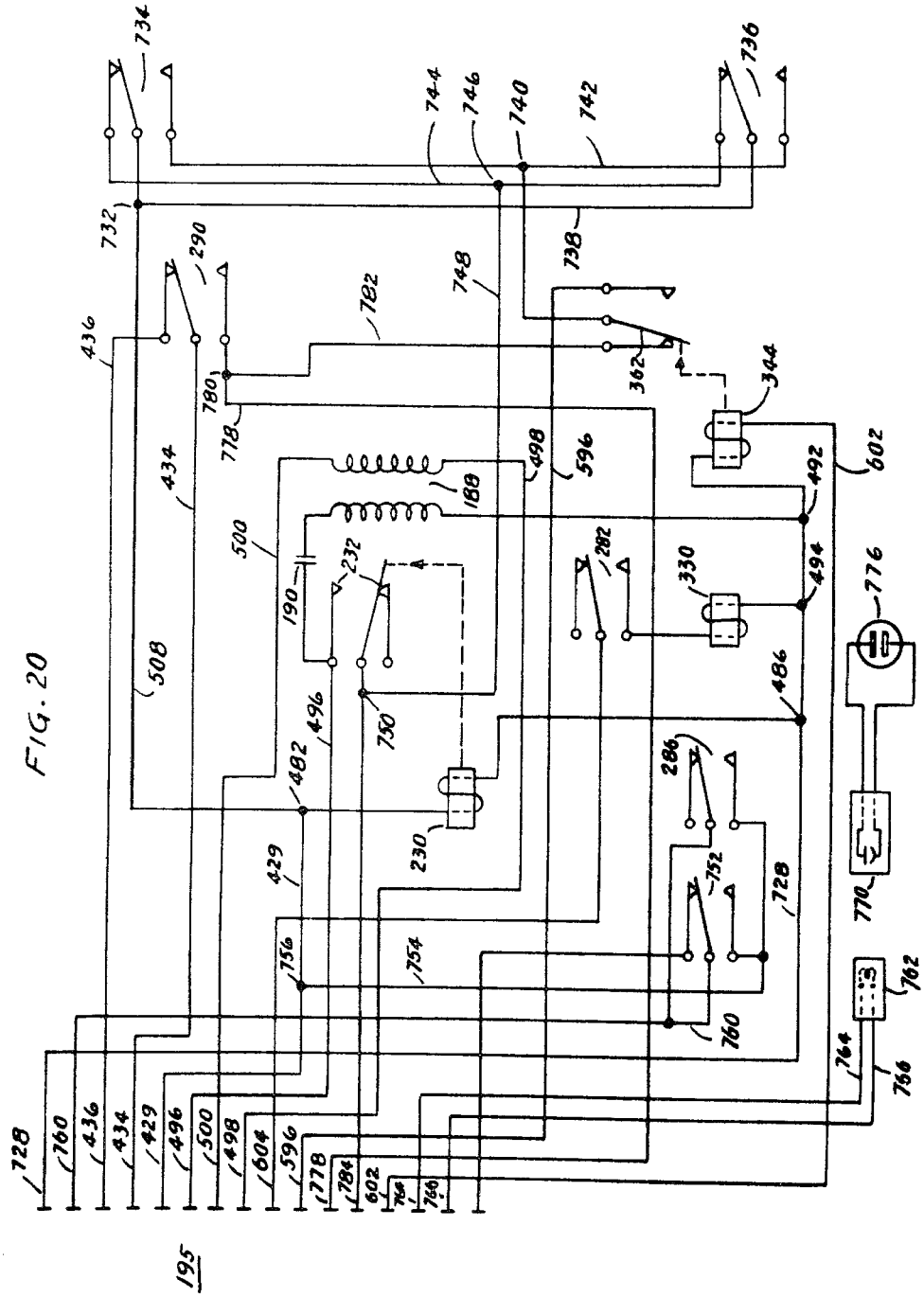

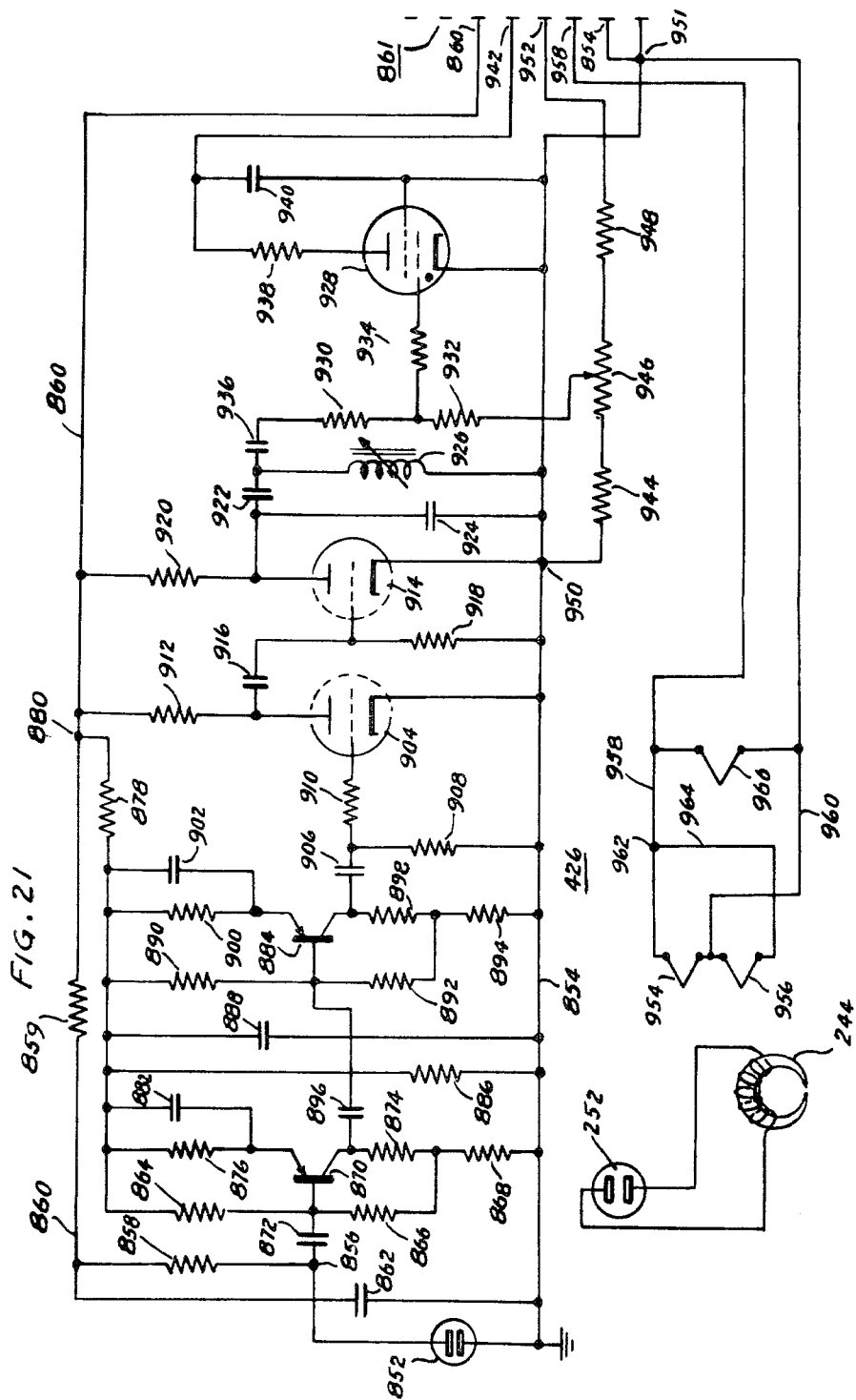

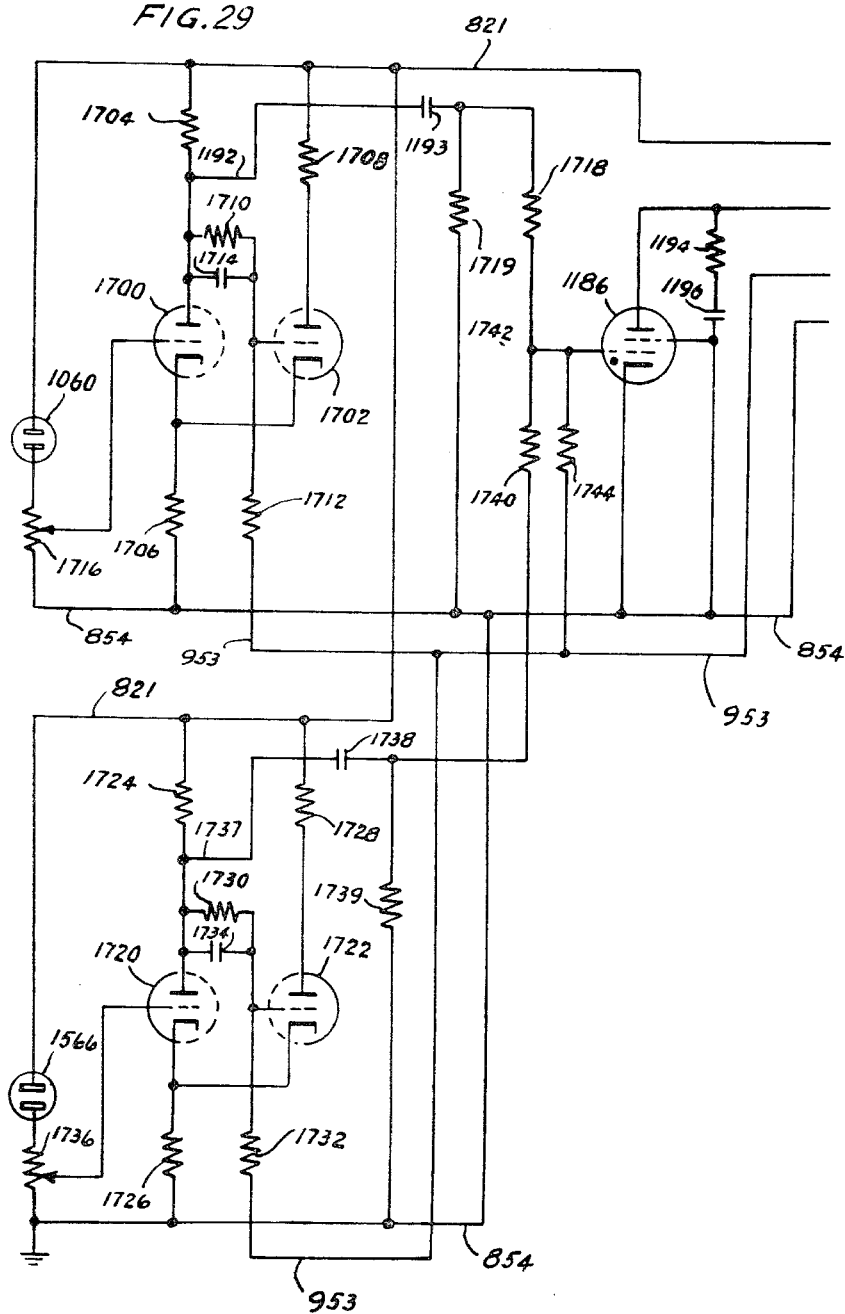

Feb. 22, 1966 W. S. HERMANN 3,236,377
CURRENCY DETECTORS

Original Filed Jan. 24, 1961 18 Sheets-Sheet 18

3,236,377
CURRENCY DETECTORS
William S. Hermann, Berkeley, Mo., assignor to National Rejectors, Inc., St. Louis, Mo., a corporation of Missouri
Original application Jan. 24, 1961, Ser. No. 84,643, now Patent No. 3,180,491, dated Apr. 27, 1965. Divided and this application Aug. 12, 1963, Ser. No. 301,486
7 Claims. (Cl. 209—111.6)

This application is a division of Donald M. Danko et al. application Serial No. 84,643 for Currency Detectors which was filed January 24, 1961, now Patent No. 3,180,491.

This invention relates to improvements in currency detectors. More particularly, this invention relates to improvements in methods and apparatus for identifying authentic paper currency.

It is therefore an object of the present invention to provide an improved method and apparatus for identifying authentic paper currency.

Each bill of the United States of America has one face thereof engraved with magnetic ink and has the other face thereof engraved with non-magnetic ink. As disclosed by the commonly assigned Smith et al. application Serial No. 849,066, for Currency Detectors which was filed on October 27, 1959, now abandoned, it is possible to move the magnetic face of an inserted bill past a magnetic head at a uniform rate of speed and thereby generate voltage variations which can be used to determine whether that bill is authentic or spurious. If no voltage variations are generated, the bill will be rejected. If the amplitudes of the voltage variations are too small, the bill will be rejected. If the amplitudes of the voltage variations are too large, the bill will be rejected. If too few voltage variations are generated, the bill will be rejected. Further, if the repetition rate of the voltage variations due to the inserted bill differs appreciably from the repetition rate of the voltage variations due to an authentic bill, the inserted bill will be rejected. As a result, currency detectors which move the magnetic face of a bill past a magnetic head at a uniform rate of speed, and thereby generate voltage variations which can be used to determine whether that bill is authentic or spurious, can effectively determine whether an inserted bill is authentic or spurious.

In the said Smith et al. application, the magnetic head engages the background of the portrait of the inserted bill and coacts with the vertical lines of that background to generate the required voltage variations. Where the spacings of the vertical lines in the portrait backgrounds of bills differ materially, it is possible to use the voltage variations to differentiate between bills of different denominations as well as to differentiate between authentic and spurious bills. For example, the spacings of the vertical lines in the portrait backgrounds of one dollar bills differ materially from the spacings of the vertical lines in the portrait backgrounds of five dollar bills, and hence it is easy to use the voltage variations to differentiate between one dollar bills and five dollar bills. However, where the spacings of the vertical lines in the portrait backgrounds of bills of different denomination do not differ materially, it is not practical to use the voltage variations to differentiate between those bills. Yet it would be desirable to be able to differentiate between bills of different denominations which have portrait backgrounds wherein the spacings of the vertical lines are similar. The present invention provided a currency detector that is able to differentiate between bills of different denominations which have portrait backgrounds wherein the spacings of the vertical lines are similar; and it does so by providing a currency detector which optically senses distinctive portions of the inserted bill. The currency detector provided by the present invention will thus provide magnetic sensing plus optical sensing of inserted bills. It is therefore an object of the present invention to provide a currency detector which provides magnetic sensing plus optical sensing of inserted bills.

The currency detector provided by the present invention magnetically senses the magnetic face of an inserted bill and optically senses the non-magnetic face of that bill. As a result, for a bill to be accepted, each of the faces thereof must conform to the corresponding face of an authentic bill. As a result, if a spurious bill could be made so one face thereof closely simulated the corresponding face of an authentic bill, that spurious bill would be detected and rejected by the currency detector provided by the present invention. It is therefore an object of the present invention to provide a currency detector that magnetically senses the magnetic face of an inserted bill and optically senses the non-magnetic face of that bill.

The currency detector provided by the present invention accomplishes both its magnetic sensing and its optical sensing within a relatively short, predetermined period of time; and that period of time is shorter than the period of time which a bill requires to move past the magnetic sensing and the optical sensing systems. If the required signal is not received from the magnetic sensing system within that short period of time, and if the required signal is not received from the optical sensing system within that short period of time, the bill will be rejected. This is desirable because it reduces the likelihood that a spurious bill could, by moving past the magnetic sensing and the optical sensing systems and then back again, produce signals which would enable that bill to be accepted. As a result, the currency detector provided by the present invention provides a high degree of protection against the acceptance of spurious bills. It is therefore an object of the present invention to provide a currency detector which accomplishes its magnetic sensing and its optical sensing within a relatively short, predetermined period of time.

The non-magnetic faces of bills of the United States of America have alternating white and green areas, and the spacings of these areas are distinctively different on bills of different denominations. The currency detector provided by the present invention utilizes an optical sensing system that can respond to those distinctively different spacings to identify bills of a desired denomination. It is therefore an object of the present invention to provide a currency detector which utilizes an optical sensing system that can respond to the spacings between the alternating white and green areas on the non-magnetic faces of bills to identify and accept such bills.

The spacings of the vertical lines in the portrait backgrounds of two dollar bills are so similar to the spacings of the vertical lines in the portrait backgrounds of some other bills that it is not practical to use the vertical lines in the backgrounds of two dollar bills to generate voltage variations that could differentiate two dollar bills from those other bills. Yet it would be desirable to provide a currency detector that could identify and accept two dollar bills. The present invention provides such a currency detector, and that currency detector magnetically senses the vertical lines in the portrait backgrounds of two dollar bills to obtain one accept signal and senses the spacings between predetermined green areas on the non-magnetic faces of those bills to obtain a second accept signal; and when both accept signals are received it accepts those bills. It is therefore an object of the present invention to provide a currency detector that magnetically senses the vertical lines in the portrait backgrounds of two dollar bills to obtain one accept signal and senses the spacings between predetermined green areas on the non-magnetic faces of those bills to obtain a second accept signal.

Other and further objects and advantages of the present invention should become apparent from an examination of the drawing and accompanying description.

In the drawing and accompanying description, several preferred embodiments of the present invention are shown and described but it is to be understood that the drawing and accompanying description are for the purpose of illustration only and do not limit the invention and that the invention will be defined by the appended claims.

In the drawing, FIG. 1 is a broken, plan view of one embodiment of bill-transporting device that is made in accordance with the principles and teachings of the present invention.

Figure 2:
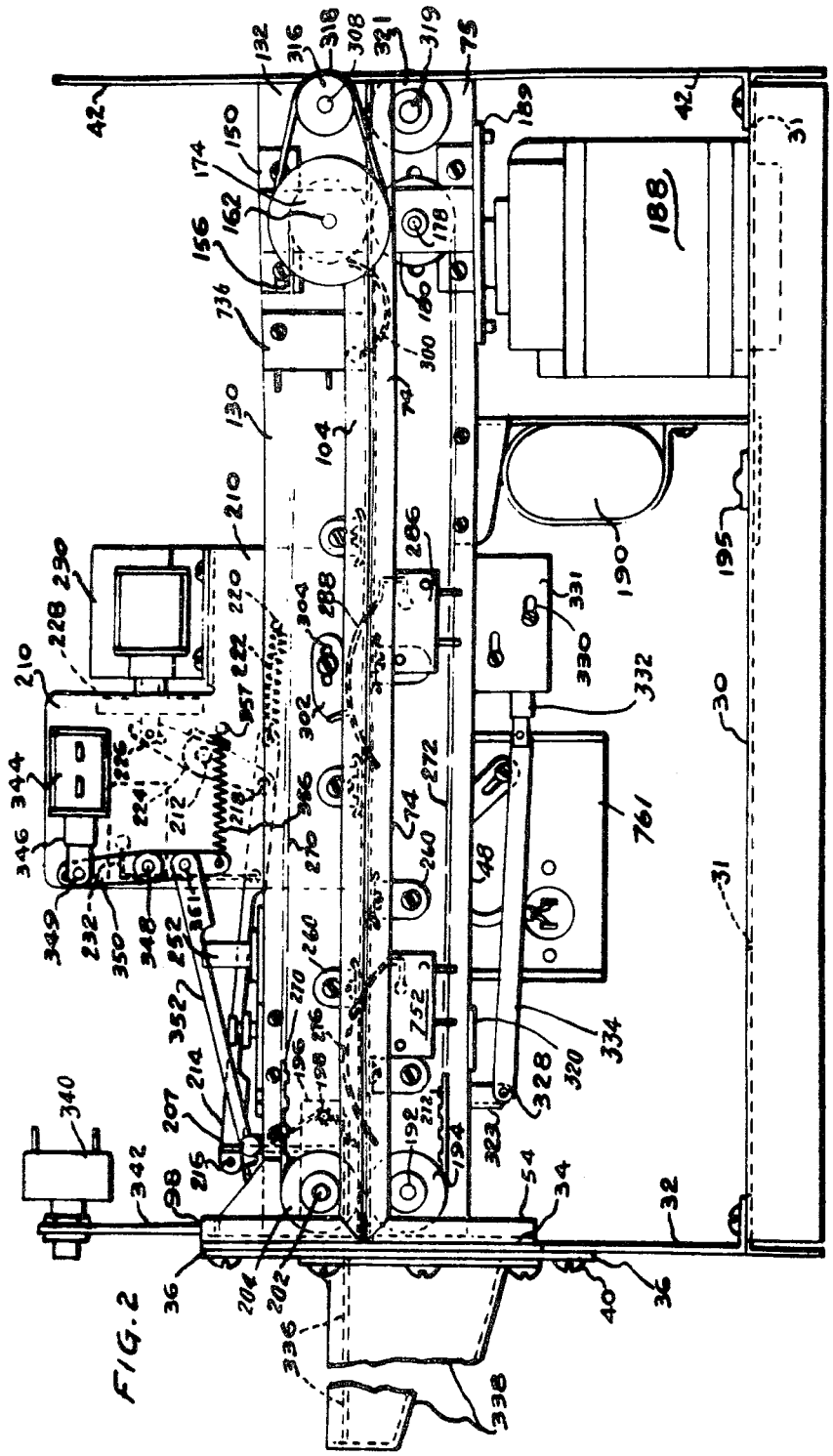
Figure 9:
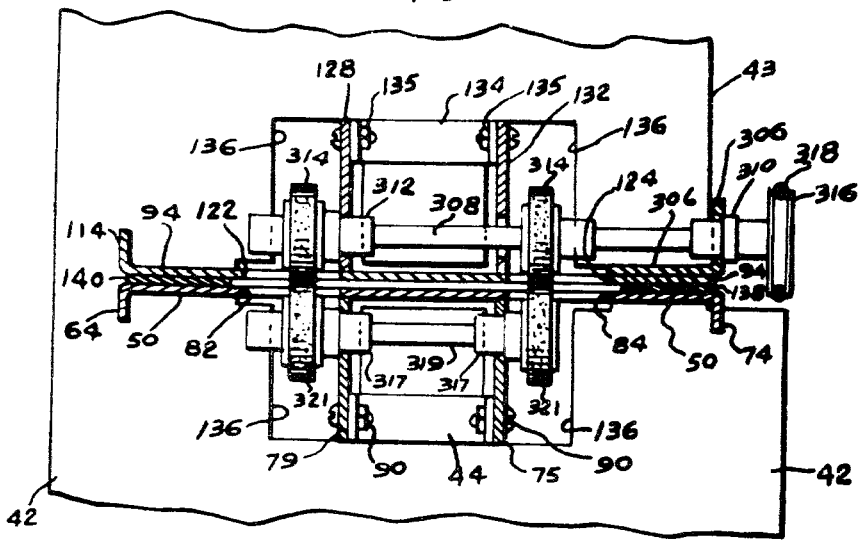
Figure 10:
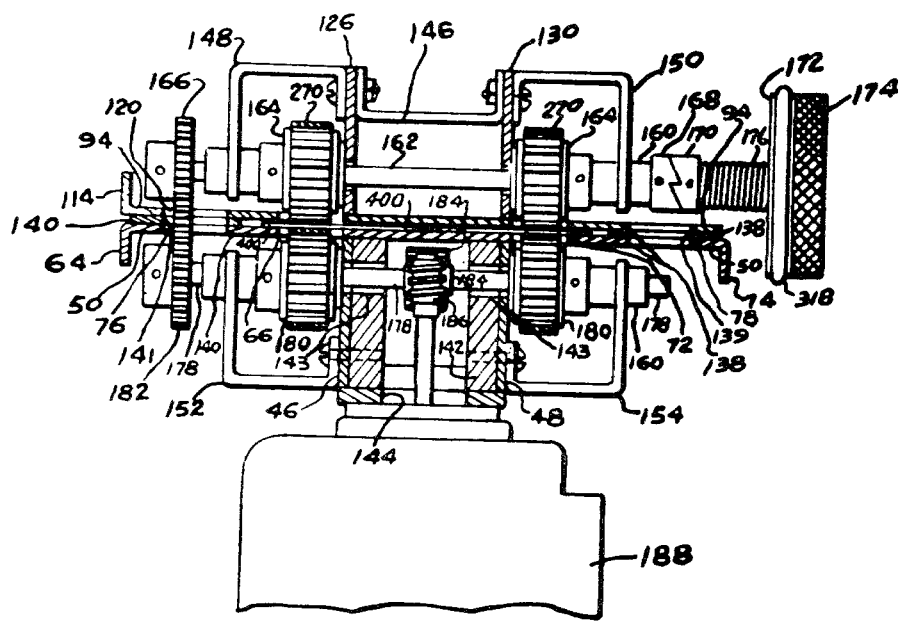
Figure 22:
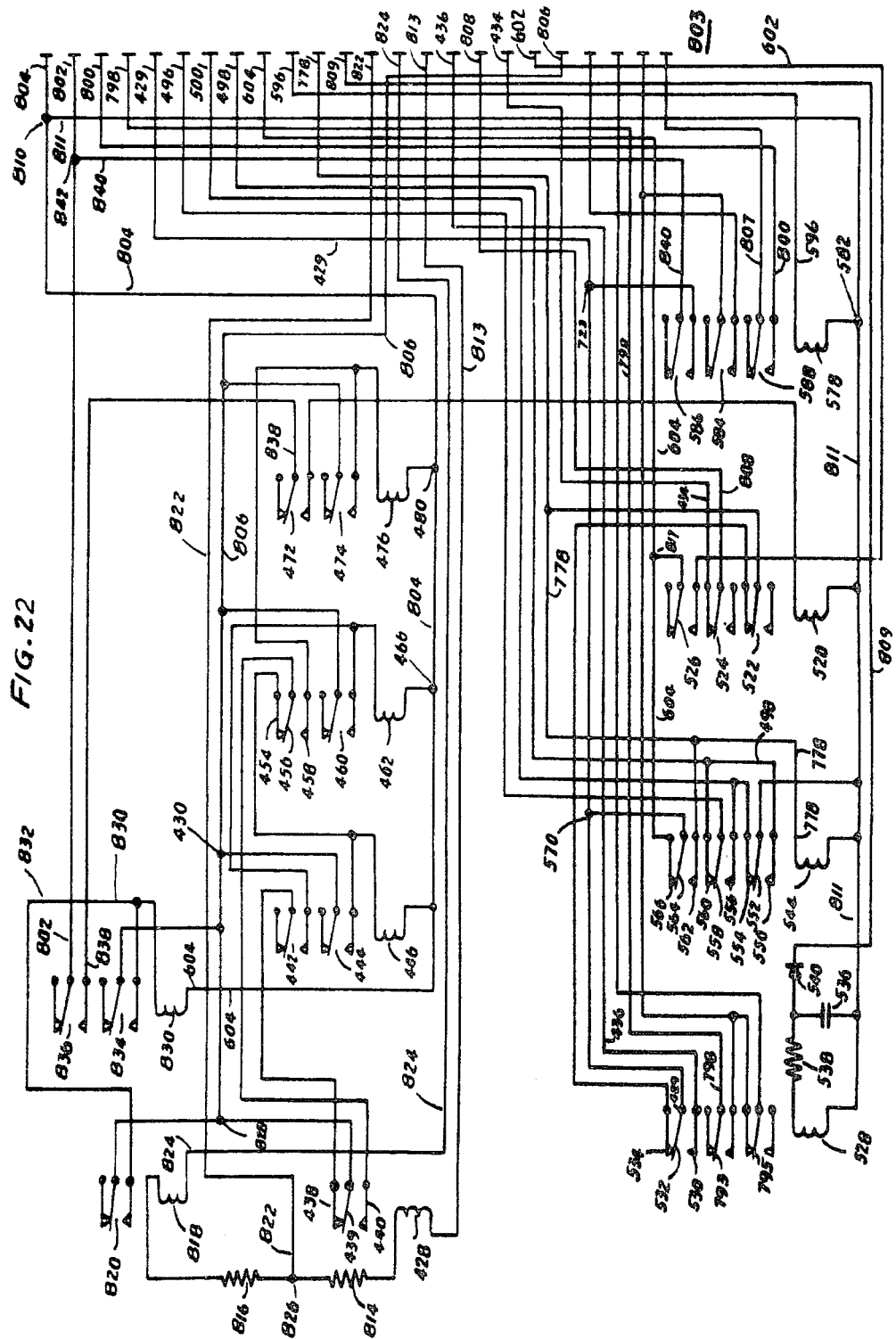
Figure 23:
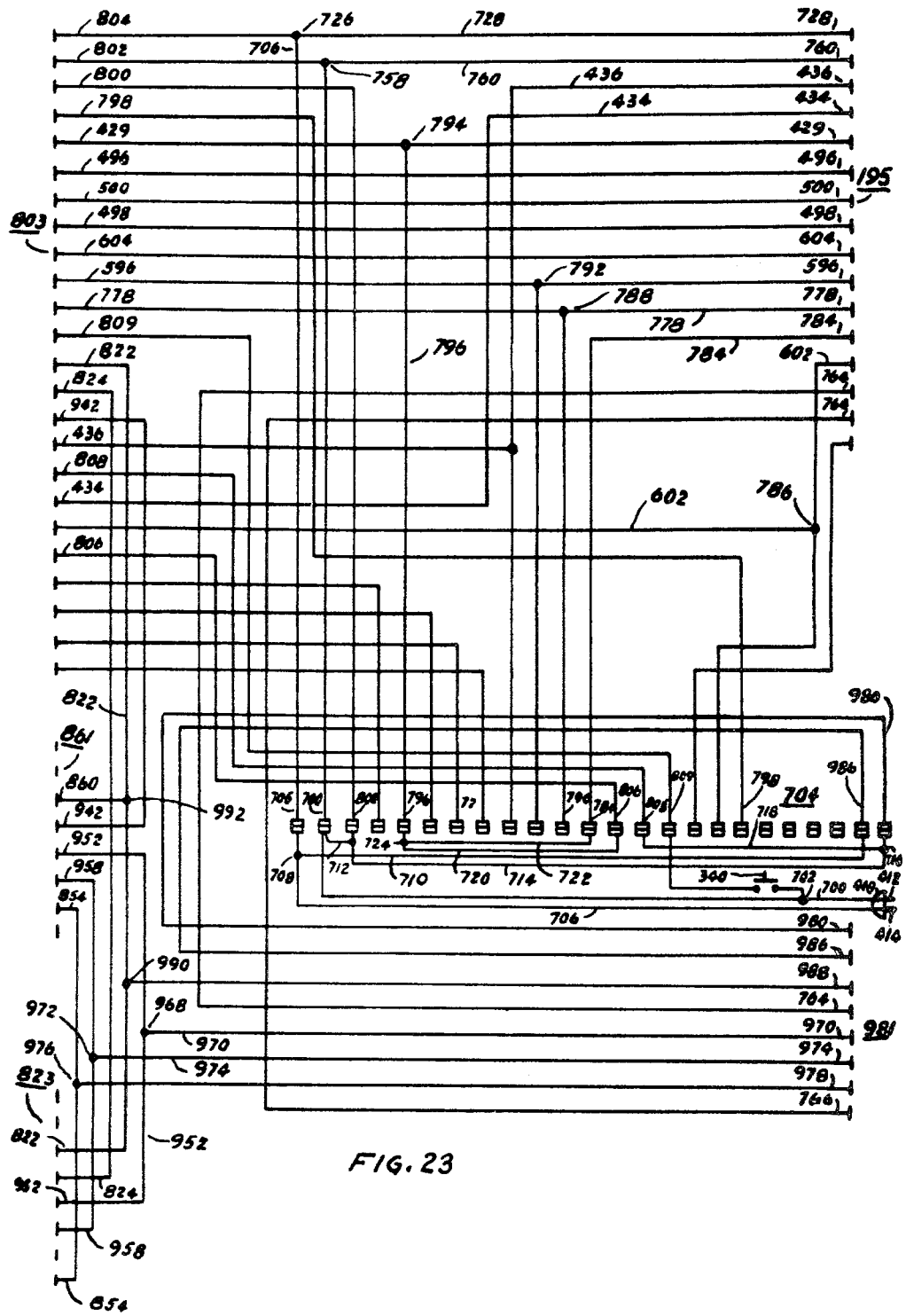
Figure 24:
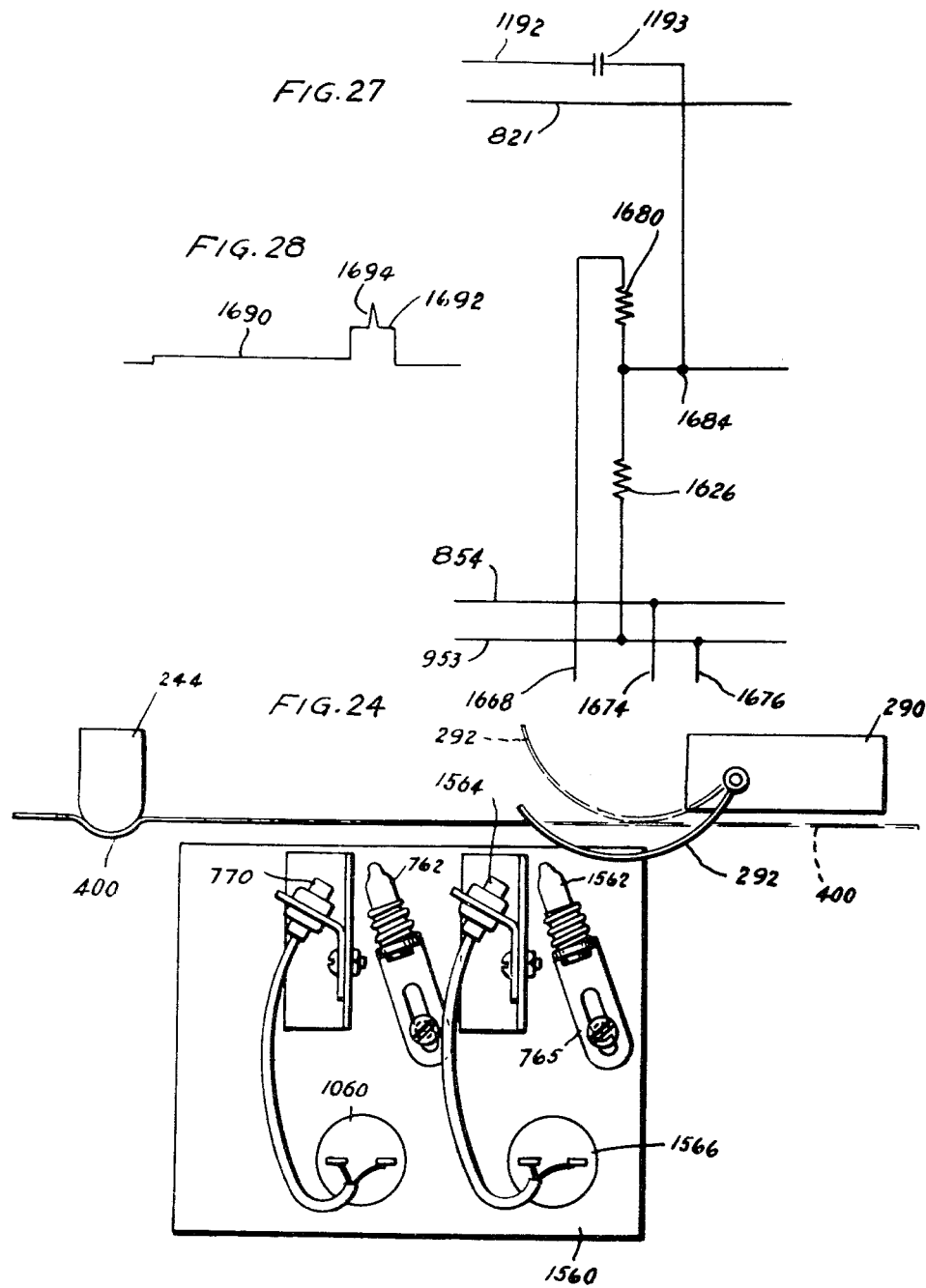
Figure 25:
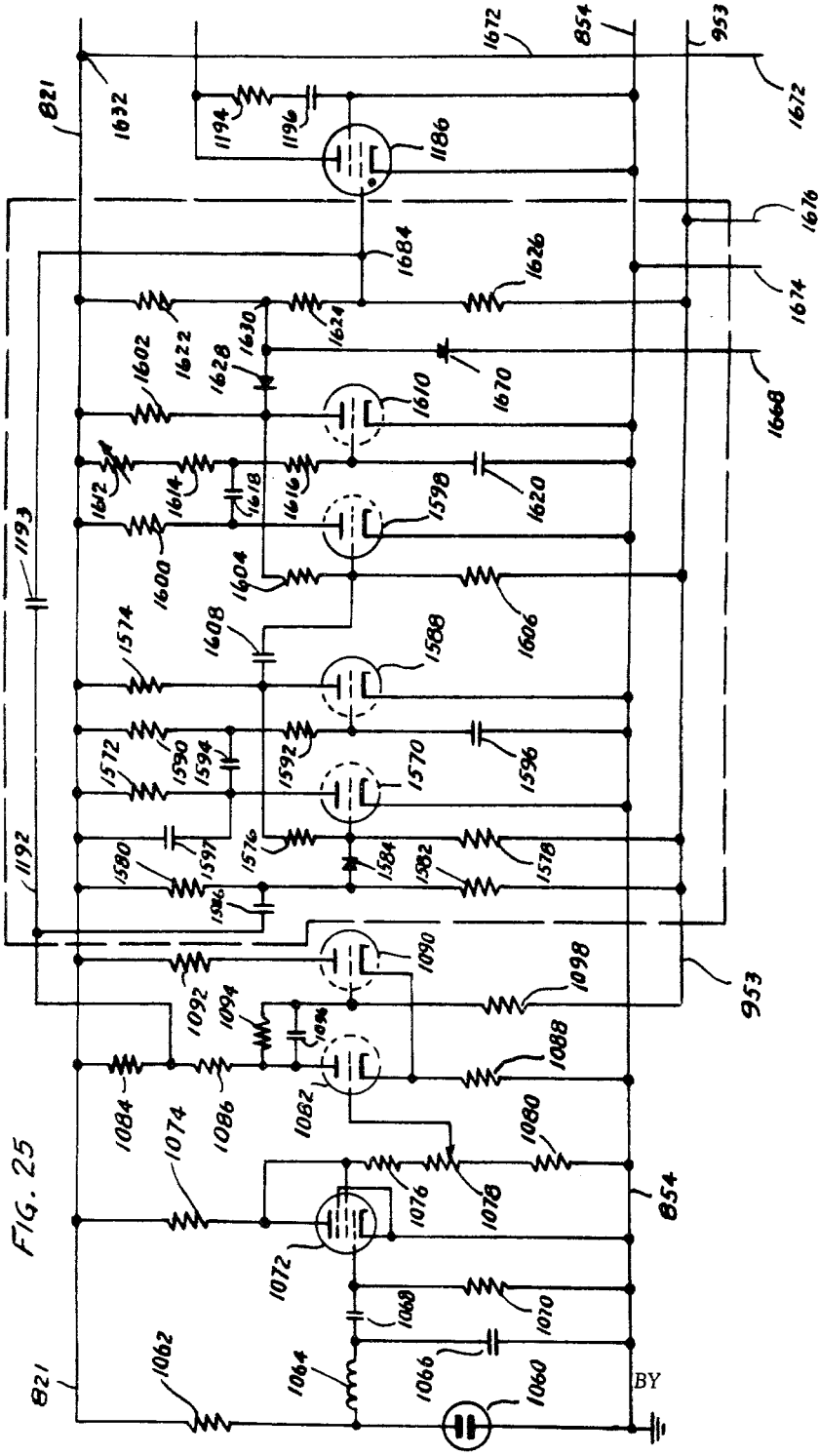
Figure 26:
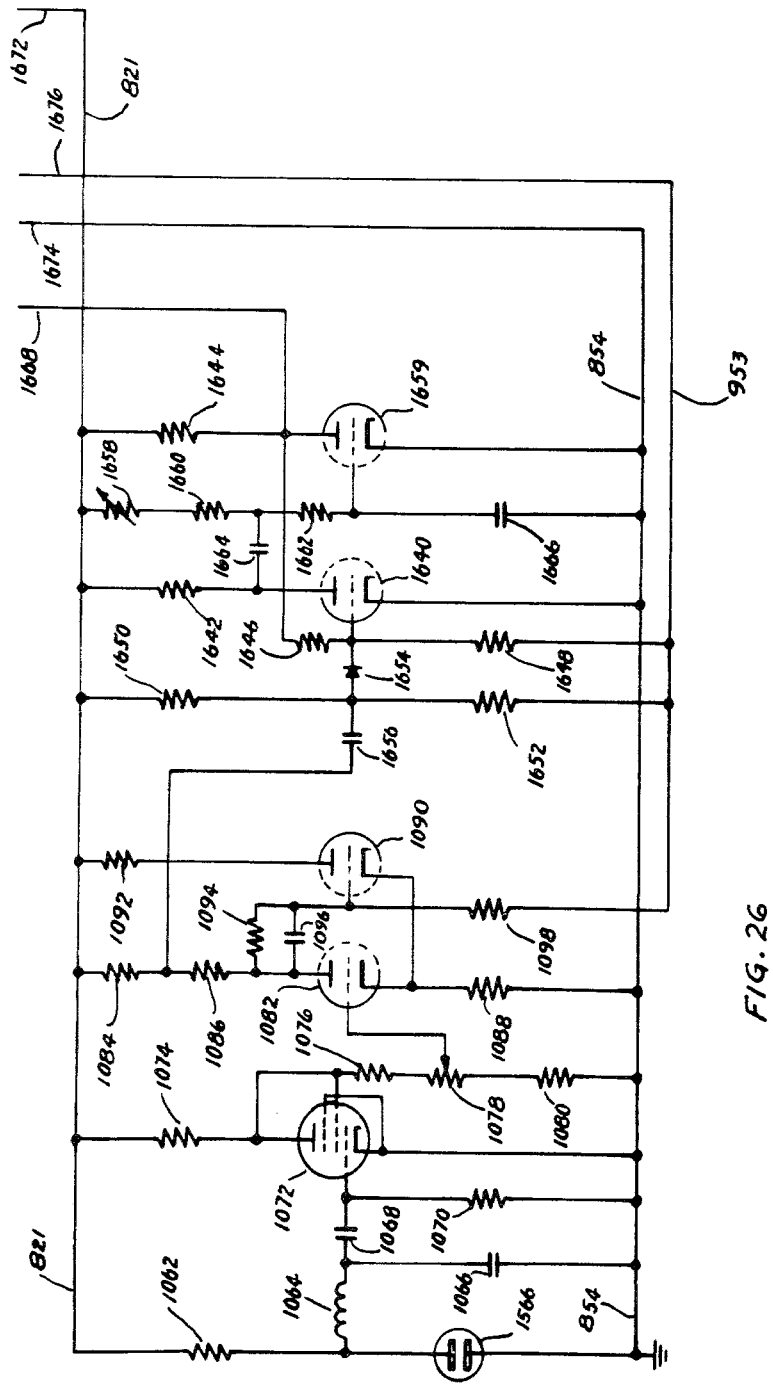
Figure 30:
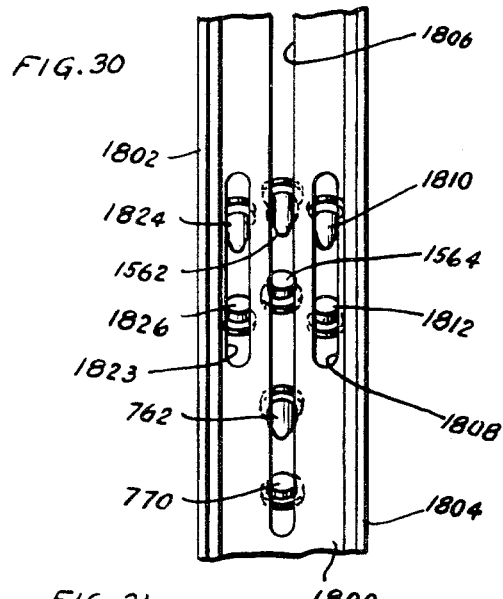
Figure 31:
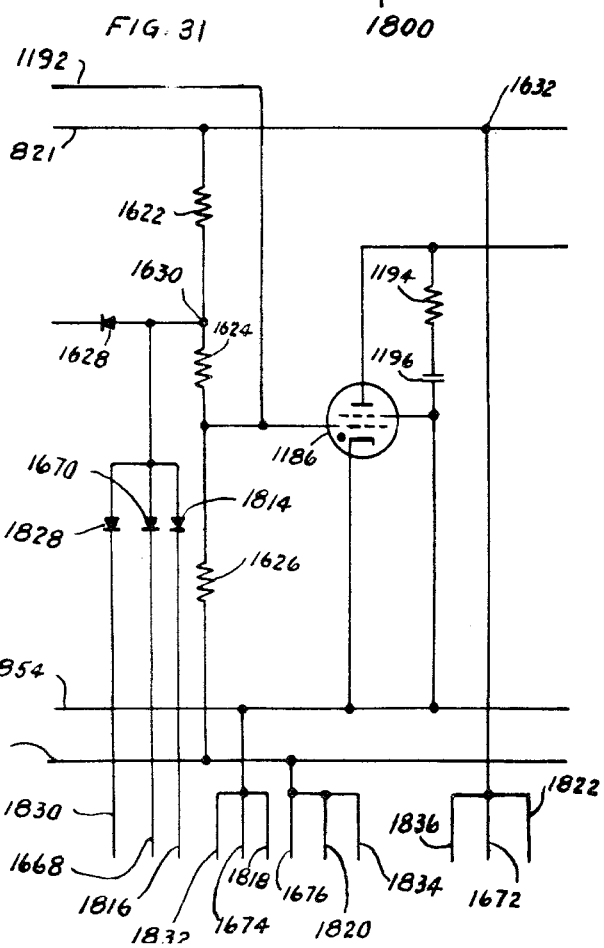

FIG. 2 is a broken, side elevational view of the embodiment of bill-transporting device shown in FIG. 1, FIG. 3 is a broken, sectional view through the embodiment of bill-transporting device shown in FIG. 1, and it is taken along the plane indicated by the line 3—3 in FIG. 1, FIG. 4 is a sectional view of a few of the components of FIG. 3, it is taken along the plane indicated by the line 3—3 in FIG. 1, and it shows the shaft-carrying bracket of FIG. 3 in lowered position, FIG. 5 is a broken, sectional view through the embodiment of bill-transporting device shown in FIG. 1, and it is taken along the plane indicated by the line 5—5 in FIG. 1, FIG. 6 is a sectional view, on a very large scale, through the embodiment of bill-transporting device shown in FIG. 1, and it is taken along the plane indicated by the line 6—6 in FIG. 5, FIG. 7 is a side elevational view of the lower platen and associated parts used in the embodiment of bill-transporting device shown in FIG. 1, FIG. 8 is a bottom view of the platen and associated parts shown in FIG. 7, FIG. 9 is a sectional view through the embodiment of bill-transporting device shown in FIG. 1, and it is taken along the plane indicated by the line 9—9 in FIG. 1, FIG. 10 is a sectional view through the embodiment of bill-transporting device shown in FIG. 1, and it is taken along the broken plane indicated by the line 10—10 in FIG. 1, FIG. 11 is a plan view, on an enlarged scale, through the bracket which holds the mounting for the magnetic head of the embodiment of bill-transporting device shown in FIG. 1, FIG. 12 is a sectional view, on a still larger scale, through the bracket of FIG. 11, and it is taken along the plane indicated by the line 12—12 in FIG. 11, FIG. 13 is an elevational view of the rear plate of the embodiment of bill-transporting device shown in FIG. 1, FIG. 14 is a sectional view, on a larger scale, through part of the embodiment of bill-transporting device shown in FIG. 1, and it is taken along the plane indicated by the line 14—14 in FIG. 1, FIG. 15 is a sectional view, on the scale of FIG. 14, through another part of the embodiment of bill-transporting device shown in FIG. 1, and it is taken along the plane indicated by the line 15—15 in FIG. 1, FIG. 16 is a side elevational view of a J-shaped bracket used in the embodiment of bill-transporting device shown in FIG. 1, FIG. 17 is a partially-sectioned side view of the platens of the embodiment of bill-transporting device shown in FIG. 1 after those platens have been rotated one hundred and eighty degrees about a vertical axis from the position shown by FIG. 2, and it shows the switches mounted on those platens, FIG. 18 is a front elevational view of the front plate of the bill-transporting device of FIG. 1 as it appears when the bill-supporting platform is removed, FIG. 19 is a schematic diagram of the power supply used with the embodiment of bill-transporting device of FIG. 1, FIG. 20 is a schematic diagram of the portion of the circuit of the embodiment of bill-transporting device of FIG. 1 which includes the motor, the solenoids and the bill-operated switches, FIG. 21 is a schematic diagram of the electronic circuit for the magnetic sensing system used in the embodiment of bill-transporting device of FIG. 1, FIG. 22 is a schematic diagram of the portion of the circuit of the embodiment of bill-transporting device of FIG. 1 which includes the relays, FIG. 23 shows the connections between the schematic diagrams of FIGS. 19–22, FIG. 24 is a schematic elevational view of the lamp and light-sensitive element used in the bill-transporting device of FIG. 1 and of a second lamp and of a second light-sensitive element mounted adjacent the first said lamp and light-sensitive element, FIG. 25 is a schematic diagram of an electronic circuit that is usable with one of the lamps and one of the light-sensitive elements shown in FIG. 24, FIG. 26 is a schematic diagram of an electronic circuit that is usable with the second lamp and the second light-sensitive element of FIG. 24, FIG. 27 is a schematic diagram of a substitute for a portion of the electronic circuit of FIG. 25, FIG. 28 shows the wave form that is supplied by the circuits of FIGS. 25 and 26 to fire the thyratron of FIG. 25, FIG. 29 is a schematic diagram of an electronic circuit that is usable with the two lamps and the two light-sensitive elements shown in FIG. 24, FIG. 30 is a broken plan view of part of the upper platen of the bill-transporting device of the present invention as that device is modified to accommodate three lamps and three light-sensitive elements, and FIG. 31 is a modification of part of the circuit of FIG. 25.

Referring to the drawing in detail, the numeral 30 denotes a base for one embodiment of currency identification device that is made in accordance with the principles and teachings of the present invention. That base is generally rectangular in plan, and it has a stiffening flange that extends downwardly from the sides and ends thereof. That base has a large opening 31 therein, and that opening begins at a point about one third of the way toward the rear of that base, and that opening extends almost all the way to the rear of that base.

The numeral 32 denotes a vertically-directed plate which has a horizontally-directed flange at the bottom thereof; and that flange serves as a foot. As indicated particularly by FIG. 2, the foot of the plate 32 is secured to the base 30 adjacent the front edge of that base. A plate 34 of U-shaped configuration is disposed above the plate 32, and that plate lies in the same plane as the lower plate 32. The closed end of the U-shaped plate 34 rests on the top of the plate 32, and the arms of that plate project upwardly from the plate 32. A front plate 36 overlies the front face of the plate 34, and also projects downwardly beyond the bottom of that plate to overlie the front portion of the upper part of the plate 32. A horizontally-directed opening 38 is formed in the plate 36, and that opening is wide enough to accommodate a two dollar bill when that bill is inserted lengthwise through that opening. Fasteners 40, shown in the form of machine screws, pass through openings adjacent the bottom of the front plate 36 and seat in threaded openings adjacent the upper end of the plate 32.

The numeral 42 denotes the rear plate for the embodiment of currency identification device shown by FIG. 1, and that plate has a horizontally-directed flange which acts as a foot. As indicated particularly by FIG. 2, the flange on the plate 42 is secured to the top of the base 30. The rear plate 42 is parallel to the plate 32, and it is in register with that plate. A U-shaped bracket 44 is suitably secured to the front face of the rear plate 42; and spot welds constitute a convenient way of securing that bracket to that plate. The upper right hand corner of the rear plate 42 is cut-away at 43, as shown particularly by FIG. 9.

The numeral 50 generally denotes a horizontally-directed platen which is disposed above and which is parallel to the base 30. That platen has a downwardly-extending wall portion 52 at the front thereof; and that wall portion has a vertical flange 54 at one side thereof, has a centrally-located rectangular opening 58 extending upwardly from the lower edge thereof, and has a vertical flange 62 at the other side thereof. The flanges 54 and 62 act to stiffen the wall portion 52. The platen 50 has a flange 64 which extends downwardly from one of the elongated sides thereof, and that flange is contiguous with the vertical flange 62 and extends almost all the way to the rear edge of that platen. An elongated opening 66 is formed in the platen 50, and that opening is parallel to the flange 64. An elongated slot 68 is formed in the platen 50, and that slot is formed at the longitudinally-extending center line of that platen. As indicated particularly by FIG. 8, the slot 68 is shorter than the opening 66. An opening 70 is provided in the platen 50 near the front of that platen; and that opening is in register with the elongated slot 68. That opening is wider than the slot 68, and it is intermediate that slot and the wall portion 52. A second elongated opening 72 is provided in the platen 50; and that opening is parallel to, and has the same length as, the opening 66. The openings 66 and 72 are disposed on opposite sides of the elongated slot 68. A flange 74 is formed at the other elongated side of the platen 50, and that flange extends downwardly to the level of the bottom edge of the flange 64. That flange is contiguous with the vertical flange 54 of the vertical wall portion 52, and it extends almost all the way to the rear edge of the platen 50. The flanges 64 and 74 reinforce and stiffen the platen 50. A rectangular opening 76 is formed adjacent the rear edge of the platen 50, and that opening is intermediate the flange 64 and the elongated opening 66. A similar opening 78 is provided in the platen 50 adjacent the rear edge thereof, and that opening is intermediate the elongated opening 72 and the flange 74. The platen 50 terminates in a downwardly-inclined trailing edge 80. A notch 82 is formed in the trailing edge of the platen 50, and that notch extends inwardly beyond the downwardly-inclined trailing edge 80 of that platen. Similarly, a notch 84 is formed in the trailing edge of the platen 50, and that notch extends inwardly beyond the downwardly-inclined trailing edge 80.

A vertical plate 46, which has a foot-like flange, is secured to the lower face of the platen 50 by that flange. Spot welds can be used to secure that foot-like flange to the lower face of that platen. In addition, the plate 46 has an ear 47, and that ear will be suitably secured to the platen 50. Similarly, a vertical plate 48, which has a foot-like flange, is secured to the lower face of the platen 50 by that foot-like flange. In addition, the plate 48 has an ear 49, and that ear is suitably secured to the platen 50. The ears 47 and 49 are spaced forwardly of the forward ends of the foot-like flanges on the plates 46 and 48, respectively; and those ears rigidly secure the forward ends of those plates to the platen 50. The foot-like flanges on the plates 46 and 48 are shorter than those plates, as indicated particularly by FIG. 8. The plates 46 and 48 are parallel to each other, and they abut the adjacent edges of the elongated openings 66 and 72. The plates 46 and 48 are shorter than the elongated openings 66 and 72; and those plates terminate short of the notches 82 and 84, respectively.

A short vertical plate 75 has a foot 77; and that foot is secured to the platen 50 by a fastener, such as a machine screw. The plate 75 is alined with the vertical plate 48; but it is spaced a short distance rearwardly of the trailing edge of that plate. The plate 75 extends to the rear edge of the platen 50. A short vertical plate 79 has a foot 81; and that foot is secured to the platen 50 by a fastener, such as a machine screw. The plate 79 is alined with the vertical plate 46; but it is spaced a short distance rearwardly of the trailing edge of that plate. The plate 79 extends to the rear edge of the platen 50. The space defined by the confronting edges of the plates 48 and 75 is in register with the space defined by the confronting edges of the plates 46 and 79.

A securing flange 86 is provided at the front of the plate 46, and a securing flange 88 is provided at the front of the plate 48. As indicated particularly by FIG. 8, those securing flanges are suitably secured to the rear face of the vertical wall portion 52 of the platen 50. The vertical plates 75 and 79 are secured to the U-shaped bracket 44 on the rear plate 42, as by fasteners 90; and since the plates 75 and 79 are fixedly secured to the platen 50, the securement of those plates to the bracket 44 fixedly secures that platen 50 to the rear plate 42. The wall portion 52 at the front of the platen 50 is rigidly secured to the front plate 36 and to the U-shaped plate 34 by suitable fasteners.

The numeral 94 generally denotes a horizontal platen that is substantially identical to the horizontal platen 50. The platen 94 has a wall portion 96 at the front thereof; but instead of extending downwardly from the plane of that platen, that wall portion extends upwardly from that plane. The wall portion 96 has a vertical flange 98 at one side thereof, has a centrally-located rectangular opening 100 extending downwardly from the upper edge thereof, and has a vertical flange 102 at the other side thereof. The flanges 98 and 102 act to stiffen the wall portion 96 of the platen 94. The platen 94 has a flange 104 which extends upwardly from one of the elongated sides thereof; and that flange is contiguous with the vertical flange 98. The flange 104 extends toward the rear of the platen 94, but it terminates at a point indicated by the numeral 105. An elongated opening 106, identical to the elongated opening 72, is formed in the platen 94; and that opening will be set in register with the elongated opening 66. An elongated slot 108, which is identical to the elongated slot 68 in the platen 50, will be set in register with that elongated slot. An opening 110 is provided in the platen 94; and that opening is identical to, and will be set in register with, the opening 70 in the platen 50. A second elongated opening 112 is formed in the platen 94, and that opening is identical to the opening 66; and that opening will be set in register with the opening 72 in the platen 50. A flange 114 is formed at the other elongated side of the platen 94, and that flange extends upwardly to the level of the upper edge of the flange 104. That flange is contiguous with the vertical flange 102 on the wall portion 96, and it extends almost all the way to the rear edge of the platen 94. The flanges 104 and 114 reinforce and stiffen the platen 94. Openings 116 and 118 are provided in the platen 94 adjacent the rear thereof, and those openings are identical to the openings 76 and 78 in the platen 50. The opening 116 is in register with the opening 76 and the opening 118 is in register with the opening 78. The platen 94 is provided with an upwardly-inclined trailing edge 120; and notches 122 and 124 extend inwardly through that trailing edge and into the horizontally-directed portion of the platen 94.

The numeral 126 denotes a vertical plate which has a foot-like flange, and that flange is secured to the upper face of the platen 94. That plate also has an ear and a securing flange, not shown, that are identical to the ear 49 and the securing flange 88 of the vertical plate 48. The numeral 130 denotes a second vertical plate which has a foot-like flange; and that flange also is secured to the upper face of the platen 94. That plate has an ear and a securing flange, not shown, that are identical to the ear 47 and the securing flange 86 of the vertical plate 46. The vertical plates 126 and 130 are disposed in parallel to each other, and they abut the adjacent edges of the elongated openings 106 and 112, respectively, in the platen 94. The vertical plates 126 and 130 are shorter than the elongated openings 106 and 112; and those plates terminate short of the notches 122 and 124, respectively.

A short vertical plate 128 has a foot formed on it; and that foot is secured to the platen 94 by a fastener, such as a machine screw. The plate 128 is alined with the vertical plate 126; but it is spaced a short distance rearwardly of the trailing edge of that plate. The plate 128 extends to the rear edge of the platen 94. A short vertical plate 132 has a foot formed on it; and that foot is secured to the platen 94 by a fastener, such as a machine screw. The plate 132 is alined with the vertical plate 130; but it is spaced a short distance rearwardly of the trailing edge of that plate. The plate 132 extends to the rear edge of the platen 94. The space defined by the confronting edges of the plates 126 and 128 is in register with the space defined by the confronting edges of the plates 130 and 132.

The securing flanges at the leading edges of the vertical plates 126 and 130 are suitably secured to the rear face of the vertical wall portion 96 of the platen 94. That vertical wall portion is suitably secured to the front plate 36 and to the arms of the U-shaped plate 34 by suitable fasteners; and hence the platen 94 and the vertical plates 126 and 130 thereon are fixedly secured to the front plate 36. Fasteners 135 secure the short vertical plates 128 and 132 to a U-shaped bracket 134 that is spot welded to the front face of the rear plate 42. In this way the platen 94 and the short vertical plates 128 and 132 thereon are fixedly secured to the rear plate 42.

The platens 50 and 94 fixedly and rigidly hold the upper end of the rear plate 42 in spaced relation to the front plate 36. In doing so, they coact with the base 30 to provide a light-weight but rigid frame for the bill-transporting device of FIG. 1. To minimize the flow of magnetoelectric currents through that frame, the platens or the front plate or the rear plate or the base should be made of a non-magnetic material.

The rear plate 42 has a generally H-shaped opening 136 therein. However, the cross bar of that opening extends outwardly beyond the vertical portions of that opening, as shown particularly by FIG. 13. That cross bar is dimensioned to accommodate an inserted two dollar bill when that bill is moved through that cross bar in a direction which is parallel to the elongated axis of that bill. The cross bar of the H-shaped opening 136 in the rear plate 42 is in direct alinement with the opening 38 in the front plate 36; and that cross bar and the opening 38 are in register with the space intermediate the upper surface of platen 50 and the lower surface of platen 94.

The numeral 138 denotes a guide plate which is mounted intermediate the upper surface of platen 50 and the lower surface of platen 94. That guide plate is as long as the platens 50 and 94, but it is much narrower.

Specifically, the guide plate 138 is narrower than that portion of the platen 50 which is intermediate the elongated opening 72 and the flange 74. One of the elongated sides of the guide plate 138 is in register with that side of platen 50 which has the flange 74 thereon; and the other elongated side of that guide plate is spaced from the adjacent edge of the elongated opening 72. An opening 139 is provided in the guide plate 138, and that opening is in register with the openings 78 and 118 in the platens 50 and 94, respectively; all as shown by FIG. 10. A second guide plate 140, which is identical to the guide plate 138, is also disposed intermediate the upper surface of the platen 50 and the lower surface of the platen 94. That guide plate has one of the elongated sides thereof in register with that side of the platen 50 which has the horizontal flange 64 thereon, and that guide plate has the other elongated side thereof spaced from the opening 66. The confronting elongated sides of the guide plates 138 and 140 are spaced apart a distance just slightly greater than the height of a bill. The guide plate 140 has an opening 141 therein, and that opening is in register with the openings 76 and 120 in the platens 50 and 94, respectively; all as shown by FIG. 10.

The space between the confronting edges of the vertical plates 126 and 128 and the space between the confronting edges of the vertical plates 130 and 132 are spanned by a U-shaped plate 146. That U-shaped plate abuts the confronting faces of the plates 126 and 130 and also abuts the faces of the plates 128 and 132; and that U-shaped plate is fixedly secured to those plates by fasteners, such as screws and nuts. That U-shaped plate helps hold the plate 128 in alinement with the plate 126 and helps hold the plate 132 in alinement with the plate 130.

The space between the confronting edges of the plates 48 and 75 and the space between the confronting edges of the plates 46 and 79 are spanned by a heavy-walled gear housing 142; all as shown by FIG. 10. That gear housing abuts the confronting faces of the plates 48 and 46 and also abuts the faces of the plates 75 and 79; and that gear housing is fixedly secured ot those plates by fasteners, such as machine screws. That gear housing helps hold the plate 75 in alinement with the plate 48 and helps hold the plate 79 in alinement with the plate 46. The sides of that gear housing having openings 143 therein, and the bottom of that housing has an opening 144 therein.

The numeral 148 denotes a J-shaped bracket which has a frusto-triangular closed end; and the short arm of that bracket is at the widest portion of that closed end. Similar J-shaped brackets are denoted by the numerals 150, 152 and 154. Each of the J-shaped brackets 148, 150, 152 and 154 has horizontal slots 156 in the short arm thereof, and those slots are parallel to the closed ends of those brackets. The long arms of the J-shaped brackets 148, 150, 152 and 154 have vertically directed notches 158 therein, as shown particularly by FIG. 16. The horizontal slots 156 in the short arms of the J-shaped brackets 148 and 150 accommodate the fasteners that secure the U-shaped plate 146 to the plates 126, 128, 130 and 132. The horizontal slots in the short arms of the J-shaped brackets 152 and 154 accommodate the fasteners which secure the gear housing 142 to the plates 46, 48, 75 and 79. The horizontal slots 156 permit limited movement of the J-shaped brackets 148, 150, 152 and 154 relative to the vertical plates 46, 48, 75, 79, 126, 128, 130 and 132 to permit the vertically-directed notches 158 of those brackets to be placed in register with the spaces defined by the confronting ends of plates 48 and 75, of plates 46 and 79, of plates 126 and 128, and of plates 130 and 132. The long arms of the J-shaped brackets 148 and 150 extend toward but terminate short of the upper surface of platen 94, and the long arms of the J-shaped brackets 152 and 154 extend toward but terminate short of the lower surface of the platen 50. Suitable bushings 160 are mounted within the notches 158 of the J-shaped brackets 148, 150, 152 and 154; and the bushings 160 in the notches of J-shaped brackets 148 and 150 rotatably support a shaft 162. Timing belt pulleys 164 are fixedly secured to that shaft, and those pulleys will be in register with the elongated openings 106 and 112 in the platen 94. A spur gear 166 is fixedly secured to one end of the shaft 162; and a ratchet-faced clutch member 168 is secured to the shaft 162 intermediate the other end of that shaft and the bushing 160 which supports that other end of that shaft. A ratchet-faced clutch member 170 rotates freely on the shaft 162, and the ratchet-face of that clutch member confronts and can engage the ratchet face of the clutch member 168. A large diameter pulley 172 is mounted on and supported by the shaft 162, adjacent the said other end of that shaft; but that pulley is free to rotate relative to that shaft. A knurled hand wheel 174 is fixedly secured to the said other end of the shaft 162, and that hand wheel can be used to effect rotation of the shaft 162 whenever desired. A helical spring 176 is telescoped over the said other end of the shaft 162, and one end of that spring is seated in a socket in the clutch member 170 while the other end of that spring is seated in a socket in the large diameter pulley 172. That spring is wound in such a way that it will tend to wind tightly if the large diameter pulley 172 is held stationary while the shaft 162 rotates in the counter clockwise direction in FIG. 2.

The numeral 178 denotes a shaft which is held by the bushings 160 that are disposed within the vertical notches 158 of the J-shaped brackets 152 and 154. That shaft is located below the level of, and in vertical registry with, the shaft 162; and that shaft extends through the openings 143 in the gear housing 142. The shaft 178 has timing belt pulleys 180 fixedly secured thereto, and those pulleys are in register with the elongated openings 66 and 72 in the platen 50. A spur gear 182 is mounted on one end of the shaft 178, and that gear meshes with the spur gear 166 on the one end of the shaft 162. A worm wheel 184 is mounted on the shaft 178, and that gear is disposed within the gear housing 142. That worm wheel meshes with, and is driven by, a worm gear 186 which is mounted on the shaft of a motor 188. That motor shaft is vertically directed, and it extends upwardly through the opening 144 in the bottom of the gear housing 142. The motor 188 is suitably secured to, and it depends downwardly from, the gear housing 142. That motor is long enough to extend down into the large opening 31 in the base 30, but it is short enough so it does not extend down below the level of the lower edges of the flanges on that base.

The motor 188 is a capacitor-start, capacitor-run synchronous motor. A capacitor 190 is connected in series with the displaced phase winding of that motor, and that capacitor is mounted on a bracket adjacent that motor. That bracket is secured to, and depends downwardly from, the vertical plates 46 and 48. That bracket also supports a multiprong connector 195; and the various electrical components of the bill-transporting device of FIG. 1 are connected to appropriate prongs of that connector, as shown by FIG. 20.

The numeral 191 denotes a U-shaped bracket which is disposed between the vertical plates 46 and 48 on the platen 50; and the arms of that bracket about the confronting faces of those plates. As shown by FIG. 3, that bracket is close to the front plate 36; and that bracket supports bushings which accommodate a horizontally-directed pivot 192. That pivot has timing belt pulleys 194 rotatably mounted thereon, and those pulleys are in register with the elongated openings 66 and 72 in the platen 50.

The numeral 196 denotes a U-shaped bracket which is disposed between the vertical plates 126 and 130; and that bracket is narrower than the space between those plates. A pivot 198 extends between and is supported by the vertical plates 126 and 130; and that pivot extends through the arms of the U-shaped bracket 196. As a result, that bracket can rotate about that pivot and thus can rotate relative to the plates 126 and 130. A pivot 200 extends between and is secured to the vertical plates 126 and 130 at a point above the top of the bracket 196; and springs 208 are wound around the pivot 198 and have the upper ends thereof bearing against the pivot 200 while having the lower ends thereof bearing against the closed end of the bracket 196. Those springs bias the bracket 196 for rotation in the counter clockwise direction in FIGS. 3 and 4 and thus bias that bracket toward the lowered position shown by FIG. 4. However, those springs can yield to permit the U-shaped bracket 196 to rotate to the raised position shown by FIG. 3.

The bracket 196 carries bushings which support an elongated pivot 202. The ends of that pivot extend through openings in the vertical plates 126 and 130; and those openings are considerably larger than the diameter of the pivot 202. As a result, the U-shaped bracket 196 can rotate a limited number of degrees about the pivot 198 without having the pivot 202 engage the openings in the plates 126 and 130.

The bushings which are carried by the U-shaped bracket 196 also support a U-shaped bracket 206. The latter bracket is narrower than the bracket 196; and hence the bracket 206 can be disposed between the arms of the bracket 196. The bracket 206 rotates about the pivot 202 and thus can rotate relative to the bracket 196; and the bracket 206 can have the right-hand edge of the bottom thereof abutting the closed end of bracket 196, as shown by FIG. 3, or can have that right-hand edge disposed a short distance above that closed end, as shown by FIG. 4. Whenever the bracket 206 has the right-hand edge of the bottom thereof disposed a short distance above the closed end of the bracket 196, the springs 208 will move the bracket 196 to the lowered position shown by FIG. 4. However, when the right-hand edge of the bottom of the bracket 206 is in engagement with the closed end of the bracket 196, and when the bracket 206 is then rotated in the clockwise direction, the bracket 196 will be moved to the raised position shown by FIG. 3. As a result, the bracket 206 can be used to effect raising of the left-hand end of the bracket 196, and thus to effect the raising of the pivot 202. The U-shaped bracket 206 has an upwardly-projecting arm 207 and that arm can be moved to the right in FIG. 4 to rock the brackets 206 and 196 from the positions shown in FIG. 4 to the positions shown by FIG. 3.

Timing belt pulleys 204 are rotatably mounted on the outer ends of the pivot 202; and those pulleys will move up and down as the brackets 206 and 196 raise and lower the pivot 202. The pulleys 204 are mounted in register with the elongated openings 106 and 112 in the platen 94.

The numeral 210 denotes a mounting bracket that is secured to, but is laterally spaced from, the vertical plate 126; and that mounting plate projects upwardly above the top of the plate 126. A horizontally-directed pivot 212 is supported by the mounting bracket 210; and a lever 224 is rotatably mounted on that pivot. A connecting rod 214 extends between the upwardly-extending arm 207 of the bracket 206 and the lower end of the lever 224; and pin joints 216 and 218 connect that rod with that upwardly-projecting arm and with that lever, respectively. The connecting rod 214 extends to the right beyond the lower end of the lever 224, as shown particularly by FIG. 2; and the right-hand end of that rod has an opening in which one end of a helical extension spring 222 is hooked. The other end of that spring is hooked around a pin 220 which is secured to the mounting bracket 210.

The lever 224 has a slot 226 in the upper end thereof, and that slot accommodates a pin which is carried by the plunger 228 of a solenoid 230. That solenoid is suitably secured to and supported by the mounting bracket 210; and that solenoid can be energized to retract the plunger 228 and thereby rotate the lever 224 a distance in the clockwise direction in FIG. 2. A switch 232 is suitably secured to the mounting bracket 210; and the actuator 234 of that switch extends into a hole in the connecting rod 214.

The spring 222 normally holds the connecting rod 214, the lever 224, and the plunger 228 in the positions shown by FIG. 2; and, in doing so, that spring normally holds the bracket 206 in the position shown by FIG. 3. This means that under normal conditions the spring causes the bracket 206 to hold the bracket 196 and the pivot 202 in their raised positions. The force of the spring 222 will be overcome by the solenoid 230 whenever the latter is energized; and hence that solenoid can cause the bracket 206 to rotate to the position shown by FIG. 4. As that bracket so rotates, it will enable the springs 208 to lower the bracket 196 and the pivot 202 to the positions shown by FIG. 4. The energization of the solenoid 230 will also cause the connecting rod 214 to move the actuator 234 far enough to close the contacts of the normally-open switch 232.

The numeral 236 denotes a bracket which is secured to, and which spans the space between, the vertical plates 126 and 130. That bracket has downwardly depending legs 238 which are spaced apart; and those legs have slots 240 therein. Those slots accommodate projections 243 on a mounting 242 for a magnetic head 244; and those slots and those projections guide the vertical movement of that mounting. A helical compression spring 246 biases the mounting 242, and thus the magnetic head 244, downwardly relative to the bracket 236; and hence that spring biases that head downwardly relative to the platen 94. However, the spring 246 can yield to permit upward movement of the mounting 242 and of the magnetic head 244. An adjusting screw 248 has the shank thereof passing through a threaded opening in the bracket 236, through the spring 246, and through an opening in the mounting 242. A washer is secured to the lower end of the screw 248; and that washer prevents accidental separation of the mounting 242 from the screw 248. A nut 250 is carried by the adjusting screw 248, and that nut can be used to lock that screw in position relative to the bracket 236. However that nut can be loosened to permit rotation, and thus vertical movement, of the screw 248 relative to the bracket 236. That vertical movement fixes the normal position of the magnetic head 244 relative to the platen 94.

The numeral 252 denotes a socket which can receive a connector that will serve to connect the magnetic head 244 into a suitable circuit. That socket is mounted on the bracket 236, and it is connected to the magnetic head 244 by two short wires. Those wires are readily flexible so they can permit movement of the magnetic head 244 relative to the platen 94.

The numeral 260 generally denotes a bracket that is L-shaped in configuration, as shown by FIG. 6. That bracket has a long horizontally-directed arm and has a short vertically-directed arm; and both of those arms have openings therein. The horizontally-directed arm also has leading and trailing edges 264 that incline upwardly from the plane of that arm. A hardened face plate 268 is suitably secured to the horizontally-directed arm of the bracket 260; and that hardened face plate is strongly resistant to wear. That face plate underlies part of that horizontally-directed arm and also underlies the upwardly inclined leading and trailing edges 264. That face plate also has a downwardly depending lip 266; and that lip will confront the innermost edge of one of the timing belts used in the bill-transporting device of FIG. 1.

A number of L-shaped brackets 260 are provided; and the long arms of those brackets are secured to the platens 94 and 50, and the short arms of those brackets are secured to the vertical plates 126, 130, 46 and 48. As indicated particularly by FIG. 1, the brackets 260 which are secured to the platen 94 are grouped in pairs that are spaced along the length of that platen, and the brackets of each pair are set opposite each other. Similarly, the brackets 260 which are secured to the platen 50 are grouped in pairs that are spaced along the length of that platen, and the brackets of each pair are set opposite each other. However, the pairs of brackets 260 which are secured to the platen 94 are displaced from the pairs of brackets 260 which are secured to the platen 50, all as shown by FIG. 5.

The numeral 270 denotes timing belts which extend around and are supported by the timing belt pulleys 204 and 164. The numeral 272 denotes timing belts which extend around and are supported by the timing belt pulleys 194 and 180. The timing belts 270 are mounted so the ribs thereon engage and pass under the hardened face plates 268 of the brackets 260 which are supported by the platen 94. The timing belts 272 are mounted so the ribs thereon engage and pass over the hardened face plates 268 of the brackets 260 which are supported by the platen 50. The hardened face plates 268 of the brackets 260 carried by the platen 50 define a horizontally-directed plane, and the hardened face plates 268 of the brackets 260 carried by the platen 94 define a second horizontally-defined plane; and the vertical distance between those two planes is less than twice the thickness of any of the timing belts 270 and 272. As a result, the timing belts 270 and 272 must bow downwardly to pass under the hardened face plates 268 of the brackets 260 secured to the platen 94 and must bow upwardly to pass over the hardened face plates 268 of the brackets 260 secured to the platen 50. The downward and upward bowing of the timing belts will alternate and will force those belts to undulate as they move relative to the platens 50 and 94. This undulation is very desirable because it recurrently forces the confronting faces of the timing belts 270 and 272 into intimate engagement with a bill interposed between those faces. If desired, rollers could be used instead of the brackets 260. However, while rollers would reduce the frictional forces applied to the timing belts 270 and 272, those forces have not been found to be particularly objectionable.

The timing belts 270 and 272 will be driven by the timing belt pulleys 164 and 180 mounted on the shafts 162 and 178, respectively. The shaft 178 will be directly driven by the motor 188, and the spur gears 182 and 166 will enable that shaft to drive the shaft 162. The gears 182 and 166 are important in keeping the belts 270 and 272 moving in synchrony with each other.

The numeral 752 denotes a switch that has an arcuate actuator 276. That switch is secured to the platen 50 adjacent the front of that platen, and the actuator of that switch extends upwardly into the openings 72 and 112. In doing so, that actuator extends into the path of movement of any bill that is inserted within the bill-transporting device of FIG. 1. The actuator 276 is immediately adjacent the belts 272 and 270 which are disposed within the openings 72 and 112, and hence the portion of the leading edge of the inserted bill which engages that actuator will be fully and completely supported by those belts. As a result, that portion of that leading edge will be able to resist any tendency to crumple or roll up as it engages and moves the actuator 276. The actuator 276 extends toward the wall portions 52 and 95, respectively, of the platens 50 and 94; and, consequently, that actuator as will be engaged and moved by an inserted bill almost as soon as the leading edge of that bill passes inwardly beyond those wall portions.

The numeral 282 denotes a switch that has an arcuate actuator 284. That switch is secured to the platen 50 about one quarter of the distance toward the rear of that platen, and the actuator 284 extends upwardly into the openings 106 and 66. That actuator is immediately adjacent the belts 270 and 272 which are disposed within those openings, and those belts will give full and complete support to the leading edge of any inserted bill. The actuator 284 extends rearwardly; and that actuator is thus, in part at least, disposed rearwardly of the actuator 280.

The numeral 286 denotes a switch that has an arcuate actuator 288. That switch is secured to the platen 50 at a point about one half of the distance toward the rear of that platen, and the actuator 288 extends upwardly into the openings 112 and 72. That actuator is immediately adjacent the belts 270 and 272 which are disposed within those openings, and those belts will give full and complete support to the leading edge of any inserted bill. The actuator 288 extends forwardly toward the front plate 36; and an inserted bill will engage that actuator while that bill is still engaging and holding the actuator 276 of the switch 752.

The numeral 290 denotes a switch that has an arcuate actuator 292. That switch is secured to the platen 94 at a point which is just a little further toward the rear of that platen than is the point at which the switch 286 is secured to that platen. The actuator 292 extends downwardly into the openings 106 and 66, and it extends rearwardly from that switch. That actuator is immediately adjacent the belts 270 and 272 which are disposed within the openings 106 and 66, and those belts will give full and complete support to the leading edge of any inserted bill.

The numeral 734 denotes a switch that has an arcuate actuator 296. That switch is secured to the platen 50 adjacent the rear of that platen, and the actuator of that switch extends into the openings 106 and 66. The actuator 296 extends rearwardly toward the rear of the platen 50, and it extends between the shafts 162 and 178. That actuator is immediately adjacent the belts 270 and 272 which are disposed within the openings 106 and 66, and those belts will give full and complete support to the leading edge of any inserted bill.

The numeral 736 denotes a switch that has an arcuate actuator 300. That switch is secured to the platen 94 adjacent the rear of that platen, and the actuator of that switch extends into the openings 112 and 72. The actuator 300 extends rearwardly toward the rear of the platen 94, and it extends between the shafts 162 and 178. That actuator is immediately adjacent the belts 270 and 272 which are disposed within the openings 112 and 72, and those belts will give full and complete support to the leading edge of any inserted bill.

The actuators 296 and 300 are opposite each other, and they will be engaged by the leading edge of an inserted bill at about the same time. Further, those actuators extend as close to the rear edges of the platens 50 and 94 as is practicable; and hence an inserted bill will hold those actuators in moved position until that bill has passed almost all the way through the opening 136 in the rear plate 42. The switches 734 and 736 are connected in parallel, as shown by FIG. 20; and hence the two of them can coact to provide a response to an inserted bill that has a corner which has been torn off or folded.

The actuate actuators 276, 284, 288, 292, 296 and 300 are bent to have large radii of curvature. Such large radii are desirable for two reasons: first, they enable those actuators to simulate shallow inclined planes and thus enable those actuators to move easily when they are engaged by the leading edge of an inserted bill; and second, they enable each of those actuators to maintain contact with the inserted bill throughout an appreciable portion of the path of movement of that bill.

Stops 302 are provided for some of the switch actuators, and those stops will be secured to the vertical plates 46, 48, 126 and 130 by machine screws or other suitable fasteners. Those stops will limit the extent to which those actuators project through the openings 66, 72, 106 and 112. Those stops have slots 304 therein, and those slots permit adjustments in the positions of those stops relative to the vertical plates 66, 72, 106 and 112. As a result, those stops facilitate the making of adjustments in the normal positions of the switch actuators.

The numeral 306 denotes a bearing bracket which is secured to the platen 94 adjacent the rear of that platen. That bracket is intermediate the opening 118 and the upwardly inclined trailing edge 120 of that platen. That bearing bracket suitably supports a bushing 310 which accommodates and rotatably supports one end of a shaft 308. A bushing 312 is carried by the vertical plate 128, and that bushing rotatably supports the other end of the shaft 308. That shaft has soft-faced rollers 314 fixedly secured thereto, and those rollers rotate with that shaft. The soft-faced rollers are immediately adjacent the outer faces of the vertical plates 126 and 130; and parts of those rollers extend into the opening 136. A small diameter pulley 316 is fixedly secured to and rotatable with the shaft 308, and that pulley is in alinement with the large diameter 172 that is loosely mounted on and carried by the shaft 162. An endless belt 318 extends around and is supported by the large diameter pulley 172 and by the small diameter pulley 316.

The vertical plates 75 and 79 support bushings 317, and those bushings rotatably support a shaft 319. That shaft is located below the level of, and is in vertical registry with, the shaft 308. Soft-faced rollers 321 are secured to and rotatable with the shaft 319; and those rollers engage and are driven by the soft-faced rollers 314 which rotate with the shaft 308. The diameters of the soft-faced rollers 314 and 321 are so large that the confronting faces of those rollers always abut and slightly deform each other.

The numeral 320 denotes a U-shaped bracket which is disposed between, and is secured to, the plates 46 and 48; and that bracket is disposed adjacent the front ends of those plates. A pivot 322 is supported by that bracket, and a carrier 323 is rotatably mounted on that pivot. That carrier is generally U-shaped; and that carrier supports a pivot 324. A soft-faced roller 326 is rotatably mounted on that pivot, and that soft-faced roller can be moved toward and away from the bottom face of the magnetic head 244 by appropriate rotation of the carrier 323.

A pin joint 328 is provided at the bottom of the carrier 323, and that pin joint is connected to one end of a connecting rod 334. The other end of that connecting rod is secured to the plunger 332 of a solenoid 330. That solenoid is fixedly secured to a small plate 331 which, in turn, is fixedly secured to the vertical plate 48; and the plate 331 extends downwardly from the plate 48.

The numeral 336 denotes a horizontal platform which projects outwardly from the front face 36 of the currency identification device, and that platform serves to support a bill which is to be tested by that device. A bracket 338 of attractive appearance surrounds and helps support the platform 336; and the upper edges of that bracket project upwardly beyond the upper face of that platform. Those edges help a patron aline a bill with the opening 38 in the front plate 36, and they also make certain that the patron will move the leading edge of that bill far enough through that opening to be intermediate the leading edges of the belts 270 and 272.

The numeral 342 denotes a bar which is secured to and which extends upwardly from the upstanding wall portion 96 of the platen 94. That bar has an opening in the top thereof, and that opening accommodates a push button 340. That push button will be mounted so patrons can have easy access to it.

The numeral 370 denotes a gate which is generally flat but which has a horizontally-directed ear 372 adjacent the top thereof. That gate is thinner than the U-shaped plate 34, and that gate is narrower than the horizontal distance between the upstanding arms of that plate. As a result, that gate can fit within the space defined by the arms by and the closed end of the U-shaped plate 34. The wall portion 96 of the platen 94 overlies part of the rear face of that gate but does not obstruct movement of that gate; and the front plate 36 overlies substantially all of the front face of that gate but does not obstruct movement of that gate. As a result, the gate 370 is held in a vertical position by, but is free to move vertically relative to, the front plate 36 and the wall portion 96 of the platen 94.

The gate 370 has an opening 374 therein, and that opening is made wide enough to accommodate a bill when that bill has its long axis perpendicular to the plane of that gate. That opening will normally be set in register with the opening 38 in the front plate 36, as shown by FIG. 14; but that opening can be moved downwardly out of register with the opening 38, as shown by FIG. 15. A switch 362 is mounted on the platen 94 adjacent the front of that platen, and the actuator 364 of that switch extends to, and is hooked through, an opening in the ear 372 on the gate 370. Whenever the gate 370 is in the raised position shown by FIG. 14, the movable contact of that switch will engage the left-hand fixed contact of that switch, as shown by FIG. 20; but whenever that gate is in the lowered position shown by FIG. 15, that movable contact will engage the right-hand fixed contact of that switch.

A solenoid 344 is supported on and carried by the mounting bracket 210; and, as shown by FIG. 1, that solenoid is at one face of that bracket while the switch 232 is at the other face of that bracket. The plunger 346 of the solenoid 344 is disposed adjacent the upper end of a rocker arm 350 which is rotatably supported by a pivot 348 that is carried by the mounting bracket 210. The upper end of that rocker arm is rotatably secured to the plunger 346 by a pin joint 349; and the lower end of that rocker arm is secured to one end of a connecting rod 352 by a pin joint 351.

The other end of that connecting rod is connected to an ear on a bracket 354 by means of a pin joint 355. That bracket is rotatably mounted on the pivot 200 which is held by the vertical plates 126 and 130; and that bracket has an extension 353 which underlies the ear 372 on the gate 370. A helical extension spring 356 has one end thereof hooked through an opening in the bottom of the rocker arm 350 and has the other end thereof hooked around a pin 357 that is secured to the mounting bracket 210. The spring 356 urges the rocker arm 350 for rotation in the counter clockwise direction, and also urges the connecting rod 352 for movement to the right, in FIG. 2. Such movement of that connecting rod will rotate the U-shaped bracket 354 to the dotted-line, raised position of FIG. 15. However, that spring can yield to permit that bracket to move to the solid-line, lowered position in FIG. 15. When the bracket 354 is in its raised position it will hold the ear 372 of the gate 370 up against the adjustable stop 360, shown in the form of a machine screw. That stop is suitably held by a bracket 361 which is secured to and supported by the vertical plate 130. A nut 363 can be tightened against the bracket 361 to prevent rotation of the stop 360, and thus prevent accidental shifting of the vertical position of that stop. When the bracket 354 is in its lowered position, the gate 370 will be free to move downwardly and sense for the presence or absence of a thread, tape or other member attached to the inserted bill.

The numeral 761 denotes a plate that is secured to, and that depends downwardly from, the plate 46 on the platen 50. The plate 761 has vertical flanges at the sides thereof which stiffen that plate; and that plate also has an ear 763 formed adjacent the upper edge thereof. That ear can be conveniently formed by punching it out of the upper edge of the plate 761; and that ear has an opening therein. A photo-sensitive element 770 is mounted within the opening in the ear 763; and that photo-sensitive element is in register with the slot 68 in the platen 50. The photo-sensitive element 770 is connected to a suitable plug 776.

A bracket 765 is suitably secured to the plate 761 by a fastener, such as a screw; and that bracket holds a small lamp 762 in register with the slot 68 in the platen 50. As indicated by FIG. 3, that lamp is inclined so it can direct light from lower right to upper left toward a bill that is passing between the platens 50 and 94. The photo-sensitive element 770 is inclined so it can receive light that is reflected from that bill. The lamp 762 and the photo-sensitive element 770 will be suitably shrouded to keep light from that lamp from passing directly to that photo-sensitive element. The bracket 765, the plate 761, the photo-sensitive element 770, and the lamp 762 are part of the invention claimed in the said Danko et al. application.

The numeral 769 denotes a strip of paper or other suitable material that is suitably secured to the foot-like flanges of the plates 126 and 130 of the upper platen 94, as shown by FIG. 3 and that is part of the invention claimed in an application for currency detectors which was filed on August 2, 1963, by Bernard S. Cahill. That normally intercepts the light from the lamp 762 and reflects it back to the light-sensitive element 770. That strip preferably has a color which has a value that approximates the average of the green values on the non-magnetic face of a two dollar bill.

Referring to FIG. 23, the numeral 410 denotes a male plug with prongs 412 and 414 that can be inserted into one of the standard A.C. outlet sockets of a building. The numeral 704 denotes a twenty-four terminal connector plug which has an upper and lower section. Referring to FIGS. 19 and 23, the numeral 981 denotes an eight terminal connector plug which has the left-hand section thereof in FIG. 23 and the right-hand section thereof in FIG. 19. FIGS. 20 and 23, respectively, show the right-hand and left-hand sections of a sixteen terminal connector plug 195; and FIGS. 21 and 23, respectively, show the left-hand and right-hand sections of an eight terminal connector plug 861. FIG. 23 shows the right-hand section of an eight terminal connector plug 823; and FIGS. 22 and 23, respectively, show the left-hand and right-hand sections of a twenty-four terminal connector plug 803.

A conductor 700 is connected to the prong 412, and that conductor extends to the second terminal of the lower section of connector plug 704. A bridging conductor 712 extends between that second terminal and a conductor 714 which extends between the third and the twenty-fourth terminals of the lower section of connector plug 704. A conductor 980 is connected to the twenty-fourth terminal of the upper section of connector plug 704; and that conductor extends to the first terminal of the left-hand section of connector plug 981. That conductor continues on from the first terminal of the right-hand section of connector plug 981 in FIG. 19 to one terminal of the primary winding 982 of a power transformer. A conductor 706 extends from prong 414 of plug 410 to the first terminal of the lower section of connector plug 704, and a junction 708 is provided in that conductor adjacent that terminal. A conductor 710 extends from that junction to the twenty-third terminal of the lower section of connector plug 704; and a conductor 986 extends from the twenty-third terminal of the upper section of connector plug 704 to the second terminal of the left-hand section of connector plug 981. The conductor 986 continues on from the second terminal of the right-hand section of connector plug 981 in FIG. 19, and that conductor is connected to the other terminal of the winding 982 by a fuse 984. As a result, whenever the plug 410 is associated with an appropriate outlet socket and the fuse is intact, the winding 982 will be energized.

The numeral 994 denotes a low voltage secondary winding for the transformer, of which the winding 982 is a part, and the numeral 996 denotes a high voltage secondary winding for that transformer. A resistor 1000 connects one of the input terminals of a bridge rectifier 1002 to the upper terminal of the secondary winding 994, and the other input terminal of that bridge rectifier is connected to the lower terminal of that winding by a conductor 978. That conductor extends on past a junction 1004 to the seventh terminal of the right-hand section of connector plug 981. One of the output terminals of the bridge rectifier 1002 is connected to the collector of a transistor 1014, and that terminal is denoted by the numeral 1008; and the other output terminal is connected to the base of that transistor by a junction 1010, a conductor 766, and a zener diode 1018, and that other terminal is denoted by the numeral 1009. The conductor 766 extends on to the eighth terminal of the right-hand section of connector plug 981. An incandescent lamp 1020 is connected intermediate the base and the collector of the transistor 1014;

and that lamp is connected in series with the zener diode 1018 across the output of the bridge rectifier 1002. A capacitor 1012 is connected in parallel with the series-connected lamp 1020 and zener diode 1018. The emitter of the transistor 1014 is connected to the fourth terminal of the right-hand section of connector plug 981 by a resistor 1016 and a conductor 764.

The full-wave, rectified current from the bridge rectifier 1002 flows through the serially-connected zener diode 1018 and lamp 1020. That lamp has a non-linear resistance characteristic; and as the voltage across the output terminals 1008 and 1009 increases, the resulting increased resistance of that lamp will coact with the zener diode to maintain a substantially fixed voltage at the base of the transistor 1014. As a result, the lamp 1020, the zener diode 1018 and the transistor 1014 will coact to reduce ripple and voltage variations in the current flowing from the bridge rectifier 1002. Further, they will tend to supply a regulated, low value, D.C. voltage to the fourth and eighth terminals of the right-hand section of connector plug 981. The capacitor 1012 tends to provide a filtering action for the current flowing from the bridge rectifier 1002 to the series-connected zener diode 1018 and lamp 1020.

A conductor 974 is connected intermediate a junction 998, adjacent the upper end of the secondary winding 994, and the sixth terminal of the right-hand section of connector plug 981. That conductor will coact with the conductor 978 to supply low voltage A.C. to the sixth and seventh terminals of the right-hand section of connector plug 981.

The upper terminal of the high voltage secondary winding 996 is connected to a filter, consisting of inductor 1024 and capacitors 1026 and 1028, by a current-limiting resistor 997 and a diode 1022. The lower terminal of the winding 996 is connected to the lower terminal of the capacitors 1026 and 1028 by a conductor 1006; and that conductor extends to the junction 1004 in conductor 978. A resistor 1030 and a voltage regulator tube 1032 are connected in series across the capacitor 1028. The junction between that resistor and that voltage regulator tube is denoted by the numeral 1038; and that junction is connected directly to the control grid of a triode 1036, and it is connected to the grid of a triode 1034 by a conductor 1040. The cathodes of the triodes 1034 and 1036 are connected together and are connected to the third terminal of the right-hand section of connector plug 981 by a conductor 988. The plates of the triodes 1034 and 1036 are connected together and are connected to the upper terminal of the output condenser 1028. The triodes 1034 and 1036 coact with the voltage regulator tube 1032 to constitute a series-regulating circuit which can supply greater magnitudes of current at a regulated voltage than the voltage regulator tube 1032 could supply. The conductors 988 and 1006 will supply high voltage, regulated D.C. to the third and seventh terminals of the right-hand section of connector plug 981; and that third terminal will serve as a source of positive, regulated D.C. voltage.

The numeral 1042 denotes a diode which connects the upper end of the secondary winding 996 to a filter which includes resistor 1044 and capacitors 1046 and 1048. A resistor 1050 is connected to the lower terminal of the capacitor 1048, and it is also connected to one terminal of a zener diode 1052. The upper terminals of the capacitors 1046 and 1048 and the upper terminal of the zener diode 1052 are connected to the conductor 1006. The conductor 1006 serves as the grounded conductor of the power supply of FIG. 19 via 978, and junctions 976 and 854, and that conductor coacts with the conductor 970, which is connected to the lower terminal of the zener diode 1052, to supply a regulated D.C. voltage to the fifth and seventh terminals of the right-hand section of connector plug 981. That fifth terminal will be negative relative to the seventh terminal and will thus serve as a source of negative, regulated D.C. voltage.

As indicated by FIG. 23, the conductor 988 extends from the third terminal of the left-hand section of connector plug 981 to a junction 990 in a conductor 822. A junction 992 in the conductor 822 is connected to the third terminal of the right-hand section of a connector plug 861 by a conductor 860. Also, as indicated by FIG. 23, the conductor 978 extends from the seventh terminal of the left-hand section of connector plug 981 to a junction 976 in a conductor 854; and the latter conductor will thus serve as the "common" of all the voltages provided by the power supply of FIG. 19. The upper end of the conductor 854 is connected to the seventh terminal of the right-hand section of connector plug 861. Further, as indicated by FIG. 23, the conductor 970 extends from the fifth terminal of the left-hand section of connector plug 981 to a junction 968 in a conductor 952. The upper end of the conductor 952 is connected to the fifth terminal of the right-hand section of connector plug 861. Moreover, as indicated by FIG. 23, the conductor 974 extends from the sixth terminal of the left-hand section of connector plug 981 to a junction 972 in a conductor 958. The upper end of the conductor 958 is connected to the sixth terminal of the right-hand section of connector plug 861. As a result, a positive, regulated D.C. voltage will appear at the third terminal, a negative, regulated D.C. voltage will appear at the fifth terminal, and an A.C. voltage will appear at the sixth terminal of the right-hand section of connector plug 861.

Referring to FIG. 21, the magnetic head 244 is connected to the connector plug 252 by two short, readily-flexible conductors; and that connector plug is connectable to the connector plug 852. The upper terminal of the connector plug 852 is connected to the third terminal of the left-hand section of connector plug 861, and thus to a positive, regulated D.C. voltage, by junction 856, resistor 858, conductor 860, resistor 859, and junction 880. The lower terminal of connector plug 852 is connected to the seventh terminal of the left-hand section of connector plug 861, and thus to ground, by conductor 854 and junctions 950 and 951. Current will flow through the resistor 858 and through the coils on the magnetic head 244 to provide the biasing current needed by that magnetic head. A capacitor 862 is connected to the grounded conductor 854, and to the positive conductor 860; and that capacitor coacts with the resistor 859 to provide a decoupling action.

The numeral 872 denotes a coupling capacitor that is connected between the upper terminal of connector plug 852 and the base of a transistor 870. The collector of the transistor 870 is connected to the grounded terminal 854 by serially-connected resistors 874 and 868. The junction of those two resistors is connected to the base of the transistor 870 by a resistor 866. That base is also connected to the positive conductor 860 by resistors 864 and 878 and junction 880. The emitter of the transistor 870 is connected to the positive conductor 860 by a resistor 876 and the resistor 878. A by-pass capacitor 882 is provided for the resistor 876.

A coupling capacitor 896 extends between the collector of the transistor 870 and the base of a transistor 884. The collector of the transistor 884 is connected to the grounded conductor 854 by serially-connected resistors 898 and 894. The junction of those resistors is connected to the base of the transistor 884 by a resistor 892. That base is also connected to the conductor 860 by a resistor 890 and by resistor 878. The emitter of the transistor 884 is connected to the conductor 860 by a resistor 900 and by resistor 878. A by-pass capacitor 902 is provided for the resistor 900.

A resistor 886 is connected intermediate the resistor 878 and the grounded conductor 854. A by-pass capacitor 888 is provided for the resistor 886.

A coupling capacitor 906 is connected between the collector of the transistor 884 and the grid of a triode 904 by a resistor 910. A resistor 908 extends between the right-hand terminal of the capacitor 906 and the grounded conductor 854.

The transistor 870 and 884, and the resistors and capacitors associated with them, constitute a transistorized pre-amplifier which is substantially identical in structure and operation to the transistorized pre-amplifier which is the subject of the commonly assigned Donald M. Danko application Serial No. 35,355 for Currency Detectors which was filed on June 10, 1960. That pre-amplifier amplifies voltage variations which are generated in the magnetic head 244, as the magnetic face of a bill is moved past the air gap of that magnetic head, and that pre-amplifier supplies those voltage variations to the grid of the triode 904. That triode has its cathode connected directly to the grounded conductor 854, and it has its plate connected to the positive conductor 860 by a resistor 912. The output of the triode 904 is coupled to the grid of a triode 914 by a capicitor 916. A resistor 918 spaces that grid from the grounded conductor 854; but the cathode of the triode 914 is connected directly to that grounded conductor. The plate of the triode 914 is connected to the conductor 860 by a resistor 920.

The output of the triode 914 is connected to the junction of two capacitors 922 and 924; and those capacitors coact with an adjustable inductor 926 to constitute a parallel-resonant circuit. A capacitor 936 and resistors 930 and 934 couple the output of that resonant circuit to the control grid of a thyratron 928; and a resistor 932 connects that grid to the movable contact of a potentiometer 946. Resistors 944 and 948 connect that potentiometer between the junction 950 in the grounded conductor 854 and the fifth terminal of the left-hand section of connector plug 861, and thus connect that potentiometer between ground and a source of negative, regulated D.C. voltage. Adjustment of the setting of the movable contact of that potentiometer will apply the value of negative bias to the control grid of the thyratron 928 which is needed to keep that thyratron normally non-conductive. The cathode of the thyratron 928 is grounded, and the screen grid of that thyratron also is grounded. A resistor 938 and a conductor 942 connect the plate of the thyratron 928 to the fourth terminal of the left-hand section of the connector plug 861; and that terminal is connected to the third terminal of the right-hand section of connector plug 981—and thus to a source of positive, regulated D.C. voltage—via the fourth terminal of the right-hand section of connector plug 861 in FIG. 23, conductor 942, the fifteenth terminal of the right-hand section of connector plug 803, the fifteenth terminal of the left-hand section of connector plug 803 in FIG. 22, conductor 813, relay coil 428, current-limiting resistor 814, junction 826, conductor 822, the thirteenth terminals of the left-hand and right-hand sections of connector plug 803, conductor 822 in FIG. 23, junctions 992 and 990, conductor 988, and the third terminal of the left-hand section of connector plug 981. A capacitor 940 connects the upper end of the resistor 938 to the grounded screen grid of the thyratron 928.

The triodes 904 and 914 constitute an over-driven amplifier that serves as a limiter. In doing so, those triodes correspond to the two triodes of the limiter in one of the circuits disclosed in Smith et al. application Serial No. 849,066 for Currency Detectors which was filed on October 27, 1959, now abandoned. As as result the triodes 904 and 914 limit the amplitudes of the signals which they provide in response to the voltage variations supplied to the grid of the triode 904 by the transistorized pre-amplifier. Preferably, the triodes 904 and 914 are the two halves of a duotriode.

The parallel-resonant circuit, consisting of capacitors 922 and 924 and inductor 926, will respond to voltage variations of a predetermined repetition rate, phase and duration to increase the voltage across the inductor 926. When that voltage reaches a predetermined value, the thyratron 928 will become conductive. Whenever that thyratron becomes conductive, the capacitor 940 will start discharging through that thyratron; and as that capacitor discharges, the voltage across that capacitor will decrease and will decrease the voltage at the plate of that thyratron. Very promptly the voltage at that plate will fall to a level at which the thyratron 928 will become non-conductive. Thereupon the capacitor 940 will start recharging by means of a circuit that includes conductor 1006 in FIG. 19, junction 1004, conductor 978, junction 976, conductor 854, the seventh terminals of connector plug 861, junction 951 in FIG. 21, capacitor 940, conductor 942, the fifteenth terminals of connector plug 803, conductor 813, relay coil 428, resistor 814, junction 826, conductor 822, junctions 992, and 990, and conductor 988. The values of the capacitor 940 and resistor 938 are selected to provide a charging period of a predetermined duration for that capacitor. During that charging period, the relay coil 428 will be energized; but at the end of that charging period, that relay coil will once again become deenergized. The values of the capacitor 940 and resistor 938 are selected to make the charging period of that capacitor short enough to enable the coil 428 to become de-energized before the second half of the background of the portrait on a bill reaches the magnetic head 244. As a result, when that second half of that portrait background causes the resonant circuit, including the inductor 926 and capacitors 922 and 924, to provide a voltage growth that again renders the thyratron 928 conductive, the consequent discharging of capacitor 940 and the subsequent recharging of that capacitor will be able to effect a change in the energization of that relay coil. The values of the capacitor 940 and resistor 938 also will be selected to make the charging period of that capacitor long enough to keep the coil 428 energized while the portrait on the bill is moving past the magnetic head 244. This is desirable, because it keeps portions of that portait from causing the resonant circuit, including inductor 926 and capacitors 922 and 924, to provide a voltage growth that again renders the thyratron 928 conductive.

This circuit is very desirable because it provides D.C. feeding of the thyratron, and also provides prompt quenching of the thyratron without any need of mechanically disconnecting that thyratron from the source of power for that thyratron. Further, that circuit holds the relay coil 428 energized for a short period of predetermined duration, and then permits that coil to become de-energized. In this way, this circuit makes certain that the relay coil 428 can not respond to signal obtained from undesired portion of the magnetic face of the inserted bill.

The numeral 954 denotes one half of the center-tapped filament for the duotriode of which the triodes 904 and 914 are parts. The numeral 956 denotes the other half of that filament; and the outer ends of that filament are connected together by junction 962 and are connected to the sixth terminal of the left-hand section of the connector plug 861—and thus to the upper terminal of secondary winding 994 in FIG. 19—by conductors 958 and 974. The center tap of that filament is connected to the seventh terminal of the left-hand section of connector plug 861—and thus to the lower terminal of secondary winding 994—by conductors 960, 854 and 978. The filament 966 of the thyratron 928 is connected to the sixth and seventh terminals of the left-hand section of connector plug 861—and thus across the secondary winding 994—by conductors 958 and 960.

The transistors, the triodes, the thyratron, the capacitors, the resistors, and the inductor of FIG. 21 constitute a unit 426 which can respond to the movement of the magnetic face of a two dollar bill past the air gap of the magnetic head 244 to supply two validating signals—much in the manner in which the correspondingly-numbered unit of the said Smith et al. application responds to the movement of the magnetic face of a one dollar bill past the air gap of the magnetic head 244 to supply two validating signals.

The relay, of which the coil 428 is a part, has contacts 438, 439 and 440, as shown by FIG. 22. The numeral 446 denotes the coil of a relay that has contacts 442 and 444, the numeral 462 denotes the coil of a relay that has contacts 454, 456, 458 and 460, and the numeral 476 denotes the coil of a relay that has contacts 472 and 474. Those four relays are part of a relay chain which is similar to the relay chain, in the said Smith et al. application, that has similarly-numbered relay coils. The numeral 520 denotes the coil of a relay that has contacts 522, 524 and 526, the numeral 528 denotes the coil of a relay that has contacts 530, 532, 534, 793 and 795, the numeral 544 denotes the coil of a relay that has contacts 550, 552, 554, 556, 558, 560, 562, 564 and 566, and the numeral 578 denotes the coil of a relay that has contacts 584, 586 and 588. The four relays of which the coils 520, 528, 544 and 578 are parts are comparable to the relays in the commonly assigned Carlson et al. application Serial No. 73,062 for Currency Detectors which was filed December 1, 1960; and the Carlson et al. relays have similarly-numbered coils.

Whenever the bill-transporting device shown in FIG. 1 is at rest, the spring 222 will pull the connecting rod 214 to the right, as shown by FIG. 3, and will thus cause the U-shaped bracket 206 to rotate the U-shaped bracket 196 to its raised position. As a result, whenever the bill-transporting device of FIG. 1 is at rest, the pivot 202 and the timing belt pulleys 204 thereon will be in raised position. This means that the leading edges of the timing belts 270 will be above, and out of engagement with, the leading edges of the timing belts 272; and this is desirable because it facilitates the ready introduction of a bill between those leading edges.

At this time, the spring 356 will pull the rocker arm 350 in the counter clockwise direction, and will thus pull the connecting rod 352 to the position shown by FIG. 2. That connecting rod will hold the U-shaped bracket 354 in the raised position shown by dotted lines in FIG. 15, and will thus hold the gate 370 in the raised position shown by dotted lines in FIG. 15. This means that the opening 374 in that gate will be alined with the opening 38 in the front plate 36 and will also be alined with the space between the platens 50 and 94. As a result, a patron can easily introduce the leading edge of a bill through the openings 38 and 374 and into the space between the platens 50 and 94.

Also at this time, the weights of the roller 326, of the carrier 323, and of the connecting rod 334 will hold the plunger 332 of the solenoid 330 in the extended position shown by FIG. 2. Those weights also will hold the soft-faced roller 326 below and out of engagement with the magnetic head 244. However, whenever that solenoid is energized, its plunger 332 will be retracted and will act through the connecting rod 334 and the carrier 323 to force the soft-faced roller 326 upwardly toward the magnetic head. That soft-faced roller is readily deformable by the forces exerted by the solenoid 330, as indicated by FIG. 3; and, as a result, that roller will force an inserted bill up against the face of the magnetic head 244 and will then deform itself to assume a concave configuration at the upper face thereof. That concave configuration of the roller 326 is desirable because it will bow the inserted bill around the face of the magnetic head; and that bowing action is important in assuring full registration of the bill with the air gap of that magnetic head, and in tending to smooth out wrinkles in the bill. The soft-faced roller 326 can rotate readily relative to the pivot 324, and that ready rotation will minimize the frictional drag which is applied to the inserted bill during the sensing of that bill.

At this time, a patron can readily insert the leading edge of a bill 400 between the leading edges of the upper and lower timing belts 270 and 272. The upstanding sides and end of the bracket 338 will help the patron effect proper placement of that bill. The patron will then press the push button 340, thereby energizing the relay coil 528 via conductor 700, now-closed push button 340, the fifteenth terminals of the connector plug 704, conductor 809, the twelfth terminals of the connector plug 803, diode 540, serially-connected resistor 538 and coil 528, conductor 811, junctions 582 and 810, conductor 804, the first terminals of connector plug 803, junction 726, conductor 706, the first terminals of connector plug 704, junction 708, and conductor 706. As current flows through the serially-connected resistor 538 and relay coil 528, the condenser 536 will become charged. The current will continue to flow through the serially-connected resistor 538 and relay coil 528 as long as the patron holds the push button 340 closed; and after the patron releases that push button, the condenser 536 will discharge through the serially-connected resistor 538 and relay coil 528 to keep that coil energized for a predetermined period of time. The duration of that period of time will be determined by the values of the resistor 538 and of the condenser 536; and that period of time will preferably be less than one second. The overall result is that the relay coil 528 will be energized and will be kept energized for a short, but adequate, period of time.

The energization of the relay coil 528 will enable that coil to shift the movable contact 532 down into engagement with the fixed contact 530. That coil will also close the normally-open contacts 793 and will open the normally-closed contacts 795. The closing of the contacts 793 can complete a circuit in the device which will be associated with the currency detector of FIG. 1; and the opening of the contacts 795 can break a circuit in that device. Those circuits are not material to the operation of the currency detector of FIG. 1, and hence no further consideration will be given to those circuits.

The shifting of the movable contact 532 will energize the solenoid 230 via conductors 700, 712 and 714, junction 716, conductor 718, the fourteenth terminals of connector plug 704, conductor 808, the seventeenth terminals of connector plug 803, normally-closed contacts 524 adjacent relay coil 520, conductor 434, the eighteenth terminals of connector plug 803 and the fourth terminals of connector plug 195, the movable and upper fixed contacts of switch 290, conductor 436, the third terminals of connector plug 195 and the sixteenth terminals of connector plug 803, now-closed contacts 530 and 532, conductor 429, junctions 570 and 723, the fifth terminals of connector plug 803, junction 794, the fifth terminals of connector plug 195, junctions 756 and 482, solenoid 230, junction 486, conductor 728, the first terminals of connector plug 195, junction 726, conductor 706, the first terminals of connector plug 704, and junction 708. Thereupon the solenoid 230 will retract its plunger 228 and rotate the rocker arm 224 in the clockwise direction in FIG. 3, thereby shifting the connecting rod 214 toward the front plate 36. Such shifting of the connecting rod 214 will permit the upwardly extending arm 207 of the bracket 206 to move forwardly and release the holding force which it normally applies to the U-shaped bracket 196. At this time, the springs 208 will act upon the U-shaped bracket 196 and rotate that bracket in the counter clockwise direction about the pivot 198; and this means that the pivot 202 with its timing belt pulleys 204 will be forced to move downwardly. Those pulleys will cause the leading edges of the upper timing belts 270 to press the leading edge of the inserted bill into intimate engagement with the lower timing belts 272.

As the connecting rod 214 shifted forwardly toward the front plate 36, that rod moved the switch actuator 234 far enough in the clockwise direction in FIG. 3 to close the normally open switch 232. The closing of that switch completes a circuit through the displaced phase winding of the motor 188 via conductors 700, 712 and 714, junction 716, conductors 718 and 808, contacts 524, conductor 434, the movable and upper fixed contacts of switch 290, conductor 436, contacts 530 and 532, conductor 429, junction 794 in FIG. 23, conductor 796, the fifth terminals of connector plug 704, junction 724, conductor 722, the twelfth terminals of connector plug 704, conductor 784, the twelfth terminals of connector plug 195, junction 750, switch 232, capacitor 190, the displaced phase winding of the motor 188, junctions 492, 494 and 486, conductor 728, the first terminals of connector plug 195, junction 726, conductor 706, the first terminals of connector plug 704, and junction 708. The closing of the switch 282 also completes a circuit through the main winding of the motor 188 via conductors 700, 712 and 714, junction 716, conductors 718 and 808, contacts 524, conductor 434, the movable and upper fixed contacts of switch 290, conductor 436, contacts 530 and 532, conductor 429, junction 794 in FIG. 23, conductor 796, the fifth terminals of connector plug 704, junction 724, conductor 722, the twelfth terminals of connector plug 704, conductor 784, the twelfth terminals of connector plug 195, junction 750, switch 232, conductor 496, the sixth terminals of connector plug 195, the sixth terminals of connector plug 803, contacts 558 and 560, conductor 498, the eighth terminals of connector plug 803, the eighth terminals of connector plug 195, the main winding of motor 188, conductor 500, the seventh terminals of connector plug 195, the seventh terminals of connector plug 803, contacts 554 and 552, conductor 811, junction 810, conductor 804, the first terminals of connector plug 803, junction 726, connector 706, the first terminals of connector plug 704, and junction 708. As a result, the motor 188 will start rotating in such a direction as to cause the timing belts 270 and 272 to start moving the inserted bill 400 toward the rear of the bill-transporting device.

It will be noted that the initial connection of the solenoid 230 and of the motor 188 to the terminal 412 of the plug 410 is through the relay contacts 530 and 532; and this means that a further connection must be established because the time constant of condenser 536 and resistor 538 is less than one second and hence the contacts 530 and 532 can separate in less than a second. The bill-actuated switch 752 provides that further connection for the solenoid 230 and the motor 188 when the timing belts 270 and 272 move the leading edge of the inserted bill 400 into engagement with the actuator 276 of that switch. The time constant of the condenser 536 and resistor 538 is short enough to keep any idle pressing and releasing of the push button 340 by passersby from causing the solenoid 230 to hold the leading edges of the timing belts 270 and 272 in engagement with each other indefinitely, and from causing the motor 188 to run indefinitely. However, that time constant is long enough to keep the solenoid 230 and the motor 188 energized until after the bill 400 has actuated the switch 752.

As the inserted bill 400 engages the actuator 276, the movable contact of the switch 752 will move down out of engagement with the upper fixed contact and into engagement with the lower fixed contact of that switch. The movement of that movable contact away from the upper fixed contact of that switch will open a circuit in the device with which the currency detector of the present invention is associated, but that circuit is not material to the operation of the said currency detector and does not require further consideration. The movement of that movable contact into engagement with the lower fixed contact of that switch will establish a circuit via conductor 700, junctions 702 and 758, conductor 760, the movable and lower fixed contacts of switch 752, conductor 754, junction 756, conductor 429, junction 482, solenoid 230, junction 486, conductor 728, junction 726, conductor 706, and junction 708. A second circuit will also be established via conductor 700, junctions 702 and 758, conductor 760, the movable and lower fixed contacts of switch 752, conductor 758, junction 756, conductor 429, junction 794, conductor 796, junction 724, conductors 722 and 784, the switch 232, capacitor 190, the displaced phase winding of motor 188, junctions 492, 494 and 486, and conductors 728 and 706. A third circuit will also be established via conductor 700, junctions 702 and 758, conductor 760, the movable and lower fixer contacts of switch 752, conductor 754, junction 756, conductor 429, junction 794, conductor 796, junction 724, conductors 722 and 784, the switch 232, conductor 496, contacts 558 and 560 in FIG. 22, conductor 498, the main winding of motor 188, conductor 500, contacts 554 and 552 in FIG. 22, and conductors 811, 804 and 706. The overall result is that the bill-actuated switch 752 will keep the solenoid 230 energized as long as a bill holds the movable and lower fixed contacts of that switch in engagement. Further, the switch 752 will keep the motor 188 energized as long as the contacts 558 and 560 and the contacts 554 and 552 remain closed and the switch 752 remains closed. Consequently, although the relay coil 528 will become deenergized within a second after the push button 340 is released, the solenoid 230 and the motor 188 will continue to remain energized.

The timing belts 270 and 272 will continue to move the inserted bill 400 toward the rear of the bill-transporting device; and the leading edge of that bill will soon engage and move the actuator 284 of the switch 282 and thereby close that switch. Thereupon a circuit will be completed via conductors 700 and 760, the movable and lower fixed contacts of switch 752, conductor 754, junction 756, conductor 429, junctions 794, 723 and 570, contacts 564 and 566 in FIG. 22, conductor 604, junction 817, switch 282, solenoid 330, junctions 494 and 486, and conductors 728 and 706. The resulting energization of the solenoid 330 will retract the plunger 332 and pull the connecting rod 334 toward the rear of the bill-transporting device, thereby rotating the carrier 323 in the counter clockwise direction in FIG. 2. That rotation causes the soft-faced roller 326 to engage the lower face of the inserted bill 400 and to press the upper face of that bill against the convex face of the magnetic head 244. The plunger 332 will fully seat itself, and it will thereby minimize the number of stray magnetic flux lines generated by the solenoid 330. As that plunger fully seats itself, it will apply such a strong upwardly-directed force to the roller 326 that the uppermost portion of the face of that roller will not only deform to conform to the convex curvature of the face of the magnetic head 244 but will also force that magnetic head to move upwardly. The spring 246 will yield to permit the mounting 242 for the magnetic head 244 to move upwardly and thereby permit the magnetic head to move upwardly. That spring will, however, exert a downwardly-directed force on the magnetic head 244 which is strong enough to urge the face of that magnetic head into intimate engagement with the inserted bill 400 and to keep the uppermost portion of the face of the roller 326 deformed.

The actuator 284 for the switch 282 is set far enough away from the front plate 36 to enable the leading edge of the bill 400 to pass between the magnetic head 244 and the soft-faced roller 326 before that leading edge moves the actuator 284. As a result, the magnetic head 244 and the roller 326 cannot cause the leading edge of the bill 400 to crumple or roll up. However, the actuator 284 is set close enough to the front plate 36 to enable the leading edge of the bill 400 to move that actuator before the portrait background of that bill reaches the magnetic head 244. As a result, the magnetic head 244 will engage and sense the portrait background of the bill 400.

As the bill 400 is moved toward the rear of the bill-transporting device, the leading portion of the background of the portrait of Thomas Jefferson will engage the air gap of the magnetic head 244. Subsequently, the trailing portion of the background of the portrait of Thomas Jefferson will engage and move beyond the air gap of the magnetic head 244. The bill 400 will be moving at synchronous speed, as the background of the portrait of Thomas Jefferson engages and then moves past the air gap of the magnetic head 244; and, consequently, the vertical grid lines in that background will generate acceptable voltage variations in the coil of that magnetic head.

Those voltage variations will be suitably amplified by the transistors 870 and 884, all in the manner disclosed in the said Danko application; and the resulting signal will be suitably limited by the triodes 904 and 914 and then supplied to the resonant circuit which includes the capacitors 922 and 924 and the inductor 926. Where those voltage variations are derived from an authentic bill of the desired denomination, two controlled voltage growths will be experienced in that resonant circuit, all as disclosed in the said Smith et al. application. Each of those voltage growths will, in the case of an authentic bill of the desired denomination, cause the thyratron 928 to become conductive. Whenever that thyratron becomes conductive, the capacitor 940 will start discharging through that thyratron; and as that capacitor discharges, the voltage across that capacitor will decrease and will decrease the voltage at the plate of that thyratron. Very promptly the voltage at that plate will fall to a level at which the thyratron 928 will become non-conductive. Thereupon the capacitor 940 will start re-charging by means of a circuit that includes conductor 1006, junction 1004, conductor 978, junction 976, conductor 854, the seventh terminals of connector plug 861, junction 951, capacitor 940, conductor 942, the fifteenth terminals of connector plug 803, conductor 813, relay coil 428, resistor 814, junction 826, conductor 822, junctions 992 and 990, and conductor 988. The resulting energization of the relay coil 428 will close the contacts 439 and 440; and thereupon a circuit will be established via conductor 706, junction 726, conductor 804, junctions 810, 480 and 466, relay coil 446, contacts 454 and 456, contacts 440 and 439, junctions 828 and 430, conductor 806, conductor 720, junction 724, conductor 796, junction 794, conductor 429, junction 756, conductor 754, the lower fixed and the movable contacts of the switch 752, and conductors 760 and 700. The resulting energization of relay coil 446 will close the contacts 442 and 444; and the closing of the latter contacts establishes a holding circuit for the coil 446 via conductor 706, junction 726, conductor 804, junctions 810, 480 and 466, relay coil 446, contacts 444, junction 430, conductor 806, conductor 720, junction 724, conductor 796, junction 794, conductor 429, junction 756, conductor 754, the lower fixed and the movable contacts of the switch 752, and the conductors 760 and 700. The closing of the contacts 442 will pre-set a further circuit.

As the capacitor 940 becomes re-charged the current through the relay coil 428 will fall to the point where that coil cannot hold the contact 439 down and that contact will then move back up into engagement with the contact 438. That engagement will complete a circuit via conductor 706, junction 726, conductor 804, junctions 810, 480, and 466, relay coil 462, now-closed contacts 442, contacts 438 and 439, junction 828, conductor 806, conductor 720, junction 724, conductor 796, junction 794, conductor 429, junction 756, conductor 754, the lower fixed and the movable contacts of the switch 752, and conductors 760 and 700. The resulting energization of relay coil 462 will close the contacts 456 and 458 and the contacts 460. The closing of the contacts 460 will establish a holding circuit for that relay coil via conductor 706, junction 726, conductor 804, junctions 810, 480 and 466, relay coil 462, contacts 460, conductor 806, conductor 720, junction 724, conductor 796, junction 794, conductor 429, junction 756, conductor 754, the lower fixed and the movable contacts of the switch 752, and the conductors 760 and 700. The closing of the contacts 456 and 458 will preset a further circuit.

The second voltage growth in inductor 926 will render the thyratron 928 conductive again; and the ensuing discharge of capacitor 940 will again reduce the plate voltage of that thyratron sufficiently to cause that thyratron to cut off. The capacitor 940 will again recharge and will thereby again energize the coil 428; and the resulting downward movement of the contact 439 will complete a circuit via conductor 706, junction 726, conductor 804, junctions 810 and 480, relay coil 476, now-closed contacts 458 and 456, contacts 440 and 439, junctions 828 and 430, conductor 806, conductor 720, junction 724, conductor 796, junction 794, conductor 429, junction 756, conductor 754, the lower fixed and the movable contacts of the switch 752, and conductors 760 and 700. Relay contacts 472 and 474 will then close; and the contacts 474 will complete a holding circuit for the coil 476. The closing of the contacts 472 will pre-set a further circuit; and that circuit will be completed when the re-charging of capacitor 1196 energizes the relay coil 818 and thus causes the relay coil 830 to close the contacts 836. That further circuit will be established via conductor 706, junction 726, conductor 804, junction 810, conductor 811, junction 582, relay coil 520, contacts 472, conductor 838, contacts 836, conductor 802, junction 842, junction 758, and conductor 700. As the capacitor 940 becomes re-charged, the coil 428 will release the contact 439; and while that contact will break the energizing circuit of coil 476, that coil will be kept energized by the holding circuit through contacts 474.

The resulting energization of coil 520 will open contacts 522 and 524 and close contacts 526. The opening of contacts 522 prevents the energization, at this time, of relay coil 544; and the opening of the contacts 524 disconnects the movable contact of the switch 290 from the prong 412 of plug 410. The closing of the contacts 526 completes a circuit via conductor 706, junction 726, conductor 728, junctions 486, 494 and 492, solenoid 344, conductor 602, junction 786, contacts 526, junction 817, conductor 604, contacts 566 and 564, junctions 570 and 723, conductor 429, junction 756, conductor 754, the lower fixed and the movable contacts of switch 752, and conductors 760 and 700. The resulting energization of the solenoid 344 will retract the plunger 346 and thereby shift the connecting rod 352 toward the front plate 36. That shifting will rotate the bracket 354 forwardly and downwardly; and the extension 353 thereof will move downwardly and release the gate 370. If no thread, tape or other member is attached to the bill 400, the gate 370 will be able to move down far enough to permit switch 362 to shift its movable contact. At this time, the trailing edge of the inserted bill 400 will have passed inwardly through the opening 374; and the gate 370 will then move downwardly to block the opening 38 in the front plate 36. In doing so, that gate will protect the patron from the loss of a further inserted bill. The gate 370 will remain in its lowered position, and the switch 362 will remain in its shifted position as long as the solenoid 344 remains energized.

The bill 400 will continue to move rearwardly of the bill-transporting device; and its leading edge will engage and move the actuator of the switch 286. That switch is connected in parallel with the switch 752, as shown by FIG. 20; and hence the closing of that switch will merely help maintain the circuits which were being maintained by the switch 752.

Further rearward movement of the inserted bill 400 will cause the leading edge of that bill to engage the actuator 292 of switch 290 and thereby move the movable contact of that switch into engagement with the lower fixed contact. Because the relay coil 520 was energized previously and is still energized, the movement of that movable contact will not produce any immediate change in the position of any other electrical component of the currency detector.

Continued rearward movement of the bill 400 will cause that bill to engage the actuators 296 and 300 of the switches 734 and 736. Thereupon, a circuit will be completed via conductors 700 and 760, the movable and lower fixed contacts of the switches 752 and 286, conductor 754, junction 756, conductor 429, junction 482, conductor 508, junction 732, the movable and lower fixed contacts of the switches 734 and 736, junction 740, the movable and right-hand fixed contacts of switch 362, conductor 596, junction 792, the tenth terminals of the connector plug 803, relay coil 578, junction 582, conductor 811, and conductors 804 and 706. The resulting energization of relay coil 578 will close the contacts 584, 586 and 588. The closing of the contacts 584 will interconnect two conductors which can be suitably connected to terminals in the vending machine, change maker or other device controlled by the currency detector. The closing of the contacts 586 interconnects the conductors 700 and 429 via conductors 700, 802 and 840, contacts 586, junction 723, and conductor 429. The closing of the contacts 588 connects prong 412 to the eighth terminals of connector plug 794 via conductors 700, 712 and 800, contacts 588, and conductor 807; and those terminals will be suitably connected to a component in the vending machine, change maker or other device controlled by the currency detector.

The bill 400 will continue to move toward the rear of the bill-transporting device; and as that bill does so its leading edge will pass between the small diameter rollers 314 and 321. Those rollers normally rotate at an angular rate which is greater than the angular rate at which the pulley 172 rotates. As long as the inserted bill 400 is held by the timing belts 270 and 272, it will be unable to move at a speed which is equal to the normal, high peripheral speed of the rollers 314 and 321. Further, as long as the inserted bill 400 engages the timing belts 270 and 272 as well as the small diameter rollers 314 and 321, those rollers will be held to a lower-than-normal peripheral speed. This means that the pulley 316 will not be able to rotate at its normal angular rate; and the overall result is that the helical torsion spring 176 will tend to wind itself tighter, thereby storing energy within itself. As soon as the trailing edge of the inserted bill 400 passes beyond the trailing edges of the timing belts 270 and 272, the helical torsion spring 176 will restore itself to its normal condition. As it does so, that spring will rapidly rotate the small diameter rollers 314 and 321 in the same direction in which they had been rotating; and that rapid rotation will give an added impetus to the movement of the bill 400 toward the cash box, not shown, which will be set adjacent the opening 136 in the rear plate 42.

As the inserted bill 400 successively moves out of engagement with the actuators 276 and 288 of the switches 752 and 286, the movable contacts of those switches will return to the positions shown by FIG. 20. However, the switches 734 and 736 will maintain the circuits previously maintained by the switches 752 and 286. This means that the switches 734 and 736 will keep the solenoid 230, the solenoid 330, the solenoid 344, the motor 188, and the relay coils 446, 462 and 476 energized until the trailing edge of the bill 400 has passed rearwardly beyond the trailing edges of the timing belts 270 and 272.

As the trailing edge of the bill 400 moves out of engagement with the actuators 296 and 300 of the switches 734 and 736, those switches will break the connection to the relay coil 578. In addition, those switches will break the connection between the terminal 412 of plug 410 and the conductor 429; and the breaking of that connection will de-energize the solenoid 230, will de-energize the motor 188, will de-energize the solenoid 330, will de-energize the solenoid 344, and will de-energize the relay coils 446, 462 and 476. The de-energization of the coil 476 will permit the contacts 472 to reopen and thus causes the de-energization of the relay coil 520. As a result, all of the electrical components of the currency detector will return to the positions shown by FIGS. 19–22.

In the foregoing description of the operation of the currency detector of FIG. 1, it was assumed that the inserted bill 400 was an authentic bill; but if that bill had been a spurious bill, that currency detector would have rejected that bill. For example, if that bill had been a spurious bill, the relay coil 428 would not have received two validating signals; and hence the relay coil 476 would not have been energized. Further, the relay coil 818 would not have been energized. As a result, the relay coil 520 would not have been energized.

If the relay coil 520 had not become energized, the contacts 526 would then have been unable to close to energize the solenoid 344. As a result, the gate 370 would have had no chance to move downwardly from its raised position. Also, the contacts 524 would have been unable to open to separate the conductor 434 from the terminal 412 of the plug 410. Moreover, the contacts 522 would have been unable to open; and that fact is important in connection with the actuation of the switch 290 by the leading edge of the inserted bill 400.

Specifically, as the inserted bill 400 causes the movable contact of the switch 290 to move down into engagement with the lower fixed contact of that switch, a circuit will be completed via conductors 706, 804 and 811, junction 582, relay coil 544, conductor 778, junction 783, the lower fixed and the movable contacts of switch 290, conductor 434, contacts 524, conductors 808, 718, 714, 712 and 700. The resulting energization of the relay coil 544 will disconnect conductor 604 from the terminal 412, as by moving the contact 564 away from the contact 566; and the downward movement of the contact 564 will also establish a holding circuit for the relay coil 544 through the contacts 564 and 562. The coil 544 will also move the contacts 558 and 552 downwardly; and, as it does so, it will reverse the connections to the main winding of the motor 188. As a result, that motor will immediately start rotating in the opposite direction; and that rotation will cause the timing belts 270 and 272 to move the inserted bill 400 back toward the opening 38 in the front plate 36.

The movement of the contact 564 downwardly away from the contact 566 will also de-energize the solenoid 330; and thereupon the plunger 332 of the solenoid 330 will move to the position shown by FIG. 2. As a result, the roller 326 will be moved downwardly and away from the magnetic head 244. This is desirable because it will facilitate unhampered movement of the inserted bill 400 back to the opening 38 in the front plate 36.

As the inserted bill 400 moves forwardly and outwardly through the opening 38 in the front plate 36, the trailing edge of that bill will successively pass out of engagement with the actuator 288 for the switch 286 and the actuator 276 for the switch 752. The movement of that trailing edge out of engagement with the actuator 288 will not de-energize the solenoid 230 because the switch 752 will keep that solenoid energized. However, as the trailing edge of the bill 400 moves out of engagement with the actuator 276, the switch 752 will return to the position shown by FIG. 20; and, thereupon, the circuit to the solenoid 230 will be broken and that solenoid will become de-energized. At such time, the spring 222 will rotate the rocker arm 224 in the counter clockwise direction and thereby shift the U-shaped bracket 206 from the position shown by FIG. 4 to the position shown by FIG. 3. That shift in position will cause the front end of the U-shaped bracket 196 to raise upwardly and lift the leading edges of the timing belts 270 out of engagement with the leading edges of the timing belts 272. As the spring 222 rotated the U-shaped bracket 206, that spring also shifted the actuator 234 of the switch 232 and thereby reopened that switch. Thereupon, the motor 188 became de-energized and the currency detector came to rest. At such time, the bill 400 will be resting freely upon the platform 336, and the patron can easily retrieve that bill.

In this way, if the inserted bill does not coact with the magnetic head 244 to provide voltage variations that enable the unit 426 to produce two validating signals, the currency detector will not accept that bill. Further, if the inserted bill does not coact with optical sensing system of the present invention to energize the relay coil 818, in FIG. 22, the currency detector will not accept that bill, all as pointed out hereinafter. In either case, the currency detector will not permit the bill to move all the way to the rear of the platens 50 and 94. Instead, that currency detector will halt the forward movement of that bill almost immediately after the leading edge of that bill engages the actuator 292 for the switch 290; and this means that the forward direction of the bill will be stopped while the leading edge of that bill is spaced almost half of the length of the platen 94 from the rear edge of that platen. Such an arrangement is desirable because it reduces the total time required to test and reject unacceptable bills.

If a passerby presses the push button 340 but does not insert a bill, the relay coil 528 will be energized and will thereby energize the solenoid 230. The energization of the solenoid 230 will cause the leading edges of the timing belts 270 to move downwardly into engagement with the leading edges of the timing belts 272, and it will also energize the motor 188. However, the bill-actuated switch will not be actuated, because a bill was not inserted; and, after a predetermined period of time—less than a second after the push button 340 was released— the solenoid 230 will become de-energized. Thereupon, the leading edges of the timing belts 270 will be moved upwardly away from the leading edges of the timing belts 272, and the motor 188 will come to rest. Consequently, the passerby will not obtain the product held by the vending machine and will not obtain any change from the change maker.

If a patron inserts an authentic bill and then tries to hold onto the trailing edge of that bill, he will not get the desired product and will not get the desired change. Specifically, such a patron will not receive the desired product and will not receive the desired change because the inserted bill must go far enough toward the rear of the platens 50 and 94 to actuate the switches 734 and 736. As a result, a patron who holds onto the trailing edge of his bill will not obtain the desired product or the desired change. To obtain that product or change, the patron must let the belts 270 and 272 carry the bill all the way to the actuators 296 and 300 of the switches 734 and 736.

In the event a patron attaches a sturdy thread, tape or other member to the inserted bill and lets the leading edge of that bill pass the magnetic head 244 and then lets the leading edge of that bill pass far enough toward the rear of the platen 94 to actuate the switches 734 and 736, he will still not obtain the desired product or the desired change. Instead, the currency detector will reverse the motor 188 and will send the bill and its attached thread, tape or other member back to the patron. This is due to the fact that the thread, tape or other member attached to the bill will keep the gate 370 from moving downwardly far enough to shift the position of the movable contact of the switch 362. Consequently, when either of the switches 734 and 736 is closed, by having the actuator thereof moved by the inserted bill, a circuit will be completed through the coil 544 of the motor-reversing relay via conductors 706, 804 and 811, junction 582, relay coil 544, conductor 778, junction 788, junction 780, conductor 782, the left-hand and movable contacts of the switch 362, junction 740, the movable and lower fixed contacts of the switches 734 and 736, junction 732, conductors 508 and 429, junction 756, the lower fixed and the movable contacts of switch 752, and conductors 760 and 700. The resulting energization of the coil 544 will reverse the motor and will cause the timing belts 270 and 272 to send the inserted bill back to the opening 38 in the front plate 36. Hence, if a patron attaches a sturdy thread, tape or other member to the inserted bill, that patron will not obtain the desired product or the desired change but instead will have the inserted bill and its attachment returned to him.

If a patron attaches a very light thread, tape or other member to the inserted bill and lets the leading edge of that bill pass the magnetic head 244 and then lets the leading edge of that bill pass to the actuators of the switches 734 and 736, that bill will lead to the dispensing of the desired product or the desired change if that thread, tape or other member is light enough to let the gate 370 move down to its lowered position. The dispensing of that product or of that change is not objectionable because such a thread, tape or other member would be entirely too weak to be used to withdraw the bill from between the belts 270 and 272; and that bill will then be moved to the cash box.

It will be noted that the power for the relay coils 446, 462 and 476 is supplied through the conductor 429. This is desirable because it means that when the coil 544 of the motor-reversing relay is energized to send a bill back, and when the bill-actuated switches re-open as that bill moves back, there will not be a direct connection between the terminal 412 of plug 410 and the relay coils 446, 462 and 476. This means that there is no possibility that a single validating signal from the unit 426 could be retained in the relay chain, including the relay coils 428, 446, 462 and 476, and could then be coupled with a further validating signal, obtained by the re-insertion of the unacceptable bill, to effect dispensing of the desired product or change. By completely disconnecting the relay coils 446, 462 and 476 from the terminal 412 of plug 410, whenever the coil 544 of the motor-reversing relay is energized, the present invention completely cancels any residual effect of a validating signal.

The switch 290 coacts with the contacts 524 adjacent the coil 520 to provide an early sensing of the receipt or non-receipt of the requisite signals from the thyratron 928 and a thyratron in the optical sensing system. If those signals had been received, the contacts 524 would be open—because of the energization of coil 520—and the movement of the movable contact of switch 290 into engagement with the lower contact of that switch would not be able to energize the coil 544 of the motor-reversing relay. In such event, the bill 400 would continue to move toward the rear plate 42. However, if those validating signals were not received, the switch 290 would act through the still-closed contacts 524 to energize the coil 544, and thereby effect prompt reversing of the direction of movement of the inserted bill. This prompt reversing is desirable, and it will lead to the prompt returning of that bill and to the prompt resetting of the currency detector.

The bill-actuated switches 752 and 286 are desirable because they hold the solenoid 230 energized for whatever length of time is needed to effect the testing and acceptance or the testing and rejection of the inserted bill. For example, if an inserted bill was temporarily caught and held within the bill-transporting device, those switches would keep the motor 188 energized and thus give the bill a chance to work itself loose so it could be freed from that bill-transporting device. Such a result is desirable, but that result could not be provided by a timing circuit; because such a circuit would permit the solenoid 230 to become de-energized even though a bill was temporarily caught and held within the bill-transporting device. The bill-actuated switches 752 and 286 are additionally desirable because the lengths of time during which they hold the motor 188 energized will not be effected by factors such as age or temperature. Some of the components of timing circuits can be affected by age and temperature, and hence those timing circuits can not provide a precisely determined time cycle for the solenoid 230.

Referring to FIG. 24, the numeral 1560 denotes a bracket which is generally similar to the bracket 761 which is shown in FIGS. 2 and 3. The bracket 1560 is secured to the plate 46; and that bracket serves to support the lamps 762 and 1462 and light-sensitive elements 770 and 1564. The bracket 1560 also supports connector plug 1060 plus one section of a connector plug 1566; and the other section of the connector plug 1566 is shown in FIG. 26.

The beams of light from the lamps 762 and 1562 are directed upwardly at angles into the slot 68 in the lower platen 50, and those beams of light will normally strike the strip 769 which is secured to the foot-like flanges of the plates 126 and 130 on the platen 94. Part of the light from lamp 762 will normally be reflected onto the light-sensitive element 770 and part of the light from lamp 1562 will normally be reflected onto the light-sensitive element 1564. When a bill 400 is moved toward the rear plate 42, that bill will successively intercept the beam of light from the lamp 762 and the beam of light from the lamp 1562. The spacing between and the inclinations of, the lamps 762 and 1562 are such that the spots of light which appear on the underside of a bill will be spaced apart one and three hundred and seventy five thousandths of an inch. This means that at the time the green area, which is intermediate the white border and the white "TWO," intercepts the beam of light from the lamp 1562 the trees at the leading edge of the picture of Monticello will be just about ready to intercept the light beam from the lamp 762; and as that green area intercepts the beam light from the lamp 1562, the leading edge of the bill will be just about ready to shift the actuator 292 of the switch 290. More specifically, in less than twenty-six milliseconds after that green area intercepts the beam of light from the lamp 1652, the trees at the leading edge of the picture of Monticello will intercept the light beam from the beam of light from the lamp 762; and almost immediately after the expiration of those twenty-six milliseconds the leading edge of the bill will shift the actuator 292 and thereby shift the movable contact of the switch 290 down into engagement with the lower fixed contact of that switch.

If desired, two brackets could be used instead of the single bracket 1560. However, the use of two brackets has not been found to be necessary because the slotted supports 765, which hold the lamps 762 and 1562, can be adjusted to provide all needed adjustments in the positions of the light beams supplied by the lamps 762 and 1562.

Referring to FIG. 25, the numeral 1072 denotes a pentode. The triodes 1082 and 1090 constitute a Schmitt trigger.

The numeral 1570 denotes a triode which has the cathode thereof connected to the grounded conductor 854; and a resistor 1572 connects the plate of that triode to the conductor 821. Resistors 1574, 1576 and 1578 constitute a voltage divider which is connected intermediate the conductors 821 and 953; and the junction between the resistors 1576 and 1578 is connected to the grid of the triode 1570. That voltage divider establishes the normal biasing voltage for the grid of that triode. Resistors 1580 and 1582 also are connected between the conductors 821 and 953; and the junction between those resistors establishes the plate voltage of a diode 1584. The cathode of that diode is connected directly to the grid of the triode 1570; and the value of the voltage at that cathode is determined by the voltage divider consisting of resistors 1574, 1576 and 1578. A capacitor 1586 extends between the plate of the diode 1584 and the conductor 1192 which has the left-hand end thereof connected to the junction between the resistors 1084 and 1086.

The numeral 1588 denotes a triode which has the cathode thereof connected to the grounded conductor 854. The resistor 1574, of the voltage divider which also includes the resistors 1576 and 1578, serves as the plate load for that triode. Resistors 1590 and 1592 connect the grid of the triode 1588 to the conductor 821; and a capacitor 1594 couples the plate of the triode 1570 to the junction between those resistors. A capacitor 1596 extends between the grid of triode 1588 and the grounded conductor 854. A capacitor 1597 is connected in parallel with the resistor 1572; and that capacitor will coact with capacitor 1594, resistor 1592 and capacitor 1596 to constitute a by-pass filter for high frequency noise.

The numeral 1598 denotes a triode which has the cathode thereof connected to the grounded conductor 854; and a resistor 1600 connects the plate of that triode to the conductor 821. Resistors 1602, 1604 and 1606 constitute a voltage divider which is connected between the conductors 821 and 953; and the junction between the resistors 1604 and 1606 is connected to the grid of the triode 1598. That voltage divider establishes the normal biasing voltage for the grid of that triode. A capacitor 1608 couples the plate of the triode 1588 to the grid of the triode 1598.

The numeral 1610 denotes a triode which has the cathode thereof connected to the grounded terminal 854. The resistor 1602, of the voltage divider which also includes the resistors 1604 and 1606, serves as the plate load for that triode. Adjustable resistor 1612 and resistors 1614 and 1616 connect the grid of triode 1610 to the conductor 821. A capacitor 1618 couples the plate of triode 1598 to the junction between the resistors 1614 and 1616. A capacitor 1620 is connected intermediate the grid of the triode 1610 and the grounded conductor 854.

The resistor 1616 and the capacitor 1620 serve as a low pass filter to keep the grid of triode 1610 from being responsive to high frequency noise in the filament circuit. That filter and the corresponding filters used with some of the triodes of the other monostable vibrators, are particularly desirable because the gradual rises of the grid voltages of those triodes make it possible for noise pulses to prematurely render those triodes conductive.

Resistors 1622, 1624 and 1626 are connected between the conductors 821 and 953, and they constitute a voltage divider that establishes the biasing voltage for the thyratron 1186. A resistor 1194 and a capacitor 1196 are connected intermediate the plate and the grounded screen grid of that thyratron, all as shown by FIG. 25. A diode 1628 is connected intermediate the plate of triode 1610 and the junction 1630 between the resistors 1622 and 1624. The right-hand terminal of the capacitor 1193 is connected to a junction 1684 intermediate the control grid of thyratron 1186 and the junction between resistors 1622 and 1624.

Referring to FIG. 26, the numeral 1072 denotes a pentode. The triodes 1082 and 1090 constitute a Schmitt trigger.

The numeral 1640 denotes a triode which has the cathode thereof connected to the grounded conductor 854; and a resistor 1642 extends between the plate of that triode and the conductor 821. Resistors 1644, 1646 and 1648 are connected intermediate the conductors 821 and 953 and constitute a voltage divider which establishes the biasing voltage for the grid of the triode 1640. Resistors 1650 and 1652 also are connected between the conductors 821 and 953, and those resistors constitute a voltage divider which establishes the anode voltage for a diode 1654. The cathode of that diode is connected to the grid of the triode 1640, and the voltage divider which includes the resistors 1644, 1646 and 1648 will establish the value of the voltage at that cathode. A capacitor 1656 extends between the anode of the diode 1654 and the junction between the resistors 1084 and 1086.

The numeral 1659 denotes a triode which has the cathode thereof connected to the grounded conductor 854; and the resistor 1644, which coacts with the resistors 1646 and 1648 to constitute a voltage divider, also serves as the plate load for that triode. An adjustable resistor 1658 and resistors 1660 and 1662 connect the grid of that triode to the conductor 821. A capacitor 1664 extends from the plate of the triode 1640 to the junction between the resistors 1660 and 1662. A capacitor 1666 extends between the grid of the triode 1659 and the grounded conductor 854.

The conductor 821 in FIG. 26 is connected to the conductor 821 in FIG. 25 by a conductor 1672 and a junction 1632; and the right-hand end of the conductor 821 in FIG. 25 will be suitably connected to the third terminal of the right-hand section of the connector plug 823 in FIG. 23. The plate of the triode 1659 in FIG. 26 is connected to the junction 1630 in FIG. 25 by a conductor 1668 and a diode 1670. The conductors 854 and 953 in FIG. 26 are, respectively, connected to the similarly-numbered conductors in FIG. 25 by the conductors 1674 and 1676. The plate of the thyratron 1186 in FIG. 25 will be suitably connected to the fourth terminal of the right-hand section of the connector plug 823, the right-hand end of the grounded conductor 854 in FIG. 25 will be suitably connected to the eighth terminal of that section of that connector plug, and the right-hand end of the conductor 953 will be suitably connected to the fifth terminal of that section of that connector plug. The filaments of the pentodes 1072, of the triodes 1082, 1090, 1570, 1588, 1598, 1610, 1640 and 1659, and of thyratron 1186 will be suitably connected to the sixth and eighth terminals of the right-hand section of the connector plug 823 in FIG. 23.

In the normal, at-rest condition of the circuits of FIGS. 25 and 26, the pentodes 1072 will be conducting current, the triodes 1082 will be non-conductive, the triodes 1090 will be conducting current, the triode 1570 will be non-conductive, the triode 1588 will be conducting current, the triode 1598 will be non-conductive, the triode 1610 will be conducting current, the triode 1640 will be non-conductive, the triode 1659 will be conducting current, and the thyratron 1186 will be non-conductive. The current flow through the resistor 1574 will be due, to a considerable extent, to the fact that the triode 1588 is conducting current; and that current flow will be great enough to make the value of the cathode voltage of diode 1584 less than the plate voltage of that diode. As a result, that diode will be able to transmit a positive-going signal to the grid of triode 1570. The current flow through the resistor 1644 will be due, to a considerable extent, to the fact that the triode 1659 is conducting current; and that current flow will be great enough to make the value of the cathode voltage of diode 1654 less than the plate voltage of that diode. As a result, that diode will be able to transmit a positive-going signal to the grid of triode 1640. Current will flow through the resistor 1622, and that current flow will be due, to a considerable extent, to the fact that the triodes 1610 and 1659 are conducting current. That current flow will be great enough to make the grid voltage of the thyratron 1186 sufficiently negative to bias that thyratron beyond cut-off.

When the white border of a bill 400 intercepts the beam of light from the lamp 762, the intensity of the light received by the light-sensitive element 770 will increase, with a consequent increase in the voltage at the plate of the pentode 1072 in FIG. 25 and with a consequent decrease in the voltage at the junction between the resistors 1084 and 1086. The capacitor 1193 will differentiate the negative-going voltage at the junction between resistors 1084 and 1086 and will couple the resulting signal to the control grid of the thyratron 1186. That signal will not change the condition of that thyratron but will merely drive that second grid more negative. The capacitor 1586 also will differentiate the negative-going voltage at the junction between resistors 1084 and 1086 and will couple the resulting signal to the plate of the diode 1584. However, that diode will block any negative-going signals which are applied to the plate thereof, and hence that signal will not be transmitted to the grid of the triode 1570. As a result, the interception of the beam of light from the lamp 762 by the white border of the bill 400 will not change the conditions of triode 1570 or of thyratron 1186.

When the green area, which is intermediate the white border and the white "TWO," intercepts the light beam from the lamp 762, the intensity of the light received by the light-sensitive element 770 will decrease with a consequent decrease in the voltage at the plate of the pentode 1072 in FIG. 25 and with a consequent increase in the voltage at the junction between the resistors 1084 and 1086. The capacitor 1193 will differentiate the positive-going voltage at that junction and will couple the resulting signal to the control grid of the thyratron 1186. While that signal will drive that grid in the positive direction, the amplitude of that signal will be insufficient, in and of itself, to render that thyratron conductive.

The capacitor 1586 also will differentiate the positive-going signal at the junction between the resistors 1084 and 1086 and will couple the resulting signal to the anode of the diode 1584. Because that signal is positive-going, and because the triode 1588 is conducting current and is thus maintaining the value of the cathode voltage of that diode below the value of the anode voltage of that diode, that diode will transmit that signal to the grid of the triode 1570. Thereupon, that triode will become conductive; and the resulting current flow through the resistor 1572 will decrease the voltage at the plate of that triode. The capacitor 1594 will couple the decerase in voltage at the plate of triode 1570 to the grid of triode 1588 via conductor 1592; and thereupon the triode 1588 will become non-conductive. The resulting increased voltage at the plate of the triode 1588 will increase the value of the cathode voltage of the diode 1584 above the level of the value of the anode voltage of that diode and thereby cause that diode to block all further signals which are coupled to it by the capacitor 1586. The resulting increased voltage at the plate of the triode 1588 will also increase the value of the voltage at the grid of the triode 1570, and will thereby keep that triode conductive.

As the voltage at the plate of the triode 1570 decreased, the capacitor 1594 started discharging through the resistor 1590; and as that capacitor discharges it will apply a negative voltage to the grid of the triode 1588 and thereby keep that triode non-conductive. The values of the capacitor 1594 and of the resistor 1590 are selected so the discharging of that capacitor will keep the triode 1588 non-conductive for about twelve hundred and fifty milliseconds. This means that during the said twelve hundred and fifty milliseconds the diode 1584 will block all signals which are applied to it by the capacitor 1586.

As the triode 1588 becomes non-conductive, the capacitor 1608 will differentiate the positive-going voltage at the plate of that triode and will couple the resulting signal to the grid of the triode 1598. Thereupon that triode will become conductive, and the resulting voltage drop across the resistor 1600 will reduce the voltage at the plate of that triode. The capacitor 1618 will couple that decreased voltage to the grid of the triode 1610 and thereby render that triode non-conductive. The resulting decrease in voltage drop across the resistor 1602 will increase the grid voltage of the triode 1598 and thereby keep that triode conductive. The change of the triode 1610 from the conductive to the non-conductive state also will block further current flow from resistor 1622 through the diode 1628 and will thereby decrease the voltage drop across that resistor. Thereupon the voltage at the control grid of the thyratron 1186 will move in the positive direction; but that movement will be limited because current will still be flowing through resistor 1622, diode 1670 and triode 1659. As a result, while the voltage at the control grid of thyratron 1186 will be a volt or so less negative, that voltage will still be well beyond cut-off.

As the triode 1598 became conductive, the drop in voltage at the plate of that triode enabled the capacitor 1618 to start discharging through the resistors 1614 and 1612. As that capacitor discharges it will apply a negative voltage to the grid of the triode 1610 and thereby keep that triode non-conductive. The values of the capacitor 1618 and of the resistors 1612 and 1614 are selected so the discharging of that capacitor will keep the triode 1610 non-conductive for one hundred and sixty-four milliseconds. This means that during the said one hundred and sixty-four milliseconds no current will be able to flow through the diode 1628.

When the white "TWO" intercepts the light beam from the lamp 762, the intensity of the light received by the light-sensitive element 770 will increase with a consequent increase in the voltage at the plate of pentode 1072 in FIG. 25 and with a consequent decrease in the voltage at the junction between resistors 1084 and 1086. The capacitor 1193 will differentiate the negative-going voltage at that junction and will apply the resulting signal to the control grid of thyratron 1186. That signal will be unable to change the condtion of that thyratron because that signal will merely drive that control grid further in the negative direction. The capacitor 1586 also will differentiate the negative-going voltage at the junction between resistors 1084 and 1086 and will apply the resulting signal to the plate of the diode 1584. However, that diode will block that signal; and the overall result is that the interception of the light beam from the lamp 762 by the white "TWO" will not change the conditions of thyratron 1186 or of triodes 1570, 1588, 1598 and 1610.

When the green area, intermediate the white "TWO" and the white area surrounding the picture of Monticello, intercepts the light beam from the lamp 762, the intensity of the light received by the light-sensitive element 770 will decrease with a consequent decrease in voltage at the plate of the pentode 1072 in FIG. 25 and with a consequent increase in voltage at the junction between the resistors 1084 and 1086. The capacitor 1193 will differentiate the positive-going voltage at that junction and will couple the resulting signal to the control grid of the thyratron 1186. While that signal will drive that grid in the positive direction, the amplitude of that signal will be insufficient, in and of itself, to render that thyratron conductive. The capacitor 1586 also will differentiate the positive-going voltage at the junction between the resistors 1084 and 1086 and will couple the resulting signal to the plate of the diode 1584. Because the triode 1588 is still non-conductive, that diode will block that signal. The overall result is that the interception of the light beam from the lamp 762 by the green area, intermediate the white "TWO" and the white area surrounding the picture of Monticello, will not change the conditions of thyratron 1186 or of triodes 1570, 1588, 1598 and 1610.

When the white area surrounding the picture of Monticello intercepts the light beam from the lamp 762, the intensity of the light received by the light-sensitive element 770 will increase with a consequent increase in the voltage at the plate of the pentode 1072 in FIG. 25 and with a consequent decrease in the voltage at the junction between the resistors 1084 and 1086. The capacitor 1193 will differentiate the negative-going voltage at that junction and will apply the resulting signal to the control grid of thyratron 1186. That signal will be unable to change the condition of that thyratron because that signal will merely drive that control grid further in the negative direction. The capacitor 1586 also will differentiate the negative-going voltage at the junction between resistors 1084 and 1086 and will apply the resulting signal to the plate of the diode 1584. However that diode will block that signal; and the overall result is that the interception of the light beam from the lamp 762 by the white area surrounding the picture of Monticello will not change the conditions of thyratron 1186 or of triodes 1570, 1588, 1598 and 1610.

At this time, the leading edge of the bill 400 will be close to the light beam from the lamp 1562; and before the white area surrounding the picture of Monticello passes beyond the light beam from the lamp 762, the white border of that bill will intercept the light beam from the lamp 1562. Thereupon the intensity of the light received by the light-sensitive element 1564 will increase with a consequent increase in the voltage at the plate of the pentode 1072 in FIG. 26 and with a consequent decrease in voltage at the junction between the resistors 1084 and 1086. The capacitor 1656 will differentiate the negative-going voltage at the junction between the resistors 1084 and 1086 and will couple the resulting signal to the plate of the diode 1654. However, that diode will block all negative-going signals applied to the plate thereof; and hence the overall result is that the interception of the light beam from the lamp 1562 by the white border of the bill 400 will not change the condition of thyratron 1186 or of the triodes 1640 and 1659.

Also before the white area surrounding the picture of Monticello passes beyond the light beam from the lamp 762, the green area between the white border and the white "TWO" will intercept the light beam from the lamp 1562. Thereupon the intensity of the light received by the light-sensitive element 1564 will decrease with a consequent decrease in the voltage at the plate of the pentode 1072 in FIG. 26 and with a consequent increase in voltage at the junction between the resistors 1084 and 1086. The capacitor 1656 will differentiate the positive-going voltage at the junction between the resistors 1084 and 1086 and will couple the resulting signal to the anode of the diode 1654. Because that signal is positive-going and because the triode 1659 is conducting current, the diode 1654 will transmit that signal to the grid of the triode 1640. Thereupon that triode will become conductive, and the resulting voltage drop across the resistor 1642 will reduce the plate voltage of that triode. The capacitor 1664 will couple that decrease in plate voltage to the grid of triode 1659, thereby rendering that triode non-conductive. The resulting increase in voltage at the plate of triode 1659 will increase the grid voltage of triode 1640 and thereby keep that latter triode conductive. Also the resulting increase in voltage at the plate of triode 1659 will increase the cathode voltage of diode 1654 and thereby cause that diode to block substantially all further signals applied to the plate thereof by the capacitor 1656.

As the triode 1659 becomes non-conductive it will block further current flow through the diode 1670 in FIG. 25. The resulting decrease in voltage drop across the resistor 1622 will be appreciable and will drive the control grid of the thyratron 1186 in the positive direction, as indicated by the numeral 1692. However, the normal negative bias on that control grid is so sizable that the shifting of both the triodes 1610 and 1659 from the conductive to the nonconductive states will be unable to render the thyratron 1186 conductive. The overall result is that the interception of the light beam from the lamp 1562 by the green area between the white border and the white "TWO" will make the bias voltage at the control grid of the thyratron 1186 much less negative, as indicated by the numeral 1692 in FIG. 28, but will not render that thyratron conductive.

When the triode 1640 became conductive, and thereby reduced the voltage at the plate thereof, the capacitor 1664 began discharging through the resistors 1660 and 1658. As that capacitor discharges it will apply a negative voltage to the grid of the triode 1659 and thereby keep that triode non-conductive. The values of the capacitor 1664 and resistors 1660 and 1658 are selected so the discharging of that capacitor will keep the triode 1659 non-conductive for twenty-six milliseconds. This means that during the said twenty-six milliseconds the diode 1654 will block all signals applied to it by the capacitor 1656, and the control grid of the thyratron 1186 will be less-heavily biased in the negative direction.

If the bill 400 is an authentic two dollar bill, the trees at the leading edge of the picture of Monticello will intercept the light beam from the lamp 762 during the one hundred and sixty-four millisecond period established by the capacitor 1618 and the resistors 1614 and 1612 and during the twenty-six millisecond period established by capacitor 1664 and resistors 1660 and 1658. The intensity of the light received by the light-sensitive element 770 will decrease with a consequent decrease in voltage at the plate of the pentode 1072 in FIG. 25 and with a consequent increase in voltage at the junction between the resistors 1084 and 1086. The capacitor 1193 will differentiate the positive-going voltage at the junction between the resistors 1084 and 1086 and will couple the resulting signal 1694 to the control grid of the thyratron 1186. That signal will be too small, in and of itself, to render that thyratron conductive but it will coact with the signal 1692 to make that thyratron conductive. As the thyratron 1186 becomes conductive, the capacitor 1196 will start discharging through that thyratron; and very promptly the voltage across that capacitor, and thus the voltage at the plate of that thyratron, will fall sufficiently to cut off that thyratron. That capacitor will then recharge, with consequent energization of the relay coil 818 in FIG. 22.

The magnetic face of the bill 400 will have previously coacted with the magnetic head 244 and with the circuit of FIG. 21 to energize the relay coil 428 in FIG. 22. As a result, the relay coil 520 in FIG. 22 will be energized; and this means that when the leading edge of the bill shifts the actuator 292 of the switch 290, as it will do almost immediately after the ends of the one hundred and sixty-four and the twenty-six millisecond periods, the motor 188 will be kept operating in the same direction and the bill will be passed out through the opening 136 in the rear plate 42. In this way the bill will be delivered to the cash box.

At the conclusions of the said one hundred and sixty-four and the said twenty-six millisecond periods, enough of the charges on the capacitors 1618 and 1664 will have leaked off, respectively, through the resistors 1614 and 1612 and through the resistors 1660 and 1658 to permit the triodes 1610 and 1659 to become conductive once again. The resulting increases in voltage drops across the resistors 1602 and 1644 will cause the grid voltages of the triodes 1598 and 1640 to fall below cut-off; and those triodes will again become non-conductive. Also the increase in voltage drop across the resistor 1644 will decrease the cathode voltage of diode 1654 sufficiently to enable that diode to again transmit positive-going signals applied to its plate by the capacitor 1656. As the triodes 1610 and 1659 again become conductive, current will again flow through resistor 1622, diode 1628 and triode 1610 and through resistor 1622, diode 1670 and triode 1659. The resulting increase in voltage drop across the resistor 1622 will cause the voltage at the control grid of thyratron 1186 to again fall well below cut-off. The capacitor 1196 will have previously responded to the firing of the thyratron 1186 to start discharging through that thyratron, and such discharging will have previously reduced the voltage across that thyratron to the point where that thyratron became non-conductive, all as explained hereinbefore.

Subsequently, and approximately twelve hundred and fifty milliseconds after the triode 1570 in FIG. 25 became conductive, enough of the charge on capacitor 1594 will have leaked off through the resistor 1590 to enable the triod 1588 to become conductive once again. The resulting increase in voltage drop across the resistor 1574 will cause the grid voltage of triode 1570 to fall below cut-off; and that triode will again become non-conductive. Also the resulting increase in voltage drop across the resistor 1574 will decrease the cathode voltage of the diode 1584 sufficiently to enable that diode to again transmit positive-going signals applied to its plate by the capacitor 1586. At this time the circuits of FIGS. 25 and 26 will again be in their normal, at rest, conditions.

To be accepted, the bill 400 had to accomplish five things. First, it had to cause the circuit of FIG. 25 to cut off current flow through resistor 1622 and diode 1628 for one hundred and sixty-four milliseconds, second, it had to cause the circuit of FIG. 26 to cut off current flow through resistor 1622 and diode 1670 for twenty-six milliseconds, third, it had to cause the magnetic head 244 and the circuit of FIG. 21 to energize the relay coil 428 in FIG. 22, fourth, it had to cause the circuit of FIG. 25 to fire the thyratron 1186 by applying a positive-going signal to the control grid of that thyratron during the said one hundred and sixty-four and the said twenty-six millisecond periods, and fifth, it had to accomplish all of those four things before the leading edge thereof shifted the actuator 292 of the switch 290. If that bill had failed to accomplish all of those five things, the motor 188 would have been reversed when the leading edge of that bill shifted the actuator 292, and the bill would have been returned to the patron.

The circuits of FIGS. 25 and 26 are desirable because they make it possible to accept authentic two dollar bills even if the speed of the motor 188 were, somehow, to increase moderately. This is due to the fact that the use of two light-sensitive elements enables those circuits to rely upon substantially simultaneous sensing of the two spaced areas on the bill rather than to rely upon a timed "memory" plus a timed movement of the bill.

The monostable multivibrators which consist, respectively, of the triodes 1570 and 1588 and the triodes 1598 and 1610 plus their associated resistors and capacitors, are important where acceptance of substantially all authentic two dollar bills is desired. Those multi-vibrators make it possible to maintain a high degree of rejection of unacceptable bills while also accepting authentic two dollar bills which do not have the engravings thereof squarely centered. Specifically, by using the said multi-vibrators, and by spacing actuator 292 of the switch 290 a fraction of an inch further toward the rear plate 42, the present invention gives authentic two dollar bills a full opportunity to render the thyratron 1186 conductive even if the engravings on those bills are off-center.

If the rejection of an appreciable percentage of authentic two dollar bills which have off-center engravings is acceptable, and if reduced cost is important, the components within the dashed-line enclosure on FIG. 25 can be replaced by the components in FIG. 27. To effect such replacement, it is only necessary to connect the left-hand end of the conductor 1192 in FIG. 27 to the junction between resistors 1085 and 1086 in FIG. 25, to connect the left-hand end of conductor 821 in FIG. 27 to the upper ends of resistors 1062, 1074, 1084 and 1092 while connecting the right-hand end of that conductor to the junction 1632, to connect the junction 1684 to the control grid of thyratron 1186, to connect the left-hand end of conductor 854 to the lower ends of connector plug 1060, capacitor 1066, and resistors 1070, 1080 and 1088 and to the cathode of pentode 1072 while connecting the right-hand end of that conductor to the cathode of thyratron 1186, and to connect the left-hand end of conductor 953 to the lower end of resistor 1098 while connecting the right-hand end of that conductor to the fifth terminal of the right-hand section of connector plug 823 in FIG. 23.

With such replacement, current will flow from conductor 953 through resistors 1626, 1680 and 1644 to conductor 821 in FIG. 27 and thereby establish a negative voltage at the junction 1684 and thus at the control grid of the thyratron 1186. As long as the triode 1659 is conducting current, that negative voltage will bias that thyratron heavily beyond cut off. When that triode becomes non-conductive, that negative voltage will be reduced but will still bias that thyratron beyond cut off.

With the substitution of the components of FIG. 41 for the components within the dashed-line enclosed on FIG. 25, the green area intermediate the white border and the white "TWO," the green area between that "TWO" and the white area surrounding the picture of Monticello, and the trees at the leading edge of the picture of Monticello will successively decrease the intensity of light received by the light-sensitive element 770, with a consequent decrease in plate voltage of pentode 1072 in FIG. 25 and with a consequent increase in voltage at the junction between resistors 1084 and 1086. The capacitor 1193 will differentiate each of those positive-going voltages and will apply the resulting signals to the control grid of thyratron 1186.

At the time the signal corresponding to the green area intermediate the white border and the white "TWO" is applied to that control grid, and at the time the signal corresponding to the green area intermediate that "TWO" and the white area surrounding the picture of Monticello is applied to that control grid, the leading edge of the bill will not yet have reached the light beam from the lamp 1562. Consequently, the application, to the control grid of thyratron 1186, of the signals corresponding to those green areas will not be able to render that thyratron conductive.

Before the signal corresponding to the trees at the leading edge of the picture of Monticello is applied to the control grid of thyratron 1186, the green area intermediate the white border and the white "TWO" will intercept the beam of light from lamp 1562. That interception will cause the circuit of FIG. 26 to make the triode 1659 non-conductive, all as explained hereinbefore. As that triode becomes non-conductive the voltage drop across the resistor 1644 will decrease and will thereby permit the voltage at the second grid of the thyratron 1186 to move in the positive direction. While that voltage will not move far enough to render that thyratron conductive, it will move far enough to enable the signal which corresponds to the trees at the leading edge of the picture of Monticello to render that thyratron conductive. The discharging of the capacitor 1664 will keep the triode 1659 non-conductive for twenty-six milliseconds, and if the bill is an authentic two dollar bill, the signal corresponding to the trees at the leading edge of the picture of Monticello will be applied to the control grid of that thyratron during that period of time.

The circuit of FIG. 27 will accept substantially all authentic two dollar bills which have the engravings thereof squarely centered or which have those engravings displaced toward the leading edges of those bills. However, that circuit may well reject authentic two dollar bills that have the engravings thereof displaced toward the trailing edges thereof, because the leading edges of such bills may shift the actuator 292 of the switch 290 before the signal corresponding to the trees at the leading edge of the picture of Monticello can be applied to the control grid of the thyratron 1186. If bills of this latter type are rejected, they can be accepted by turning them end-for-end and then reinserting them in the bill-transporting device.

The twenty-six millisecond period established by the capacitor 1664 and resistors 1660 and 1658 of FIG. 26 is desirable because it compensates for shrinking or stretching of the paper of authentic bills. Also that twenty-six millisecond period compensates for lateral displacement of the engraving relative to the longitudinally-extending center line of the bill-transporting device. Absent the compensation provided by that twenty-six millisecond period, stretched and shrunken and laterally-offset bills could be rejected by the currency detector.

If desired the twenty-six millisecond gate could be supplied in response to changes in the intensity of the light received by the light-sensitive element 770 of FIG. 24 rather than in response to changes in the intensity of the light received by the light-sensitive element 1564. All that one need do to attain this result is to disconnect the left-hand end of the conductor 1192 from the junction between resistors 1084 and 1086 in FIG. 25 and connect that end to the junction between resistors 1084 and 1086 in FIG. 26 and to disconnect the left-hand terminal of capacitor 1656 from the junction between resistors 1084 and 1086 in FIG. 25 and connect that terminal to the junction between resistors 1084 and 1086 in FIG. 26.

In FIGS. 25 and 26, Schmitt triggers are shown; and such triggers are desirable because they provide signals that have definitely-limited amplitudes and that have wave forms which can be readily differentiated. However, other electronic subcircuits could be used to provide the desired limitation of amplitude and to provide the desired wave forms. For example, in some cases biased diodes or zener diodes could be used to provide the desired limitation of amplitude; and monostable multivibrators could be used to provide the desired wave forms or the desired limitation of amplitude, or both. A thyratron has been shown in FIG. 25, but some other threshold device could be used instead of that thyratron.

The circuit of FIG. 25 can reject any bills which are appreciably slowed down by the patron. Specifically, if a patron momentarily holds onto the trailing edge of an inserted bill, or if a patron uses a thread, tape or other attachment to apply a retarding force to a bill being moved toward the rear plate 42, the circuit of FIG. 25 will reject that bill because the trees at the edge of the picture of Monticello will not intercept the light beam from lamp 762 while the twenty-six millisecond "gate" is applied to the control grid of thyratron 1186. As a result, the circuit of FIG. 25 will discourage patrons from trying to interfere with proper movement of the bill toward the rear plate 42.

In FIG. 25, the triodes 1570 and 1588 and their associated resistors, diode and capacitors effectively block the firing of the thyratron 1186 after the end of the one hundred and sixty-four millisecond period established by the triodes 1598 and 1610 and their associated resistors, diode and capacitors. If the rejection of some authentic two dollar bills with off-center engravings is acceptable, it is possible to move the actuator 292 of the switch 290 closer to the front plate 36 of the bill-transporting device and to eliminate the triodes 1570 and 1588 and their associated resistors, diode and capacitors. It is also possible, as indicated by FIG. 27, to eliminate the triodes 1588 and 1610 and their associated resistors, diode and capacitors; because the rearward displacement of the light-sensitive element 1564 coacts with the need of obtaining a signal from that element to block the firing of the thyratron 1186 until after the initiation of the twenty-six millisecond period.

Referring to FIG. 29, the numerals 1700 and 1702 denote the triodes of a Schmitt trigger. The plate of triode 1700 is connected to conductor 821 by means of a resistor 1704 and the plate of triode 1702 is connected to that conductor by means of a resistor 1708. The cathodes of those triodes are connected together and are connected to the grounded conductor 854 by a resistor 1706. Resistors 1710 and 1712 coact with the resistor 1704 to constitute a voltage divider that is connected between conductors 821 and 953 and that establishes the bias voltage for the grid of triode 1702. A capacitor 1714 is connected between the plate of triode 1700 and the grid of triode 1702.

The upper terminal of the connector plug 1060 is connected directly to the conductor 821, and the lower terminal of that connector plug is connected to the conductor 854 by means of a potentiometer 1716. The movable contact of that potentiometer is connected directly to the grid of triode 1700.

The conductor 1192 and the capacitor 1193 and a resistor 1718 are serially-connected intermediate the plate of triode 1700 and a junction 1742 adjacent the control grid of thyratron 1186. The plate of that thyratron will be connected to the fourth terminal of the right-hand section of connector plug 823 in FIG. 23. The cathode of that thyratron is connected to the conductor 854, and the right-hand end of that conductor will be connected to the eighth terminal of that section of that connector plug. The right-hand ends of conductors 821 and 953 will, respectively, be connected to the third and fifth terminals of that section of that connector plug. The capacitor 1196 and the resistor 1194 are connected in parallel with the thyratron 1186. A resistor 1744 is connected between conductor 953 and the control grid of thyratron 1186, and a resistor 1719 is connected between the upper terminal of resistor 1718 and the grounded conductor 854; and the resulting current flow through resistors 1744, 1718 and 1719 will provide a negative bias for that thyratron.

The numerals 1720 and 1722 denote the triodes of a second Schmitt trigger. The plate of triode 1720 is connected to conductor 821 by means of a resistor 1724, and the plate of triode 1722 is connected to that conductor by means of a resistor 1728. The cathodes of those triodes are connected together and are connected to the grounded conductor 854 by a resistor 1726. Resistors 1730 and 1732 coact with the resistor 1724 to constitute a voltage divider that is connected between conductors 821 and 953 and that establishes the bias voltage for the grid of triode 1722. A capacitor 1734 is connected between the plate of triode 1720 and the grid of triode 1722.

The upper terminal of the connector plug 1566 is connected directly to the conductor 821, and the lower terminal of that connector plug is connected to the conductor 854 by means of a potentiometer 1736. The movable contact of that potentiometer is connected directly to the grid of triode 1720. A conductor 1737 and a capacitor 1738 and a resistor 1740 are serially-connected intermediate the plate of triode 1720 and the junction 1742. A resistor 1739 is connected between conductor 854 and the junction between capacitor 1738 and resistor 1740; and that resistor will coact with the resistors 1740 and 1744 to provide a negative bias for the thyratron 1186.

In the normal, at-rest condition of the circuit of FIG. 29, the voltage divider which includes the resistors 1704, 1710 and 1712 will provide a positive voltage at the grid of triode 1702, and the voltage divider which includes the resistors 1724, 1730 and 1732 will provide a positive voltage at the grid of triode 1722. As a result, both of those triodes will normally conduct current. Current also will normally flow through the light-sensitive element 770, connected to connector plug 1060, and through the potentiometer 1716, and that current flow will provide a positive voltage at the grid of triode 1700. However the normal voltage drop across the resistor 1706 is sufficiently greated than the normal voltage drop across the lower portion of the potentiometer 1716 to make the grid of triode 1700 negative with respect to the cathode of that triode, and thereby normally render that triode non-conductive. Current also will normally flow through the light-sensitive element 1564, connected to the connector plug 1566, and through potentiometer 1736, and that current flow will provide a positive voltage at the grid of triode 1720. However the normal voltage drop across the resistor 1726 is sufficiently greater than the normal voltage drop across the lower portion of the potentiometer 1736 to make the grid of triode 1720 negative with respect to the cathode of that triode, and thereby normally render that triode non-conductive. The negative bias on the grid of the thyratron 1186 is so large that the said thyratron is normally biased beyond cut off. As a result, the triodes 1702 and 1722 are normally conducting current, the triodes 1700 and 1720 are normally non-conductive, and the thyratron 1186 is normally non-conductive.

When the white border of a bill 400 intercepts the beam of light from the lamp 762, the intensity of the light received by the light-sensitive element 770 will increase, with a consequent increase in conductivity of that element and with a consequent increase in the voltage at the grid of triode 1700. That triode will become conductive; and the resulting flow of current through the resistor 1704 will reduce the voltage at the plate of that triode. The capacitor 1193 will differentiate that negative-going voltage to provide a negative-going spike and will couple the resulting signal to the control grid of thyratron 1186 via resistor 1718. That signal will not change the condition of that thyratron but will merely drive the grid of that thyratron more negative. The values of capacitor 1193 and resistor 1719 are selected so that as the charge on capacitor 1193 changes, due to the change in voltage at the plate of triode 1700, the control grid of thyratron 1186 will be kept more negative for about thirty milliseconds.

The said decrease in voltage at the plate of triode 1700 also will reduce the voltage at the junction between the resistors 1710 and 1712, and that decrease in voltage at the plate of triode 1700 also will be coupled to the grid of triode 1702 by the capacitor 1714. The overall result is that the triode 1700 will promptly become conductive and the triode 1702 will promptly become non-conductive.

When the green area, which is intermediate the white border and the white "TWO," intercepts the light beam from the lamp 762, the intensity of the light received by the light-sensitive element 770 will decrease with a consequent decrease in conductivity of that element and with a consequent decrease in the voltage at the grid of triode 1700. That triode will become non-conductive, and the resulting decrease in voltage drop across the resistor 1704 will cause the voltage at the plate of triode 1700 to increase. The capacitor 1193 will differentiate that positive-going voltage to provide a positive-going spike and will couple the resulting signal to the control grid of thyratron 1186 via resistor 1718. That signal will make that grid less negative, but the amplitude of that signal will not be great enough, in and of itself, to overcome the negative bias on that grid. As the charge on capacitor 1193 changes, due to the change in voltage at the plate of triode 1700, the control grid of thyratron 1186 will be kept less negative for about thirty milliseconds.

The said increase in voltage at the plate of triode 1700 also will increase the voltage at the junction between the resistors 1710 and 1712, and that increase in voltage at the plate of triode 1700 also will be coupled to the grid of triode 1702 by the capacitor 1714. The overall result is that the triode 1700 will become non-conductive once again and the triode 1702 will become conductive once again.

When the "TWO" intercepts the light beam from the lamp 762, the intensity of the light received by the light-sensitive element 770 will increase, with a consequent decrease in voltage at the plate of triode 1700. The capacitor 1193 will differentiate that negative-going voltage to provide a negative-going spike and will couple the resulting signal to the control grid of thyratron 1186 via resistor 1718. That signal will not change the condition of that thyratron but will merely drive the grid of that thyratron more negative. As the charge on capacitor 1193 changes, due to the change in voltage at the plate of triode 1700, the control grid of thyratron 1186 will be kept more negative for about thirty milliseconds. The said decrease in voltage at the plate of triode 1700 also will cause the triode 1702 to become non-conductive; and hence the overall result is that the triode 1700 will promptly become conductive and the triode 1702 will promptly become non-conductive.

When the green area, which is intermediate the "TWO" and the white area surrounding the picture of Monticello, intercepts the light beam from the lamp 762, the intensity of the light received by the light-sensitive element 770 will again decrease, with a consequent increase in voltage at the plate of triode 1700. The capacitor 1193 will differentiate that positive-going voltage to provide a positive-going spike and will couple the resulting signal to the control grid of thyratron 1186 via resistor 1718. That signal will make that grid less negative, but the amplitude of that signal will not be great enough, in and of itself, to overcome the negative bias on that grid. As the charge on capacitor 1193 changes, due to the change in voltage at the plate of triode 1700, the control grid of thyratron 1186 will be kept less negative for about thirty milliseconds. The said increase in voltage at the plate of triode 1700 also will cause the triode 1702 to become conductive; and hence the overall result is that the triode 1700 will again become non-conductive and the triode 1702 will again become conductive.

When the white area surrounding the picture of Monticello intercepts the light beam from the lamp 762, the intensity of the light received by the light-sensitive element 770 will increase with a consequent decrease in voltage at the plate of triode 1700. The capacitor 1193 will differentiate that negative-going voltage to provide a negative-going spike and will couple the resulting signal to the control grid of thyratron 1186 via resistor 1718. That signal will not change the condition of that thyratron but will merely drive the grid of that thyratron more negative. As the charge on capacitor 1193 changes, due to the change in voltage at the plate of triode 1700, the control grid of thyratron 1186 will be kept more negative for about thirty milliseconds. The said decrease in voltage at the plate of triode 1700 also will cause the triode 1702 to become non-conductive; and hence the overall result is that the triode 1700 will promptly become conductive and the triode 1702 will promptly become non-conductive.

Before the white area surrounding the picture of Monticello moves beyond the light beam from the lamp 762, the white border of the bill will intercept the beam of light from the lamp 1562. Thereupon the intensity of the light received by the light-sensitive element 1564 will increase with a consequent increase in conductivity of that element and with a consequent increase in the voltage at the grid of triode 1720. That triode will become conductive; and the resulting flow of current through the resistor 1724 will reduce the voltage at the plate of that triode. The capacitor 1738 will differentiate that negative-going voltage to provide a negative-going spike and will couple the resulting signal to the control grid of thyratron 1186 via resistor 1740. That signal will not change the condition of that thyratron but will merely drive the control grid of that thyratron more negative. The values of capacitor 1738 and resistor 1739 are selected so that as the charge on capacitor 1738 changes, due to the change in voltage at the plate of triode 1720, the control grid of thyratron 1186 will be kept more negative for about thirty milliseconds.

The said decrease in voltage at the plate of triode 1720 also will reduce the voltage at the junction between the resistors 1730 and 1732, and that decrease in voltage at the plate of triode 1720 also will be coupled to the grid of triode 1722 by the capacitor 1734. The overall result is that the triode 1720 will become conductive and the triode 1722 will become non-conductive.

When the trees at the leading edge of the picture of Monticello intercept the light beam from the lamp 762, the intensity of the light received by the light-sensitive element 770 will decrease with a consequent increase in voltage at the plate of triode 1700. The capacitor 1193 will differentiate that positive-going voltage to provide a positive-going spike and will couple the resulting signal to the control gird of thyratron 1186 via resistor 1718. That signal will make that grid less negative, but the amplitude of that signal will not be great enough, in and of itself, to overcome the negative bias on that grid. As those trees intercept the beam of light from the lamp 762, the green area which is intermediate the white border and the white "TWO" of the bill will intercept the light beam from lamp 1562. Thereupon the intensity of the light received by light-sensitive element 1564 will decrease with a consequent decrease in conductivity of that element and a consequent decrease in the grid voltage of triode 1720. That triode will become non-conductive; and the plate voltage of that triode will increase. Capacitor 1738 will differentiate that positive-going voltage to provide a positive-going spike and will couple the resulting signal to the control grid of thyratron 1186 via resistor 1740. That signal will not be of sufficient amplitude, in and of itself, to overcome the negative bias on that grid. However, that signal will coact with the signal from the plate of triode 1700 to overcome the negative bias on the control grid of thyratron 1186 and thereby render that thyratron conductive. Capacitor 1196 will then discharge through that thyratron, and the resulting re-charging of that capacitor will energize relay coil 818 in FIG. 22.

In the preceding description, it was assumed that the trees adjacent the picture of Monticello and the green area which is intermediate the white border and the white "TWO" of the bill, respectively, intercepted the light beams from the lamps 762 and 1562 at the same instant. Actually, the thyratron 1186 can become conductive if those trees intercept the light beam from the lamp 762 a few milliseconds before or a few milliseconds after that green area intercepts the light beam from the lamp 1562. Specifically, the thyratron 1186 will be rendered conductive if the signal from the plate of triode 1720 reaches the control grid of thyratron 1186 before too much of the charge on the capacitor 1193 leaks off, or if the signal from the plate of triode 1700 reaches the control grid of thyrathron 1186 before too much of the charge on the capacitor 1738 leaks off. The values selected for the resistors 1744, 1740, 1739, 1718 and 1719 are such that the signals from the plates of triodes 1700 and 1720 can fire the thyratron 1186 if those signals reach the control grid of that thyratron within ten milliseconds of each other. With two dollar bills which have the engravings thereof squarely centered, which have the proper spacings between the various white and green areas thereof, and which move through the bill-transporting device with the longitudinally-extending center lines of the engravings thereof in exact registry with the longitudinally-extending center line of that bill-transporting device, those signals will be able to reach that control grid within ten milliseconds of each other and will thus be able to render the thyratron 1186 conductive.

Almost immediately after the end of that ten millisecond period the leading edge of the bill will cause the actuator 292 to shift the movable contact of the switch 290. Because the thyratron 1186 was rendered conductive, the shifting of that movable contact will not reverse the motor 188. However, if the requisite two signals had not been applied to the control grid of that thyratron within the requisite period, that thyratron would not have become conductive; and the shifting of that movable contact would have caused the motor to reverse. This means that the circuit of FIG. 29 requires an inserted bill to cause that circuit to supply two coincident signals to the control grid of the thyratron 1186 before the leading edge of that bill shifts the movable contact of the switch 290; and if that bill can not cause that circuit to supply those signals, the motor 188 will reverse and thereby return the bill to the patron. The circuit of FIG. 21 will require the inserted bill to supply two signals to the relay coil 428 in FIG. 22 before the leading edge of that bill shifts the movable contact of the switch 290; and if that bill can not cause that circuit to supply those signals, the motor 188 will reverse and thereby return the bill to the patron. Consequently, unless an inserted bill can cause the circuits of FIGS. 21 and 29 to supply the requisite four signals before the leading edge of that bill shifts the movable contact of the switch 290, that bill cannot be accepted.

The initial spacing of the leading edge of the bill away from the lamp 1562 will prevent the firing of the thyratron 1186 until the first green area of that bill intercepts the beam of light from that lamp, and the subsequent actuation of the switch 290 prevents subsequent firing of that thyratron. In this way, the circuit of FIG. 29 permits a bill to be accepted only if that bill has precisely-spaced and precisely-located areas with a predetermined minimal reflectivity on its non-magnetic face.

Referring to FIG. 30, the numeral 1800 denotes part of a platen that is similar to the platen 94 in FIG. 1. Plates 1802 and 1804 are secured to the upper face of that platen; and while those plates are generally similar to the plates 126 and 130 in FIG. 1, those plates have narrower foot-like flanges than do the plates 126 and 130. A slot 1806 is provided at the longitudinally-extending center-line of the platen 1800; and shorter slots 1808 and 1823 are provided in that platen intermediate the slot 1806 and the plates 1804 and 1802, respectively. Similar slots will be formed in the lower platen, not shown; and those slots will be in registry with the slots 1806, 1808 and 1823.

Lamps 762 and 1562 will be mounted on a bracket that is suitably secured to that lower platen; and light-sensitive elements 770 and 1564 also will be mounted on that bracket. Those lamps and those light-sensitive elements are identical to the similarly-numbered lamps and light-sensitive elements shown in FIG. 24. Further, those lamps and those light-sensitive elements are mounted in the same positions in which the similarly-numbered lamps and light-sensitive elements shown in FIG. 24 are mounted.

A lamp 1810 and a light-sensitive element 1812 are mounted in register with the slot 1808, and a lamp 1824 and a light-sensitive element 1826 are mounted in register with the slot 1823. The lamps 1810 and 1824 are similar to the lamp 762 or to the lamp 1562, and the light-sensitive elements 1812 and 1826 are similar to the light-sensitive element 770 or to the light-sensitive element 1564. The lamp 1810 and the light-sensitive element 1812 will be suitably supported by a second bracket, and the lamp 1824 and the light-sensitive element 1826 will be suitably supported by a third bracket.

The light-sensitive element 770 will be connected to the connector plug 1060 in FIG. 25, the light-sensitive element 1564 will be connected to the connector plug 1566 of a circuit like the circuit of FIG. 26, the light-sensitive element 1812 will be connected to the connector plug 1566 of a second circuit like the circuit of FIG. 26, and the light-sensitive element 1826 will be connected to the connector plug 1566 of a circuit like the circuit of FIG. 26.

FIG. 31 shows the thyratron 1186, the capacitor 1196, the diodes 1628 and 1670, and the resistors 1622, 1624, 1626 and 1194 of FIG. 25; but FIG. 31 additionally shows diodes 1814 and 1828 and conductors 1816, 1818, 1820, 1822, 1830, 1832, 1834 and 1836. The diode 1814 and the conductor 1816 connect the plate of triode 1659 of the second circuit like the circuit of FIG. 26 to the junction 1630, the diode 1670, and the conductor 1668 connect the plate of triode 1659 of the first circuit like the circuit of FIG. 26 to the junction 1630 and the diode 1828 and the conductor 1830 connect the plate of triode 1659 of the third circuit like the circuit of FIG. 26 to the junction 1630. The conductor 1818 connects the conductor 854 of the second circuit like the circuit of FIG. 26 to the conductor 854 of the circuit of FIG. 25, the conductor 1674 connects the conductor 854 of the first circuit like the circuit of FIG. 26 to the conductor 854 of the circuit of FIG. 25, and the conductor 1832 connects the conductor 854 of the third circuit like the circuit of FIG. 26 to the conductor 854 of the circuit of FIG. 25. The conductor 1820 connects the conductor 953 of the second circuit like the circuit of FIG. 26 to the conductor 953 of the circuit of FIG. 25, the conductor 1676 connects the conductor 953 of the first circuit like the circuit of FIG. 26 to the conductor 953 of the circuit of FIG. 25, and the conductor 1834 connects the conductor 953 of the third circuit like the circuit of FIG. 26 to the conductor 953 of the circuit of FIG. 25. The conductor 1822 connects the conductor 821 of the second circuit like the circuit of FIG. 26 to the conductor 821 of the circuit of FIG. 25, the conductor 1672 connects the conductor 821 of the first circuit like the circuit of FIG. 28 to the conductor 821 of the circuit of FIG. 25, and the conductor 1836 connects the conductor 821 of the third circuit like the circuit of FIG. 26 to the conductor 821 of the circuit of FIG. 25.

Normally the light beams from the lamps 762, 1562, 1810 and 1824, respectively, will be reflected back on to the light-sensitive elements 770, 1564, 1812 and 1826 by strips, not shown, which are similar to the strip 769 in FIG. 3. As a result, current will normally flow through the resistors 1062 of the circuit of FIG. 25 and of the first, second and third circuits like the circuit of FIG. 26. The pentodes 1072 and the triodes 1090 of those four circuits will normally conduct current, but the triodes 1082 of those four circuits will normally be non-conductive. The triodes 1588 and 1610 of the circuit of FIG. 25 will normally conduct current, but the triodes 1570 and 1598 of that circuit will normally be non-conductive. The triodes 1659 of the three circuits like the circuit of FIG. 26 will normally conduct current, but the triodes 1640 of those circuits will normally be non-conductive; and the thyratron of FIG. 31 will normally be non-conductive.

It will be noted, from an examination of FIG. 30, that the light-sensitive element 1564 is closer to the rear of the platen 1800 than are the light-sensitive elements 1812 and 1826. The mounting of the light-sensitive element 1564 closer to the rear of the platen 1800 is desirable because it enables the light, which normally falls upon that light-sensitive element, to be intercepted by the forwardly bowed portion of the green area between the white border and the white "TWO" of a two dollar bill at the same time the light which normally falls upon the light-sensitive elements 1812 and 1826 is intercepted by the straight leading portions of that green area. As a result, when an authentic two dollar bill is moved rearwardly of the platen 1800, the light which normally falls upon the light-sensitive elements 1564, 1812 and 1826 should be intercepted at substantially the same instant.

When the leading white border of a bill 400 intercepts the beam of light from the lamp 762, the voltage at the plate of the pentode 1072 in FIG. 25 will increase and the voltage at the junction between resistors 1084 and 1086 will decrease. The capacitor 1193 will differentiate the negative-going voltage at that junction and will couple the resulting signal to the control grid of the thyratron 1186. That signal will not change the condition of that thyratron but will merely drive that control grid more negative. The capacitor 1586 also will differentiate that negative-going voltage and will couple the resulting signal to the anode of that diode 1584. However, that diode will block any negative-going signals which are applied to the anode thereof, and hence that signal will not be transmitted to the grid of the triode 1570. As a result, the interception of the beam of light from the lamp 762 by the white border of the bill 400 will not change the conditions of triode 1570 or of thyratron 1186.

When the green area, which is intermediate the leading white border and the white "TWO," intercepts the light beam from the lamp 762, the voltage at the plate of the pentode 1072 in FIG. 25 will decrease and the voltage at the junction between resistors 1084 and 1086 in FIG. 25 will increase. The capacitor 1193 will differentiate the positive-going voltage at that junction and will couple the resulting signal to the control grid of the thyratron 1186. While that signal will drive that grid in the positive direction, the amplitude of that signal will be insufficient, in and of itself, to render that thyratron conductive.

The capacitor 1586 also will differentiate the positive-going signal at the junction between the resistors 1084 and 1086 and will couple the resulting signal to the anode of the diode 1584. Because that signal is positive-going, and becaues the triode 1588 is conducting current and is thus maintaining the value of the cathode voltage of that diode below the value of the anode voltage of that diode, that diode will transmit that signal to the grid of the triode 1570. Thereupon, that triode will become conductive; and the resulting current flow through the resistor 1572 will decrease the voltage at the plate of that triode. The capacitor 1594 will couple the decreased voltage at the plate of triode 1570 to the grid of triode 1588 via resistor 1592; and thereupon the triode 1588 will become non-conductive. The resulting increased voltage at the plate of the triode 1588 will increase the value of the cathode voltage of the diode 1584 above the level of the value of the anode voltage of that diode, and thereby cause that diode to block all further signals which are coupled to it by the capacitor 1586. The resulting increased voltage at the plate of the triode 1588 will also increase the value of the voltage at the grid of the triode 1570, and will thereby keep that triode conductive. As the voltage at the plate of triode 1570 decreased, capacitor 1594 started discharging through that tube and resistor 1590; and as that capacitor discharges it will apply a negative voltage to the grid of the triode 1588 and thereby keep that triode non-conductive. The values of capacitor 1594 and of resistor 1590 are selected so that discharging of that capacitor will keep the triode 1588 nonconductive for about twelve hundred and fifty milliseconds. This means that during the said twelve hundred and fifty milliseconds, the diode 1584 will block substantially all signals which are applied to it by the capacitor 1586.

As the triode 1588 becomes non-conductive, the capacitor 1608 will differentiate the positive-going voltage at the plate of that triode and will couple the resulting signal to the grid of triode 1598. Thereupon that triode will become conductive, and the resulting voltage drop across the resistor 1600 will reduce the voltage at the plate of that triode. Capacitor 1618 will couple that decreased voltage to the grid of triode 1610 and thereby render that triode non-conductive. The resulting decrease in voltage drop across resistor 1602 will increase the grid voltage of triode 1598 and thereby keep that triode conductive. The change of triode 1610 from the conductive to the non-conductive state also will block further current flow from the resistor 1622 through diode 1628 and will thereby slightly decrease the voltage drop across that resistor. Thereupon the voltage at the control grid of the thyratron 1186 will move slightly in the positive direction; but that movement will be limited to a volt or so because current will still be flowing through resistor 1622 and then through diode 1670 and the triode 1659 of the first circuit like the circuit of FIG. 26, and through the diode 1814 and the triode 1659 of the second circuit like the circuit in FIG. 26, and through the diode 1828 and the triode 1659 of the third circuit like the circuit of FIG. 26. As a result, while the voltage at the control grid of thyratron 1186 will be a volt or so less negative, that voltage will still be well beyond cutoff.

As the triode 1598 became conductive, the drop in voltage at the plate of that triode enabled the capacitor 1618 to start discharging through that triode and the resistors 1614 and 1612. As that capacitor discharges, it will apply a negative voltage to the grid of the triode 1610 and thereby keep that triode non-conductive. The values of the capacitor 1618 and of the resistors 1612 and 1614 are selected so the discharging of that capacitor will keep the triode 1610 non-conductive for one hundred and sixty-four milliseconds. This means that during the said one hundred and sixty-four milliseconds, substantially no current will be able to flow through diode 1628.

When the white "TWO" intercepts the light beam from the lamp 762, the voltage at the plate of pentode 1072 in FIG. 25 will again increase with a consequent decrease in the voltage at the junction between resistors 1084 and 1086. Capacitor 1193 will differentiate the negative-going voltage at that junction and will apply the resulting signal to the control grid of thyratron 1186. That signal will be unable to change the condition of that thyratron because that signal will merely drive that control grid further in the negative direction. The capacitor 1586 also will differentiate that negative-going voltage and will apply the resulting signal to the anode of the diode 1584. However, that diode will block that signal; and the overall result is that the interception of the light beam from the lamp 762 by the white "TWO" will not change the conditions of thyratron 1186 or of the triodes 1570, 1588, 1598 and 1610.

When the green area, intermediate the white "TWO" and the white area surrounding the picture of Monticello, intercepts the light beam from lamp 762, the voltage at the plate of the pentode 1072 in FIG. 27 will again decrease with a consequent increase in the voltage at the junction between resistors 1084 and 1086. Capacitor 1193 will differentiate that positive-going voltage and will couple the resulting signal to the control grid of the thyratron 1186. While that signal will drive that grid in the positive direction, the amplitude of that signal will be insufficient, in and of itself, to render that thyratron conductive. The capacitor 1586 also will differentiate that positive-going voltage and will couple the resulting signal to the anode of the diode 1584. Because the triode 1588 is still non-conductive, that diode will block that signal. The overall result is that the interception of the light beam from the lamp 762 by the green area, intermediate the white "TWO" and the white area surrounding the picture of Monticello, will not change the conditions of thyratron 1186 or of triodes 1570, 1588, 1598 and 1610.

When the white area surrounding the picture of Monticello intercepts the light beam from the lamp 762, the voltage at the plate of the pentode 1072 in FIG. 25 will again increase with a consequent decrease in the voltage at the junction between resistors 1084 and 1086. Capacitor 1193 will differentiate that negative-going voltage and will apply the resulting signal to the control grid of thyratron 1186. That signal will be unable to change the condition of that thyratron because that signal will merely drive that control grid further in the negative direction. The capacitor 1586 also will differentiate that negative-going voltage and will apply the resulting signal to the anode of the diode 1584. However, that diode will block that signal; and the overall result is that the interception of the light beam from lamp 762 by the white area surrounding the picture of Monticello will not change the conditions of thyratron 1186 or of triodes 1570, 1588, 1598 and 1610.

About this time, the leading edge of the bill 400 will be close to the light beams from the lamps 1810 and 1824; and before the white areas surrounding the picture of Monticello can pass beyond the light beam from the lamp 762, the white border of that bill will intercept the light beams from the lamps 1810 and 1824. Thereupon the intensity of the light received by the light-sensitive elements 1812 and 1826 will increase with a consequent increase in the voltages at the plates of the pentodes 1072 in the second and third circuits like the circuit of FIG. 26 and with consequent decreases in the voltages at the junctions between the resistors 1084 and 1086 in those two circuits. The capacitors 1656 will differentiate the negative-going voltages at the junctions between the resistors 1084 and 1086 in those two circuits and will couple the resulting signals to the anodes of the diodes 1654 in those circuits. However, those diodes will block all negative-going signals applied to the anodes thereof; and hence the overall result is that the interception of the light beams from the lamps 1810 and 1824, by the white border of the bill, will not change the conditions of thyratron 1186 or of the triodes 1640 and 1659 of the second and third circuits like the circuit of FIG. 26.

Also before the white area surrounding the picture of Monticello can pass beyond the light beam from the lamp 762, the forwardly bowed portion of the green area between the white border and the white "TWO" of the bill will intercept the light beam from the lamp 1562, and the straight portions of that green area will intercept the light beams from the lamps 1810 and 1824. Thereupon the voltages at the plates of the pentodes 1072 in the three circuits like FIG. 26 will decrease and cause a consequent increase in the voltages at the junctions between the resistors 1084 and 1086 in those circuits. The capacitors 1656 will differentiate those positive-going voltages and will couple the resulting signals to the anodes of the diodes 1654. Because those signals are positive-going and because the triodes 1659 are conducting current, the diodes 1654 will transmit those signals to the grids of the triodes 1640 of those circuits. Thereupon the triodes 1640 will become conductive; and the resulting voltage drops across the resistors 1642 in those three circuits will reduce the plate voltages of those triodes. The capacitors 1664 will couple those decreases in voltage at the plates of the triodes 1640 to the grids of the triodes 1659, thereby rendering those triodes non-conductive. The resulting increases in voltage at the plates of the triodes 1659 will increase the grid voltages of the triodes 1640 and thereby keep those latter triodes conductive. Also the resulting increases in voltage at the plates of the triodes 1659 will increase the cathode voltages of the diodes 1654 and thereby cause those diodes to block substantially all further signals applied to the anodes thereof by the capacitors 1656.

As the triodes 1659 of the three circuit like FIG. 26 become non-conductive, they will block further current flow, respectively, through the diodes 1670, 1814 and 1828 in FIG. 31. The resulting decrease in voltage drop across the resistor 1622 will be sizeable and will cause the control grid of the thyratron 1186 to move in the positive direction. However, the normal negative bias on that control grid is so sizeable that the reduction in voltage drop across resistor 1622, due to the shifting of all of the triodes 1610 and 1659 from the conductive to the non-conductive states, will be unable to render the thyratron 1186 conductive. The overall result is that the interception of the light beams from the lamps 1562, 1810 and 1824 by the green area between the white border and the white "TWO" of a two dollar bill will make the bias voltage at the control grid of the thyratron 1186 much less negative, but will not render that thyratron conductive.

When the triodes 1640 became conductive, and thereby reduced the voltages at the plates thereof, the capacitors 1664 began discharging through the resistors 1660 and 1658 in the three circuits like FIG. 26. As those capacitors discharge, they will apply negative voltages to the grids of the triodes 1659 and thereby keep those triodes non-conductive. The values of the capacitors 1664 and resistors 1660 and 1658 are selected so the discharging of those capacitors will keep the triodes 1659 non-conductive for twenty-six milliseconds. This means that during the said twenty-six milliseconds, the diodes 1654 will block substantially all of the signals applied to them by the capacitors 1656, and the control grid of the thyratron 1186 will be less heavily biased in the negative direction.

If the bill 400 is an authentic two dollar bill, the trees adjacent the leading edge of the picture of Monticello will intercept the light beam from the lamp 762 during the one hundred and sixty-four millisecond period established by the capacitor 1618 and the resistors 1614 and 1612 and also during the twenty-six millisecond period established by the capacitors 1664 and the resistors 1660 and 1658 of the three circuits like the circuit of FIG. 26. As those trees intercept that light beam, the intensity of the light received by the light-sensitive element 770 will decrease with a consequent decrease in voltage at the plate of the pentode 1072 in FIG. 25 and with a consequent increase in the voltage at the junction between the resistors 1084 and 1086. Capacitor 1193 will differentiate that positive-going voltage and will couple the resulting signal to the control grid of the thyratron 1186. That signal will be too small, in and of itself, to render that thyratron conductive; but it will coact with the signal established by the blocking of current flow through the diodes 1628, 1670, 1814 and 1828 to make the thyratron 1186 conductive. As that thyratron becomes conductive, the capacitor 1196 will discharge through that thyratron; and very promptly the voltage across that capacitor, and thus the voltage at the plate of that thyratron, will fall sufficiently to cut off that thyratron. That capacitor will then recharge, with consequent energization of the relay coil 818 in FIG. 22.

The operation of a currency detector utilizing the principles of FIGS. 30 and 31 will be similar to the operation of a currency detector utilizing the principles of FIGS. 24, 25 and 26. However, in the former currency detector, the green area between the leading white border and the white "TWO" must intercept the light beams from the three laterally-spaced lamps 1562, 1810 and 1824 to render the thyratron 1186 conductive. This is desirable because it keeps a patron from effecting a firing of the thyratron 1186 in FIG. 31 by passing just a silver-like cut-out portion of an authentic bill through the bill-transporting device. While just three lamps are used in FIG. 30 to sense the presence of the green area between the leading white border and the "TWO," more lamps could be used.

The lamps 1562, 1810 and 1824 will be suitably shrouded so the light from each lamp can fall only upon the light-sensitive element associated with that lamp, and shrouding is easily and inexpensively effected, by encasing each lamp within a light-impervious sleeve which extends beyond the upper end of that lamp. Further, the light-sensitive elements 1564, 1812 and 1826 will be suitably shrouded so each light-sensitive element can receive light only from the lamp associated with it. However, no lenses are needed because the optical sensing system provided by the present invention is not dependent upon high optical resolution. As a result, the optical sensing system provided by the present invention can be made so it is simple and inexpensive.

The fact that the optical sensing system of the present invention utilizes low resolution is desirable in connection with the arrangement shown in FIG. 30. The wider the light beams from the lamps 1562, 1810 and 1824 are, the less likelihood there is of a patron being able to cut elongated strips from a bill, to attach them to a sheet of paper, and to have them be accepted as an authentic two dollar bill.

The currency detector provided by the present invention can identify and accept authentic two dollar bills even though the engravings on those bills are offset longitudinally of the paper of those bills. The present invention is able to do this because the various circuits do not initiate their timing or pulse-generating functions when the white borders intercept the light beams—those circuits initiating their timing or pulse-generating functions only after the green areas between the white borders and the TWO's intercept the light beams. Further, the currency detector provided by the present invention can identify and accept authentic two dollar bills even though the engravings on those bills are offset laterally of the paper of those bills or the longitudinally-extending center lines of the engravings on those bills are offset laterally from the longitudinally-extending center line of the bill-transporting device; and it can also identify and accept authentic two dollar bills even though the engravings on those bills are elongated or shortened due to stretching or shrinking of those bills. The problem of identifying and accepting authentic two dollar bills which have the longitudinally-extending center lines thereof laterally offset from the longitudinally-extending center line of the bill-transporting device is difficult of solution—whether that offset is due to lateral displacement of the engraving relative to the paper or is due to lateral displacement of the bill relative to the bill-transporting device—because the leading edge of the leading green area of an authentic two dollar bill is not straight and because the picture of Monticello is not centered vertically within the engraving. Specifically, the distance between the leading edge of the leading green area of a two dollar bill and the trees at the leading edge of the picture of Monticello varies appreciably as that distance is measured along horizontal lines within an eighth of an inch above and an eighth of an inch below the longitudinally-extending center line of that bill. This means that if the timing functions of the various circuits were to be established to require exact coincidence of the signals obtained when the longitudinally-extending center line of the engraving was coincident with the longitudinally-extending center line of the bill-transporting device, exact coincidence of the signals could not be obtained when the longitudinally-extending center line of the engraving was offset from the longitudinally-extending center line of the bill-transporting device. The present invention makes it possible to obtain coincidence of the signals even if the longitudinally-extending center line of the engraving is not coincident with the longitudinally-extending center line of the bill-transporting device; and it does so by providing the timed periods of twenty-six milliseconds. Those periods are long enough to compensate for any anticipated lateral displacements of the longitudinally-extending center lines of the engravings on bills relative to the longitudinally-extending center line of the bill-transporting device, and yet are short enough to prevent the acceptance of signals from undesirable areas on the bills. Those twenty-six millisecond periods also compensate for any normal elongation or shortening of the engravings due to stretching or shrinking of the bills.

In the circuit of FIG. 25, a stage is provided to block or inhibit the transmission to another stage of all signals which otherwise would be transmitted to that other stage during a predetermined period of time. In the circuits of FIGS. 27, 29 and 31, blocking or inhibiting stages are not provided, because the actuation of the switch 290 is relied upon to block or inhibit the bill-accepting action of signals from the middle and trailing portions of bills.

In the circuits of FIGS. 27 and 29, the signal that renders the thyratron 1186 conductive includes two components. In the circuits of FIGS. 25 and 26, the signal that renders the thyratron 1186 conductive includes three components, and in the circuit of FIG. 31, the signal that renders the thyratron 1186 conductive includes five components. In all of the circuits, the components of the signal must be at least partially coextensive, in point of time.

To cause the actuator 292 of the switch 290 to shift the movable contact of that switch, a bill must initially engage that actuator and must then continue to move about a quarter of an inch toward the rear plate 42. As a result, in FIG. 3, the point of engagement of a bill with that actuator should be set about one and three-eighths of an inch rearwardly of the point where the leading edge of that bill intercepts the light beam from the lamp 762. In FIG. 24, the point of engagement of a bill with the actuator 292 should be set even with the point where the leading edge of that bill intercepts the light beam from the lamp 1562.

In the various circuits, the thyratrons 1186 have been used as the threshold devices; but other suitable threshold devices could be used. For example, trigger neon tubes could be used as the threshold devices. Further, the thyratrons 1186 or the other threshold devices could be de-energized in a manner other than that disclosed hereinbefore.

The inductor 1064 and the capacitor 1066 can, if desired, be deleted. While that inductor and capacitor are helpful in reducing high frequency noise in environments where such noise can effect the voltage across the light-sensitive element 770, that inductor and capacitor can be deleted in other environments.

In FIGS. 27 and 28, the cathodes of the triodes of the multivibrators are connected directly to the grounded conductors 854. If desired, the cathodes of the triodes of any of those multivibrators could be connected together and then connected to those grounded conductors by a common resistor. Where this is done, the amount of filtering for high frequency noise can be reduced and can, in some situations, be eliminated.

The bill-transporting device of the present invention could, if desired, have another bill-actuated switch mounted in register with the bill-actuated switch 752. That switch would, in the circuit of FIG. 20, be connected in parallel with the switch 752; and the actuator of that switch would receive one corner of an inserted bill while the actuator of the switch 752 would receive the other corner of that bill. As a result, one or the other of those switches could respond to a bill which had one corner torn off or folded back.

In FIG. 30, three lamps are disposed in position to intercept the leading portion of the green area intermediate the white border and the "TWO" of a bill. But, if desired, just one off-center lamp could be used to prevent the acceptance of an elongated sliver from an authentic bill. For example, if the lamps 1824 and 1810 were removed, the lamps 1810 and 762 would still prevent the acceptance of an elongated sliver from an authentic bill.

The currency detector provided by the present invention constitutes a transient system, and it is thus able to sense for the presence of both green areas and white areas on inserted bills. In doing so, that currency detector makes it possible to identify authentic bills with a high degree of accuracy. Further, because the currency detector of the present invention constitutes a transient system, one lamp can sense several areas on an inserted bill.

The engraving on the non-magnetic face of a two dollar bill is not symmetrical. However, by selecting certain symmetrical portions of that engraving, as for example the green areas intermediate the white borders and the "TWO's" and the curved edges of the overall picture of Monticello, the present invention permits either end of a bill to be inserted. This is desirable because it avoids needless rejections of authentic bills.

Whereas the drawing and accompanying description have shown and described several preferred embodiments of the present invention, it should be apparent to those skilled in the art that various changes may be made in the form of the invention without affecting the scope thereof.

What I claim is:

1. A device for detecting authentic currency which has two spaced-apart light-dark interfaces thereon comprising a light-sensitive element capable of coacting with the sharp changes in light received by it from the areas immediately in advance of and immediately following one light-dark interface on a bill moving relative to it to produce a validating signal, a second light-sensitive element capable of coacting with the sharp changes in light received by it from the areas immediately in advance of and immediately following a second light-dark interface on the bill as the bill moves relative to it to produce a second validating signal, a source of illumination for said bill, means providing relative movement between said bill and said light-sensitive elements, said means disposing said bill adjacent both of said light-sensitive elements at the same time so light from said bill simultaneously strikes both of said light-sensitive-elements, and an accept mechanism capable of receiving said validating signals, said accept mechanism being capable of effecting the acceptance of the bill whenever said validating signals are coincidentally applied to said accept mechanism, said source of illumination for said bill providing light for each acceptable bill for a period of time which is long enough to enable the area immediately in advance of the first said interface on said bill and the area immediately following the first said interface on said bill to successively and sharply change the light which the first said light-sensitive element receives from said bill and which also is long enough to enable the area immediately in advance of said second interface on said bill and the area immediately following said second interface on said bill to successively and sharply change the light which said second light-sensitive element receives from said bill.

2. A device for detecting authentic currency which has two spaced-apart light-dark interfaces thereon comprising a light-sensitive element capable of coating with the sharp changes in light received by it from the areas immediately in advance of and immediately following one light-dark interface on a bill moving relative to it to produce a validating signal, a second light-sensitive element capable of coacting with the sharp changes in light received by it from the areas immediately in advance of and immediately following a second light-dark interface on the bill as the bill moves relative to it to produce a second validating signal, a source of illumination for said bill, means providing relative movement between said bill and said light-sensitive elements, said means disposing said bill adjacent both of said light-sensitive elements at the same time so light from said bill simultaneously strikes both of said light-sensitive elements, and an accept mechanism capable of receiving said validating signals, said accept mechanism being capable of effecting the acceptance of the bill whenever said validating signals are coincidentally applied to said accept mechanism, said light-sensitive elements being spaced longitudinally and laterally of the path of movement of the bill, said source of illumination for said bill providing light for each acceptable bill for a period of time which is long enough to enable the area immediately in advance of the first said interface on said bill and the area immediately following the first said interface on said bill to successively and sharply change the light which the first said light-sensitive element receives from said bill and which also is long enough to enable the area immediately in advance of said second interface on said bill and the area immediately following said second interface on said bill to successively and sharply change the light which said second light-sensitive element receives from said bill.

3. A device for detecting authentic currency which has two spaced-apart light-dark interfaces thereon comprising a light-sensitive element capable of coacting with the sharp changes in light received by it from the areas immediately in advance of and immediately following one light-dark interface on a bill moving relative to it to produce an electrical change, an electrical circuit having a stage responsive to said electrical change to produce a validating signal, a second light-sensitive element capable of coacting with the sharp changes in light received by it from the areas immediately in advance of and immediately following a second light-dark interface on the bill as the bill moves relative to it to produce a second electrical change, a second stage in said electrical circuit responsive to said second electrical change to produce a second validating signal, a source of illumination for said bill, means providing relative movement between said bill and said light-sensitive elements, said means disposing said bill adjacent both of said light sensitive elements at the same time so light from said bill simultaneously strikes both of said light-sensitive elements, and an accept mechanism capable of receiving said validating signals, said accept mechanism being capable of effecting the acceptance of the bill whenever said validating signals are coincidentally applied to said accept mechanism, one of said stages making one of said validating signals longer than the other and making it in the order of milliseconds to accommodate shrinking or stretching of the bill, said source of illumination for said bill providing light for each acceptable bill for a period of time which is long enough to enable the area immediately in advance of the first said interface on said bill and the area immediately following the first said interface on said bill to successively and sharply change the light which the first said light-sensitive element receives from said bill and which also is long enough to enable the area immediately in advance of said second interface on said bill and the area immediately following said second interface on said bill to successively and sharply change the light which said second light-sensitive element receives from said bill.

4. A device for detecting authentic currency which has two spaced-apart light dark interfaces thereon comprising a light-sensitive element capable of coacting with the sharp changes in light received by it from the areas immediately in advance of and immediately following one light-dark interface on a bill moving relative to it to produce an electrical change, an electrical circuit having a stage responsive to said electrical change to produce a validating signal, a second light-sensitive element capable of coacting with the sharp changes in light received by it from the areas immediately in advance of and immediately following a second light-dark interface on the bill as the bill moves relative to it to produce a second electrical change, a second stage in said electrical circuit responsive to said second electrical change to produce a second validating signal, a source of illumination for said bill, means providing relative movement between said bill and said light-sensitive elements, said means disposing said bill adjacent both of said light-sensitive elements at the same time so light from said bill simultaneously strikes both of said light-sensitive elements, and an accept mechanism capable of receiving said validating signals, said accept mechanism being capable of effecting the acceptance of the bill whenever said validating signals are coincidentally applied to said accept mechanism, one of said validating signal having a duration of about twenty-six milliseconds, said source of illumination for said bill providing a light for each acceptable bill for a period of time which is long enough to enable the area immediately in advance of the first said interface on said bill and the area immediately following the first said interface on said bill to successively and sharply change the light which the first said light-sensitive element receives from said bill and which also is long enough to enable the area immediately in advance of said second interface on said bill and the area immediately following said second interface on said bill to successively and sharply change the light which said second light-sensitive element receives from said bill.

5. A device for detecting authentic currency which has two spaced-apart light-dark interfaces thereon comprising a light-sensitive element coacting with the sharp changes in light received by it from the areas immediately in advance of and immediately following an interface defined by the leading edge of a predetermined area on a bill moving relative to it to produce an electrical change, an electrical circuit having a stage responsive to said electrical change to produce a validating signal, a second light-sensitive element coacting with the sharp changes in light received by it from the areas immediately in advance of and immediately following a second interface defined by the leading edge of a second predetermined area on the bill as the bill moves relative to it to produce a second electrical change, a second stage in said electrical circuit responsive to said second electrical change to produce a second validating signal, a source of illumination for said bill, means providing relative movement between said bill and said light-sensitive elements, said means disposing said bill adjacent both of said light-sensitive elements at the same time so light from said bill simultaneously strikes both of said light-sensitive elements, and an accept mechanism to receive said validating signals, said accept mechanism being adapted to effect the acceptance of the bill whenever said validating signals are coincidentally applied to said accept mechanism, the leading edge of at least one of said predetermined areas being non-linear, one of said validating signals having a duration that corresponds to and compensates for differences between corresponding points on said leading edges of said predetermined areas as the longitudinally-extending center line of the engraving on the bill is offset from the light-sensitive element intended to sense the said predetermined area with the said non-linear leading edge, said source of illumination for said bill providing light for each acceptable bill for a period of time which is long enough to enable the area immediately in advance of the first said interface on said bill and the area immediately following the first said interface on said bill to successively and sharply change the light which the first said light-sensitive element receives from said bill and which also is long enough to enable the area immediately in advance of said second interface on said bill and the area immediately following said second interface on said bill to successively and sharply change the light which said second light-sensitive element receives from said bill.

6. The method of identifying and accepting authentic currency which has two spaced-apart light-dark interfaces thereon that comprises providing relative movement between the light-dark interfaces on a bill and a plurality of light-sensitive elements that are spaced apart to be in register with said interfaces on the bill, the relative movement between said bill and one of said light-sensitive elements causing light from the areas immediately in advance of and immediately following one light-dark interface on said bill to successively and sharply change the light received by said one light-sensitive element, said relative movement between said bill and another of said light-sensitive elements causing light from the areas immediately in advance of and immediately following a second light-dark interface on said bill to successively and sharply change the light received by said other light-sensitive element, causing light from said bill to simultaneously engage said light-sensitive elements for a period of time which is long enough to enable the area immediately in advance of said one interface and the area immediately following said one interface to successively and sharply change the light which engages said one light-sensitive element and which also is long enough to enable the area immediately in front of said second interface and the area immediately following said second interface to successively and sharply change the light which engages said other light-sensitive element, simultaneously obtaining a plurality of signals from said plurality of light-sensitive elements as said interfaces on an acceptable bill are moved past said light-sensitive elements, and accepting the bill if a predetermined plurality of signals are obtained coincidentally.

7. The method of identifying and accepting authentic currency which has two spaced-apart light-dark interfaces thereon that comprises providing relative movement between the light-dark interfaces on a bill and a light-sensitive element and a second light-sensitive element to provide a signal of a predetermined short duration and to provide a second signal of a shorter duration, and to accept the bill if said signals are, in part, coincident in point of time, the first said signal being generated in response to sharp changes in light caused by the movement of the areas immediately in advance of and immediately following the interface at the leading edge of the border of the engraving on the bill past the first said light-sensitive element and said second signal being generated in response to sharp changes in light caused by the movement of the areas immediately in advance of and immediately following an interface at an inwardly-spaced portion of said engraving past said second light-sensitive element, and illuminating said bill for a period of time which is long enough to enable the area immediately in advance of the first said interface and the area immediately following the first said interface to successively and sharply change the light which engages the first said light-sensitive element and which also is long enough to enable the area immediately in front of the second of said interfaces and the area immediately following said second interface to successively and sharply change the light which engages said second light-sensitive element.

References Cited by the Examiner

UNITED STATES PATENTS 2,922,893 1/1960 Ett.
2,941,187 6/1960 Simjian.
2,951,164 8/1960 Timms.

ROBERT B. REEVES, *Primary Examiner.*

SAMUEL F. COLEMAN, *Examiner.*